United States Patent
Xia et al.

(10) Patent No.: US 9,888,462 B2
(45) Date of Patent: Feb. 6, 2018

(54) UPLINK CONTROL INFORMATION TRANSMISSION METHOD, USER EQUIPMENT, AND BASE STATION

(71) Applicant: Huawei Technologies Co., Ltd., Shenzhen, Guangdong (CN)

(72) Inventors: Yuan Xia, Beijing (CN); Liang Xia, Shenzhen (CN); Sha Ma, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 95 days.

(21) Appl. No.: 14/971,668

(22) Filed: Dec. 16, 2015

(65) Prior Publication Data
US 2016/0100398 A1 Apr. 7, 2016

Related U.S. Application Data

(63) Continuation of application No. PCT/CN2013/077351, filed on Jun. 17, 2013.

(51) Int. Cl.
*H04W 72/04* (2009.01)
*H04L 5/00* (2006.01)

(52) U.S. Cl.
CPC ....... *H04W 72/0413* (2013.01); *H04L 5/0007* (2013.01); *H04L 5/0053* (2013.01); *H04W 72/044* (2013.01); *H04L 5/0051* (2013.01)

(58) Field of Classification Search
CPC ............ H04W 72/0413; H04W 72/044; H04L 5/0007; H04L 5/0053; H04L 5/0051
See application file for complete search history.

(56) References Cited

U.S. PATENT DOCUMENTS

2009/0046789 A1* 2/2009 Xu ..................... H04L 27/2601
375/260
2009/0245170 A1 10/2009 Zhang et al.
(Continued)

FOREIGN PATENT DOCUMENTS

CN 101902301 A 12/2010
CN 101969361 A 2/2011
(Continued)

OTHER PUBLICATIONS

"Discussion on spectral efficiency improvement for small cell enhancements", China Telecom, 3GPP TSG RAN WG1 Meeting #72, Jan. 28-Feb. 1, 2013, 6 pages, R1-130354.
(Continued)

*Primary Examiner* — Ricky Ngo
*Assistant Examiner* — Christine Ng

(57) ABSTRACT

Embodiments of the present invention provide an uplink control information transmission method, user equipment, and a base station. In a first uplink demodulation reference signal (UL DMRS) pattern, resource elements (Res) in one orthogonal frequency division multiplexing (OFDM) symbol in an uplink subframe are used to carry the UL DMRS. The method includes: mapping, by user equipment (UE), uplink control information (UCI) to REs in the uplink subframe according to the first UL DMRS pattern, where an OFDM symbol in which the REs carrying the UCI are located is adjacent to the OFDM symbol in which the REs carrying the UL DMRS are located; and sending, by the UE to a base station, the uplink subframe that carries the UCI.

3 Claims, 18 Drawing Sheets

(56) References Cited

U.S. PATENT DOCUMENTS

| | | | |
|---|---|---|---|
| 2010/0039953 A1* | 2/2010 | Zhang | H04L 1/0073 370/252 |
| 2011/0128942 A1 | 6/2011 | Kim et al. | |
| 2011/0310986 A1 | 12/2011 | Heo et al. | |
| 2012/0008556 A1* | 1/2012 | Noh | H04L 1/1893 370/328 |
| 2012/0207111 A1* | 8/2012 | Jang | H04L 1/0042 370/329 |
| 2012/0243497 A1* | 9/2012 | Chung | H04L 5/0055 370/329 |
| 2012/0320872 A1 | 12/2012 | Yang et al. | |
| 2013/0016687 A1 | 1/2013 | Yang et al. | |
| 2013/0100888 A1 | 4/2013 | Shimezawa et al. | |
| 2013/0182670 A1 | 7/2013 | Kim et al. | |
| 2013/0188623 A1 | 7/2013 | Chen et al. | |
| 2015/0237611 A1 | 8/2015 | Ahn et al. | |
| 2016/0056942 A1 | 2/2016 | Wang et al. | |

FOREIGN PATENT DOCUMENTS

| | | |
|---|---|---|
| CN | 102111886 A | 6/2011 |
| CN | 102714565 A | 10/2012 |
| CN | 103109486 A | 5/2013 |
| EP | 2 996 274 A1 | 3/2016 |
| JP | 2012-114960 | 6/2012 |
| JP | 2016-523038 A | 8/2016 |

OTHER PUBLICATIONS

"Discussion and evaluation for DMRS overhead reduction", Huawei, HiSilicon, 3GPP TSG RAN WG1 Meeting #72bis, Apr. 15-19, 2013, 8 pages, R1-130891.

* cited by examiner

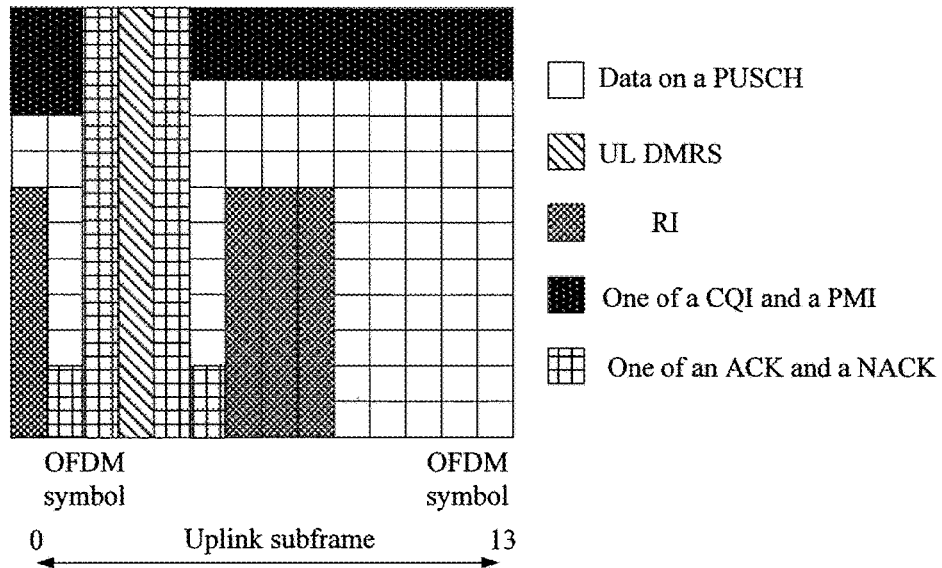

FIG. 16

A UE receives trigger information sent by a base station, where the trigger information is used to trigger a change of the UE from sending a first uplink subframe according to a first UL DMRS pattern to sending a second uplink subframe according to a second UL DMRS pattern — S1101

According to the trigger information and according to the second UL DMRS pattern, the UE adds UCI to the second uplink subframe and sends the second uplink subframe to the base station — S1102

FIG. 17

UPLINK CONTROL INFORMATION TRANSMISSION METHOD, USER EQUIPMENT, AND BASE STATION

CROSS-REFERENCE TO RELATED APPLICATIONS

This application is a continuation of International Application No. PCT/CN2013/077351, filed on Jun. 17, 2013, which is incorporated herein by reference in its entirety.

TECHNICAL FIELD

The present invention relates to the field of communications technologies, and in particular, to an uplink control information transmission method, user equipment, and a base station.

BACKGROUND

In a wireless communications system, a base station performs uplink channel estimation and demodulation by using an uplink (UL for short) demodulation reference signal (DMRS for short) sent by user equipment (UE for short), and the UL DMRS may also be used to assist in uplink timing, signal-to-noise ratio estimation, channel measurement, and the like. The UE sends a physical uplink shared channel (PUSCH for short) and the UL DMRS to the base station, where the PUSCH is used to carry uplink data. The UE may further send uplink control information (UCI for short), where the UCI includes a channel quality indicator (CQI for short)/a precoding matrix indicator (PMI for short), a rank indication (RI for short), and an acknowledgement (ACK for short) or a negative acknowledgement (NACK for short).

At present, a small cell-related technology appears in the prior art. Because coverage of a small cell is relatively small, and a moving speed of UE is slow, there is a relatively good correlation between channel quality and a channel time-frequency domain of the UE in the small cell. Therefore, the UE usually sends a UL DMRS only over the 4th symbol, that is, symbol 3, of an uplink subframe sent to a base station in the small cell, sends at least one of an ACK and a NACK over the 3rd, 5th, 10th, and 12th symbols, that is, symbols 2, 4, 9, and 11, sends an RI over the 2nd, 6th, 8th, and 11th symbols, that is, symbols 1, 5, 7, and 10, and sends data over the 11th symbol, that is, symbol 10, over which the UL DMRS is originally sent in the uplink subframe, so that more resources are used to send the data, thereby improving resource utilization and spectral efficiency.

However, in the prior art, performance of demodulating for at least one of the ACK or the NACK and the RI in the uplink subframe by the base station in the small cell may be degraded, thereby reducing a data transmission rate and a network throughput.

SUMMARY

Embodiments of the present invention provide an uplink control information transmission method, user equipment, and a base station, which are used to map UCI to a location adjacent to that of a UL DMRS in an uplink subframe, so as to improve performance of demodulating the UCI by the base station, thereby improving a data transmission rate and a network throughput.

According to a first aspect, an embodiment of the present invention provides an uplink control information transmission method. In a first uplink demodulation reference signal UL DMRS pattern, resource elements REs in one orthogonal frequency division multiplexing OFDM symbol in an uplink subframe are used to carry the UL DMRS; and the method includes: mapping, by user equipment UE, uplink control information UCI to REs in the uplink subframe according to the first UL DMRS pattern, where an OFDM symbol in which the REs carrying the UCI are located is adjacent to the OFDM symbol in which the REs carrying the UL DMRS are located; and sending, by the UE to a base station, the uplink subframe that carries the UCI.

In a first possible implementation manner of the first aspect, the UL DMRS is carried on REs in the 4th OFDM symbol in the uplink subframe, where the uplink subframe includes 14 OFDM symbols.

With reference to the first aspect or the first possible implementation manner of the first aspect, in a second possible implementation manner of the first aspect, in the uplink subframe, an RE that carries neither UL DMRS nor UCI further carries at least one of the following: a channel quality indicator CQI, a precoding matrix indication PMI, and data on a physical uplink shared channel PUSCH.

With reference to the first aspect, or the first possible implementation manner of the first aspect, or the second possible implementation manner of the first aspect, in a third possible implementation manner of the first aspect, the UCI includes: a rank indication RI, and at least one of an acknowledgement ACK and a negative acknowledgement NACK; in the uplink subframe, the RI is carried on REs in the following at least two first OFDM symbols: the 1st OFDM symbol, the 2nd OFDM symbol, the 3rd OFDM symbol, the 5th OFDM symbol, the 6th OFDM symbol, the 7th OFDM symbol, the 8th OFDM symbol, and the 9th OFDM symbol; and in the uplink subframe, at least one of the ACK and the NACK is carried on REs in the following at least two second OFDM symbols: the 1st OFDM symbol, the 2nd OFDM symbol, the 3rd OFDM symbol, the 5th OFDM symbol, the 6th OFDM symbol, the 7th OFDM symbol, the 8th OFDM symbol, and the 9th OFDM symbol.

With reference to the third possible implementation manner of the first aspect, in a fourth possible implementation manner of the first aspect, the mapping, by user equipment UE, uplink control information UCI to resource elements REs in the uplink subframe according to the first uplink demodulation reference signal UL DMRS pattern includes: mapping, by the UE, the RI to the REs in the first OFDM symbols; mapping, by the UE, the at least one of the ACK and the NACK to the REs in the second OFDM symbols; and mapping, by the UE, at least one of the CQI, the PMI, and the data on the PUSCH to a first RE, where the first RE is an RE that carries no UL DMRS, carries no RI, and carries no ACK or NACK.

With reference to the fourth possible implementation manner of the first aspect, in a fifth possible implementation manner of the first aspect, the mapping, by the UE, the RI to the REs in the first OFDM symbols includes: according to a set order, first mapping, by the UE, a first part of the RI to an RE in the 2nd OFDM symbol in the uplink subframe and an RE in the 6th OFDM symbol in the uplink subframe, and then mapping a second part, except the first part, of the RI to an RE in the 1st OFDM symbol in the uplink subframe and an RE in the 7th OFDM symbol in the uplink subframe; and the mapping, by the UE, the at least one of the ACK and the NACK to the REs in the second OFDM symbols includes: according to the set order, first mapping, by the UE, a first part of the at least one of the ACK and the NACK to an RE in the 3rd OFDM symbol in the uplink subframe and an RE in the 5th OFDM symbol in the uplink subframe, and then mapping a second part, except the first part, of the at least one of the ACK and the NACK to REs, in the 1st OFDM symbol and the 7th symbol that are in the uplink subframe, that carry no RI.

With reference to the fourth possible implementation manner of the first aspect, in a sixth possible implementation manner of the first aspect, the mapping, by the UE, the RI to the REs in the first OFDM symbols includes: according to a set order, first mapping, by the UE, a first part of the RI to an RE in the 2nd OFDM symbol in the uplink subframe and an RE in the 6th OFDM symbol in the uplink subframe, and then mapping a second part, except the first part, of the RI to an RE in the 1st OFDM symbol in the uplink subframe and an RE in the 7th OFDM symbol in the uplink subframe; and the mapping, by the UE, the at least one of the ACK and the NACK to the REs in the second OFDM symbols includes: mapping, by the UE according to the set order, the at least one of the ACK and the NACK to an RE that is in the 1st OFDM symbol in the uplink subframe and that carries no RI, an RE that is in the 3rd OFDM symbol in the uplink subframe and that carries no RI, an RE that is in the 5th OFDM symbol in the uplink subframe and that carries no RI, and an RE that is in the 7th OFDM symbol in the uplink subframe and that carries no RI.

With reference to the fourth possible implementation manner of the first aspect, in a seventh possible implementation manner of the first aspect, the mapping, by the UE, the RI to the REs in the first OFDM symbols includes: mapping, by the UE according to a set order, the RI to an RE in the 1st OFDM symbol in the uplink subframe, an RE in the 2nd OFDM symbol in the uplink subframe, an RE in the 6th OFDM symbol in the uplink subframe, and an RE in the 7th OFDM symbol in the uplink subframe; and the mapping, by the UE, the at least one of the ACK and the NACK to the REs in the second OFDM symbols includes: according to the set order, first mapping, by the UE, a first part of the at least one of the ACK and the NACK to an RE in the 3rd OFDM symbol in the uplink subframe and an RE in the 5th OFDM symbol in the uplink subframe, and then mapping a second part, except the first part, of the at least one of the ACK and the NACK to an RE that is in the 1st OFDM symbol in the uplink subframe and that carries no RI, an RE that is in the 2nd OFDM symbol in the uplink subframe and that carries no RI, an RE that is in the 6th OFDM symbol in the uplink subframe and that carries no RI, and an RE that is in the 7th OFDM symbol in the uplink subframe and that carries no RI.

With reference to the fourth possible implementation manner of the first aspect, in an eighth possible implementation manner of the first aspect, the mapping, by the UE, the RI to the REs in the first OFDM symbols includes: according to a set order, first mapping, by the UE, a first part of the RI to an RE in the 1st OFDM symbol in the uplink subframe and an RE in the 7th OFDM symbol in the uplink subframe, and then mapping a second part, except the first part, of the RI to an RE in the 8th OFDM symbol in the uplink subframe and an RE in the 9th OFDM symbol in the uplink subframe; and the mapping, by the UE, the at least one of the ACK and the NACK to the REs in the second OFDM symbols includes: according to the set order, first mapping, by the UE, a first part of the at least one of the ACK and the NACK to an RE in the 3rd OFDM symbol in the uplink subframe and an RE in the 5th OFDM symbol in the uplink subframe, and then mapping a second part, except the first part, of the at least one of the ACK and the NACK to an RE in the 2nd OFDM symbol in the uplink subframe and an RE in the 6th OFDM symbol in the uplink subframe.

With reference to the fourth possible implementation manner of the first aspect, in a ninth possible implementation manner of the first aspect, the mapping, by the UE, the RI to the REs in the first OFDM symbols includes: according to a set order, first mapping, by the UE, a first part of the RI to an RE in the 1st OFDM symbol in the uplink subframe and an RE in the 7th OFDM symbol in the uplink subframe, and then mapping a second part, except the first part, of the RI to an RE in the 8th OFDM symbol in the uplink subframe and an RE in the 9th OFDM symbol in the uplink subframe; and the mapping, by the UE, the at least one of the ACK and the NACK to the REs in the second OFDM symbols includes: mapping, by the UE according to the set order, the at least one of the ACK and the NACK to an RE in the 2nd OFDM symbol in the uplink subframe, an RE in the 3rd OFDM symbol in the uplink subframe, an RE in the 5th OFDM symbol in the uplink subframe, and an RE in the 6th OFDM symbol in the uplink subframe.

With reference to the fourth possible implementation manner of the first aspect, in a tenth possible implementation manner of the first aspect, the mapping, by the UE, the RI to the REs in the first OFDM symbols includes: mapping, by the UE according to a set order, the RI to an RE in the 1st OFDM symbol in the uplink subframe, an RE in the 7th OFDM symbol in the uplink subframe, an RE in the 8th OFDM symbol in the uplink subframe, and an RE in the 9th OFDM symbol in the uplink subframe; and the mapping, by the UE, the at least one of the ACK and the NACK to the REs in the second OFDM symbols includes: according to the set order, first mapping, by the UE, a first part of the at least one of the ACK and the NACK to an RE in the 3rd OFDM symbol in the uplink subframe and an RE in the 5th OFDM symbol in the uplink subframe, and then mapping a second part, except the first part, of the at least one of the ACK and the NACK to an RE in the 2nd OFDM symbol in the uplink subframe and an RE in the 6th OFDM symbol in the uplink subframe.

With reference to the third possible implementation manner of the first aspect, in an eleven possible implementation manner of the first aspect, the mapping, by user equipment UE, uplink control information UCI to resource elements REs in the uplink subframe according to the first uplink demodulation reference signal UL DMRS pattern includes: mapping, by the UE, the RI to the REs in the first OFDM symbols; mapping, by the UE, at least one of the CQI, the PMI, and the data on the PUSCH to an RE that carries neither UL DMRS nor RI; and mapping, by the UE, the at least one of the ACK and the NACK to the REs in the second OFDM symbols, and overwriting at least one of the CQI, the PMI, and the data on the PUSCH that are carried on the REs in the second OFDM symbols.

With reference to the eleventh possible implementation manner of the first aspect, in a twelfth possible implementation manner of the first aspect, the mapping, by the UE, the RI to the REs in the first OFDM symbols includes: according to a set order, first mapping, by the UE, a first part of the RI to an RE in the 2nd OFDM symbol in the uplink subframe and an RE in the 6th OFDM symbol in the uplink subframe, and then mapping a second part, except the first part, of the RI to an RE in the 1st OFDM symbol in the uplink subframe and an RE in the 7th OFDM symbol in the uplink subframe; and the mapping, by the UE, the at least one of the ACK and the NACK to the REs in the second OFDM symbols, and overwriting at least one of the CQI, the PMI, and the data on the PUSCH that are carried on the REs in the second OFDM symbols includes: according to the set order, first mapping, by the UE, a first part of the at least one of the ACK and the NACK to an RE in the 3rd OFDM symbol in the uplink subframe and an RE in the 5th OFDM symbol in the uplink subframe, then mapping a second part, except the first part, of the at least one of the ACK and the NACK to REs, in the 1st OFDM symbol and the 7th symbol that are in the uplink subframe, that carry no RI, and overwriting the at least one of the CQI, the PMI, and the data on the PUSCH that are carried on the RE in the 1st OFDM symbol, the RE in the 3rd OFDM symbol, the RE in the 5th OFDM symbol, and the RE in the 7th OFDM symbol.

With reference to the eleventh possible implementation manner of the first aspect, in a thirteenth possible implementation manner of the first aspect, the mapping, by the UE, the RI to the REs in the first OFDM symbols includes: according to a set order, first mapping, by the UE, a first part of the RI to an RE in the 2nd OFDM symbol in the uplink subframe and an RE in the 6th OFDM symbol in the uplink subframe, and then mapping a second part, except the first part, of the RI to an RE in the 1st OFDM symbol in the uplink subframe and an RE in the 7th OFDM symbol in the uplink subframe; and the mapping, by the UE, the at least one of the ACK and the NACK to the REs in the second OFDM symbols, and overwriting at least one of the CQI, the PMI, and the data on the PUSCH that are carried on the REs in the second OFDM symbols includes: mapping, by the UE according to the set order, the at least one of the ACK and the NACK to an RE that is in the 1st OFDM symbol in the uplink subframe and that carries no RI, an RE that is in the 3rd OFDM symbol in the uplink subframe and that carries no RI, an RE that is in the 5th OFDM symbol in the uplink subframe and that carries no RI, and an RE that is in the 7th OFDM symbol in the uplink subframe and that carries no RI, and overwriting the at least one of the CQI, the PMI, and the data on the PUSCH that are carried on the RE in the 1st OFDM symbol, the RE in the 3rd OFDM symbol, the RE in the 5th OFDM symbol, and the RE in the 7th OFDM symbol.

With reference to the eleventh possible implementation manner of the first aspect, in a fourteenth possible implementation manner of the first aspect, the mapping, by the UE, the RI to the REs in the first OFDM symbols includes: mapping, by the UE according to a set order, the RI to an RE in the 1st OFDM symbol in the uplink subframe, an RE in the 2nd OFDM symbol in the uplink subframe, an RE in the 6th OFDM symbol in the uplink subframe, and an RE in the 7th OFDM symbol in the uplink subframe; and the mapping, by the UE, the at least one of the ACK and the NACK to the REs in the second OFDM symbols, and overwriting at least one of the CQI, the PMI, and the data on the PUSCH that are carried on the REs in the second OFDM symbols includes: according to the set order, first mapping, by the UE, a first part of the at least one of the ACK and the NACK to an RE in the 3rd OFDM symbol in the uplink subframe and an RE in the 5th OFDM symbol in the uplink subframe, then mapping a second part, except the first part, of the at least one of the ACK and the NACK to an RE that is in the 1st OFDM symbol in the uplink subframe and that carries no RI, an RE that is in the 2nd OFDM symbol in the uplink subframe and that carries no RI, an RE that is in the 6th OFDM symbol in the uplink subframe and that carries no RI, and an RE that is in the 7th OFDM symbol in the uplink subframe and that carries no RI, and overwriting the at least one of the CQI, the PMI, and the data on the PUSCH that are carried on the RE in the 1st OFDM symbol, the RE in the 2nd OFDM symbol, the RE in the 3rd OFDM symbol, the RE in the 5th OFDM symbol, the RE in the 6th OFDM symbol, and the RE in the 7th OFDM symbol.

With reference to the eleventh possible implementation manner of the first aspect, in a fifteenth possible implementation manner of the first aspect, the mapping, by the UE, the RI to the REs in the first OFDM symbols includes: according to a set order, first mapping, by the UE, a first part of the RI to an RE in the 1st OFDM symbol in the uplink subframe and an RE in the 7th OFDM symbol in the uplink subframe, and then mapping a second part, except the first part, of the RI to an RE in the 8th OFDM symbol in the uplink subframe and an RE in the 9th OFDM symbol in the uplink subframe; and the mapping, by the UE, the at least one of the ACK and the NACK to the REs in the second OFDM symbols, and overwriting at least one of the CQI, the PMI, and the data on the PUSCH that are carried on the REs in the second OFDM symbols includes: according to the set order, first mapping, by the UE, a first part of the at least one of the ACK and the NACK to an RE in the 3rd OFDM symbol in the uplink subframe and an RE in the 5th OFDM symbol in the uplink subframe, then mapping a second part, except the first part, of the at least one of the ACK and the NACK to an RE in the 2nd OFDM symbol in the uplink subframe and an RE in the 6th OFDM symbol in the uplink subframe, and overwriting the at least one of the CQI, the PMI, and the data on the PUSCH that are carried on the RE in the 2nd OFDM symbol, the RE in the 3rd OFDM symbol, the RE in the 5th OFDM symbol, and the RE in the 6th OFDM symbol.

With reference to the eleventh possible implementation manner of the first aspect, in a sixteenth possible implementation manner of the first aspect, the mapping, by the UE, the RI to the REs in the first OFDM symbols includes: according to a set order, first mapping, by the UE, a first part of the RI to an RE in the 1st OFDM symbol in the uplink subframe and an RE in the 7th OFDM symbol in the uplink subframe, and then mapping a second part, except the first part, of the RI to an RE in the 8th OFDM symbol in the uplink subframe and an RE in the 9th OFDM symbol in the uplink subframe; and the mapping, by the UE, the at least one of the ACK and the NACK to the REs in the second OFDM symbols, and overwriting at least one of the CQI, the PMI, and the data on the PUSCH that are carried on the REs in the second OFDM symbols includes: mapping, by the UE according to the set order, the at least one of the ACK and the NACK to an RE in the 2nd OFDM symbol in the uplink subframe, an RE in the 3rd OFDM symbol in the uplink subframe, an RE in the 5th OFDM symbol in the uplink subframe, and an RE in the 6th OFDM symbol in the uplink subframe, and overwriting the at least one of the CQI, the PMI, and the data on the PUSCH that are carried on the RE in the 2nd OFDM symbol, the RE in the 3rd OFDM symbol, the RE in the 5th OFDM symbol, and the RE in the 6th OFDM symbol.

With reference to the eleventh possible implementation manner of the first aspect, in a seventeenth possible implementation manner of the first aspect, the mapping, by the UE, the RI to the REs in the first OFDM symbols includes: mapping, by the UE according to a set order, the RI to an RE in the 1st OFDM symbol in the uplink subframe, an RE in the 7th OFDM symbol in the uplink subframe, an RE in the 8th OFDM symbol in the uplink subframe, and an RE in the 9th OFDM symbol in the uplink subframe; and the mapping, by the UE, the at least one of the ACK and the NACK to the REs in the second OFDM symbols, and overwriting at least one of the CQI, the PMI, and the data on the PUSCH that are carried on the REs in the second OFDM symbols includes: according to the set order, first mapping, by the UE, a first part of the at least one of the ACK and the NACK to an RE in the 3rd OFDM symbol in the uplink subframe and an RE in the 5th OFDM symbol in the uplink subframe, then mapping a second part, except the first part, of the at least one of the ACK and the NACK to an RE in the 2nd OFDM symbol in the uplink subframe and an RE in the 6th OFDM symbol in the uplink subframe, and overwriting the at least one of the CQI, the PMI, and the data on the PUSCH that are carried on the RE in the 2nd OFDM symbol, the RE in the 3rd OFDM symbol, the RE in the 5th OFDM symbol, and the RE in the 6th OFDM symbol.

With reference to any possible implementation manner of the fifth to the tenth implementation manners of the first aspect or any possible implementation manner of the twelfth to the seventeenth implementation manners of the first aspect, in an eighteenth possible implementation manner of the first aspect, the set order is an order from the last carrier to the first carrier in the uplink subframe and from an RE in the 1st OFDM symbol to an RE in the last OFDM symbol in each carrier, according to which data is carried on the REs in the uplink subframe, where the data includes at least one of the UCI and the UL DMRS.

With reference to any possible implementation manner of the fourth to the eighteenth implementation manners of the first aspect, in a nineteenth possible implementation manner of the first aspect, the method further includes: sending, by the UE, indication information to the base station, where the indication information is used to indicate locations, in a time-frequency resource of the uplink subframe, of REs occupied by the RI and the at least one of the ACK and the NACK.

With reference to the nineteenth possible implementation manner of the first aspect, in a twentieth possible implementation manner of the first aspect, the time-frequency resource includes at least one of the following resources: a resource block, a resource block pair, and a resource block group.

According to a second aspect, an embodiment of the present invention further provides an uplink control information transmission method. In a first uplink demodulation reference signal UL DMRS pattern, REs in one orthogonal frequency division multiplexing OFDM symbol in an uplink subframe are used to carry the UL DMRS; and the method includes: receiving, by a base station, an uplink subframe sent by user equipment UE, where resource elements REs in the uplink subframe carry uplink control information UCI according to the first uplink demodulation reference signal UL DMRS pattern, where an OFDM symbol in which the REs carrying the UCI are located is adjacent to the OFDM symbol in which the REs carrying the UL DMRS are located; and acquiring, by the base station according to the first UL DMRS pattern, the UCI carried in the uplink subframe.

In a first possible implementation manner of the second aspect, the UL DMRS is carried on REs in the 4th OFDM symbol in the uplink subframe, where the uplink subframe includes REs in 14 OFDM symbols.

With reference to the second aspect or the first possible implementation manner of the second aspect, in a second possible implementation manner of the second aspect, in the uplink subframe, an RE that carries neither UL DMRS nor UCI further carries at least one of the following: a channel quality indicator CQI, a precoding matrix indication PMI, and data on a physical uplink shared channel PUSCH.

With reference to the second aspect, or the first possible implementation manner of the second aspect, or the second possible implementation manner of the second aspect, in a third possible implementation manner of the first aspect, the UCI includes: a rank indication RI, and at least one of an acknowledgement ACK and a negative acknowledgement NACK; in the uplink subframe, the RI is carried on REs in the following at least two first OFDM symbols: the 1st OFDM symbol, the 2nd OFDM symbol, the 3rd OFDM symbol, the 5th OFDM symbol, the 6th OFDM symbol, the 7th OFDM symbol, the 8th OFDM symbol, and the 9th OFDM symbol; and in the uplink subframe, at least one of the ACK and the NACK is carried on REs in the following at least two second OFDM symbols: the 1st OFDM symbol, the 2nd OFDM symbol, the 3rd OFDM symbol, the 5th OFDM symbol, the 6th OFDM symbol, the 7th OFDM symbol, the 8th OFDM symbol, and the 9th OFDM symbol.

With reference to the third possible implementation manner of the second aspect, in a fourth possible implementation manner of the second aspect, the acquiring, by the base station according to the first UL DMRS pattern, the UCI carried in the uplink subframe includes: acquiring, by the base station, the RI carried on the REs in the first OFDM symbols; acquiring, by the base station, the at least one of the ACK and the NACK that is carried on the REs in the second OFDM symbols; and acquiring, by the base station, at least one of the CQI, the PMI, and the data on the PUSCH that is carried on a first RE, where the first RE is an RE that carries no UL DMRS, carries no RI, and carries no ACK or NACK.

With reference to the fourth possible implementation manner of the second aspect, in a fifth possible implementation manner of the second aspect, the acquiring, by the base station, the RI carried on the REs in the first OFDM symbols includes: acquiring, by the base station, a first part of the RI that is carried on an RE in the 2nd OFDM symbol in the uplink subframe and an RE in the 6th OFDM symbol in the uplink subframe, and a second part, except the first part, of the RI that is carried on an RE in the 1st OFDM symbol in the uplink subframe and an RE in the 7th OFDM symbol in the uplink subframe; and the acquiring, by the base station, the at least one of the ACK and the NACK that is carried on the REs in the second OFDM symbols includes: acquiring, by the base station, a first part of the at least one of the ACK and the NACK that is carried on an RE in the 3rd OFDM symbol in the uplink subframe and an RE in the 5th OFDM symbol in the uplink subframe, and a second part, except the first part, of the at least one of the ACK and the NACK that is carried on an RE in the 1st OFDM symbol in the uplink subframe and an RE in the 7th OFDM symbol in the uplink subframe.

With reference to the fourth possible implementation manner of the second aspect, in a sixth possible implementation manner of the second aspect, the acquiring, by the base station, the RI carried on the REs in the first OFDM symbols includes: acquiring, by the base station, a first part of the RI that is carried on an RE in the 2nd OFDM symbol in the uplink subframe and an RE in the 6th OFDM symbol in the uplink subframe, and a second part, except the first part, of the RI that is carried on an RE in the 1st OFDM symbol in the uplink subframe and an RE in the 7th OFDM symbol in the uplink subframe; and the acquiring, by the base station, the at least one of the ACK and the NACK that is carried on the REs in the second OFDM symbols includes: acquiring, by the base station, the at least one of the ACK and the NACK that is carried on an RE in the 1st OFDM symbol in the uplink subframe, an RE in the 3rd OFDM symbol in the uplink subframe, an RE in the 5th OFDM symbol in the uplink subframe, and an RE in the 7th OFDM symbol in the uplink subframe.

With reference to the fourth possible implementation manner of the second aspect, in a seventh possible implementation manner of the second aspect, the acquiring, by the base station, the RI carried on the REs in the first OFDM symbols includes: acquiring, by the base station, the RI carried on an RE in the 1st OFDM symbol in the uplink subframe, an RE in the 2nd OFDM symbol in the uplink subframe, an RE in the 6th OFDM symbol in the uplink subframe, and an RE in the 7th OFDM symbol in the uplink subframe; and the acquiring, by the base station, the at least one of the ACK and the NACK that is carried on the REs in the second OFDM symbols includes: acquiring, by the base station, a first part of the at least one of the ACK and the NACK that is carried on an RE in the 3rd OFDM symbol in the uplink subframe and an RE in the 5th OFDM symbol in the uplink subframe, and a second part, except the first part, of the at least one of the ACK and the NACK that is carried on an RE in the 1st OFDM symbol in the uplink subframe, an RE in the 2nd OFDM symbol in the uplink subframe, an RE in the 6th OFDM symbol in the uplink subframe, and an RE in the 7th OFDM symbol in the uplink subframe.

With reference to the fourth possible implementation manner of the second aspect, in an eighth possible implementation manner of the second aspect, the acquiring, by the base station, the RI carried on the REs in the first OFDM symbols includes: acquiring, by the base station, a first part of the RI that is carried on an RE in the 1st OFDM symbol in the uplink subframe and an RE in the 7th OFDM symbol in the uplink subframe, and a second part, except the first part, of the RI that is carried on an RE in the 8th OFDM symbol in the uplink subframe and an RE in the 9th OFDM symbol in the uplink subframe; and the acquiring, by the base station, the at least one of the ACK and the NACK that is carried on the REs in the second OFDM symbols includes: acquiring, by the base station, a first part of the at least one of the ACK and the NACK that is carried on an RE in the 3rd OFDM symbol in the uplink subframe and an RE in the 5th OFDM symbol in the uplink subframe, and a second part, except the first part, of the at least one of the ACK and the NACK that is carried on an RE in the 2nd OFDM symbol in the uplink subframe and an RE in the 6th OFDM symbol in the uplink subframe.

With reference to the fourth possible implementation manner of the second aspect, in a ninth possible implementation manner of the second aspect, the acquiring, by the base station, the RI carried on the REs in the first OFDM symbols includes: acquiring, by the base station, a first part of the RI that is carried on an RE in the 1st OFDM symbol in the uplink subframe and an RE in the 7th OFDM symbol in the uplink subframe, and a second part, except the first part, of the RI that is carried on an RE in the 8th OFDM symbol in the uplink subframe and an RE in the 9th OFDM symbol in the uplink subframe; and the acquiring, by the base station, the at least one of the ACK and the NACK that is carried on the REs in the second OFDM symbols includes: acquiring, by the base station, the at least one of the ACK and the NACK that is carried on an RE in the 2nd OFDM symbol in the uplink subframe, an RE in the 3rd OFDM symbol in the uplink subframe, an RE in the 5th OFDM symbol in the uplink subframe, and an RE in the 6th OFDM symbol in the uplink subframe.

With reference to the fourth possible implementation manner of the second aspect, in a tenth possible implementation manner of the second aspect, the acquiring, by the base station, the RI carried on the REs in the first OFDM symbols includes: acquiring, by the base station, the RI carried on an RE in the 1st OFDM symbol in the uplink subframe, an RE in the 7th OFDM symbol in the uplink subframe, an RE in the 8th OFDM symbol in the uplink subframe, and an RE in the 9th OFDM symbol in the uplink subframe; and the acquiring, by the base station, the at least one of the ACK and the NACK that is carried on the REs in the second OFDM symbols includes: acquiring, by the base station, a first part of the at least one of the ACK and the NACK that is carried on an RE in the 3rd OFDM symbol in the uplink subframe and an RE in the 5th OFDM symbol in the uplink subframe, and a second part, except the first part, of the at least one of the ACK and the NACK that is carried on REs in the 2nd OFDM symbol and the 6th OFDM symbol that are in the uplink subframe.

With reference to any possible implementation manner of the fifth to the tenth implementation manners of the second aspect, in an eleventh possible implementation manner of the second aspect, the method further includes: receiving, by the base station, indication information sent by the UE, where the indication information is used to indicate locations, in a time-frequency resource of the uplink subframe, of REs occupied by the RI and the at least one of the ACK and the NACK; where the acquiring, by the base station, the RI carried on the REs in the first OFDM symbols includes: acquiring, by the base station according to the indication information, the RI carried on the REs in the first OFDM symbols; and the acquiring, by the base station, the at least one of the ACK and the NACK that is carried on the REs in the second OFDM symbols includes: acquiring, by the base station according to the indication information, the at least one of the ACK and the NACK that is carried on the REs in the second OFDM symbols.

With reference to the eleventh possible implementation manner of the second aspect, in a twelfth possible implementation manner of the second aspect, the time-frequency resource includes at least one of the following resources: a resource block, a resource block pair, and a resource block group.

According to a third aspect, an embodiment of the present invention further provides an uplink control information transmission method. In a first uplink demodulation reference signal UL DMRS pattern, resource elements REs in one orthogonal frequency division multiplexing OFDM symbol in a first uplink subframe are used to carry a UL DMRS, or some REs in two OFDM symbols in a first uplink subframe are used to carry a UL DMRS; in a second UL DMRS pattern, all REs in two OFDM symbols in a second uplink subframe are used to carry a UL DMRS; and the method includes: receiving, by user equipment UE, trigger information sent by a base station, where the trigger information is used to trigger the UE to switch from sending the first uplink subframe according to the first UL DMRS pattern to sending the second uplink subframe according to the second UL DMRS pattern; and according to the trigger information and according to the second UL DMRS pattern, mapping, by the user equipment UE, uplink control information UCI to the second uplink subframe, and sending the second uplink subframe to the base station.

In a first possible implementation manner of the third aspect, the trigger information is downlink control information DCI, where the DCI includes a one-bit indicator, and the one-bit indicator is used to trigger the UE to switch from sending the first uplink subframe according to the first UL DMRS pattern to sending the second uplink subframe according to the second UL DMRS pattern.

In a second possible implementation manner of the third aspect, the trigger information is a DCI indication corresponding to the uplink subframe, where a channel state information request CSI request in the DCI indication is used to trigger the UE to switch from sending the first uplink subframe according to the first UL DMRS pattern to sending the second uplink subframe according to the second UL DMRS pattern.

With reference to the second possible implementation manner of the third aspect, in a third possible implementation manner of the third aspect, the DCI indication is carried on a physical downlink control channel PDCCH, and a format of the PDCCH is a DCI format used for uplink scheduling.

With reference to the third possible implementation manner of the third aspect, in a fourth possible implementation manner of the third aspect, the DCI format used for uplink scheduling includes DCI format 0 or DCI format 4.

In a fifth possible implementation manner of the third aspect, the first uplink subframe is a subframe that carries a physical uplink control channel PUCCH, and the PUCCH and a physical uplink shared channel PUSCH cannot be transmitted in the first uplink subframe at the same time; and the trigger information is further used to instruct the UE to send scheduling information of the PUSCH in the first uplink subframe.

In a sixth possible implementation manner of the third aspect, the second uplink subframe is a subframe that carries a physical uplink control channel PUCCH, and the PUCCH and a physical uplink shared channel PUSCH cannot be transmitted in the second uplink subframe at the same time; and the trigger information is further used to instruct the UE to send scheduling information of the PUSCH in the second uplink subframe.

According to a fourth aspect, an embodiment of the present invention further provides an uplink control information transmission method. In a first uplink demodulation reference signal UL DMRS pattern, resource elements REs in one orthogonal frequency division multiplexing OFDM symbol in a first uplink subframe are used to carry a UL DMRS, or some REs in two OFDM symbols in a first uplink subframe are used to carry a UL DMRS; in a second UL DMRS pattern, all REs in two OFDM symbols in a second uplink subframe are used to carry a UL DMRS; and the method includes: sending, by a base station, trigger information to user equipment UE, where the trigger information is used to trigger the UE to switch from sending the first uplink subframe according to the first UL DMRS pattern to sending the second uplink subframe according to the second UL DMRS pattern; receiving, by the base station, the second uplink subframe sent by the UE according to the second UL DMRS pattern; and acquiring, by the base station according to the second UL DMRS pattern, the UCI carried in the second uplink subframe.

In a first possible implementation manner of the fourth aspect, the trigger information is downlink control information DCI, where the DCI includes a one-bit indicator, and the one-bit indicator is used to trigger the UE to switch from sending the first uplink subframe according to the first UL DMRS pattern to sending the second uplink subframe according to the second UL DMRS pattern.

In a second possible implementation manner of the fourth aspect, the trigger information is a DCI indication corresponding to the uplink subframe, where a channel state information request CSI request in the DCI indication is used to trigger the UE to switch from sending the first uplink subframe according to the first UL DMRS pattern to sending the second uplink subframe according to the second UL DMRS pattern.

With reference to the second possible implementation manner of the fourth aspect, in a third possible implementation manner of the fourth aspect, the DCI indication is carried on a physical downlink control channel PDCCH, and a format of the PDCCH is a DCI format used for uplink scheduling.

With reference to the third possible implementation manner of the fourth aspect, in a fourth possible implementation manner of the fourth aspect, the DCI format used for uplink scheduling includes at least one of the following: DCI format 0 or DCI format 4.

In a fifth possible implementation manner of the fourth aspect, the first uplink subframe is a subframe that carries a physical uplink control channel PUCCH, and the PUCCH and a physical uplink shared channel PUSCH cannot be transmitted in the first uplink subframe at the same time; and the trigger information is further used to instruct the UE to send scheduling information of the PUSCH in the first uplink subframe.

In a sixth possible implementation manner of the fourth aspect, the second uplink subframe is a subframe that carries a physical uplink control channel PUCCH, and the PUCCH and a physical uplink shared channel PUSCH cannot be transmitted in the second uplink subframe at the same time; and the trigger information is further used to instruct the UE to send scheduling information of the PUSCH in the second uplink subframe.

According to a fifth aspect, an embodiment of the present invention provides user equipment UE. In a first uplink demodulation reference signal UL DMRS pattern, resource elements REs in one orthogonal frequency division multiplexing OFDM symbol in an uplink subframe are used to carry the UL DMRS; and the UE includes: a carrying unit, configured to map uplink control information UCI to REs in the uplink subframe according to the first UL DMRS pattern, where an OFDM symbol in which the REs carrying the UCI are located is adjacent to the OFDM symbol in which the REs carrying the UL DMRS are located; and a sending unit, configured to send, to a base station, the uplink subframe that carries the UCI and that is obtained by the carrying unit.

In a first possible implementation manner of the fifth aspect, the UL DMRS is carried on REs in the 4th OFDM symbol in the uplink subframe, where the uplink subframe includes 14 OFDM symbols.

With reference to the fifth aspect or the first possible implementation manner of the fifth aspect, in a second possible implementation manner of the fifth aspect, in the uplink subframe, an RE that carries neither UL DMRS nor UCI further carries at least one of the following: a channel quality indicator CQI, a precoding matrix indication PMI, and data on a physical uplink shared channel PUSCH.

With reference to the fifth aspect, or the first possible implementation manner of the fifth aspect, or the second possible implementation manner of the fifth aspect, in a third possible implementation manner of the fifth aspect, the UCI includes: a rank indication RI, and at least one of an acknowledgement ACK and a negative acknowledgement NACK; in the uplink subframe, the RI is carried on REs in the following at least two first OFDM symbols: the 1st OFDM symbol, the 2nd OFDM symbol, the 3rd OFDM symbol, the 5th OFDM symbol, the 6th OFDM symbol, the 7th OFDM symbol, the 8th OFDM symbol, and the 9th OFDM symbol; and in the uplink subframe, at least one of the ACK and the NACK is carried on REs in the following at least two second OFDM symbols: the 1st OFDM symbol, the 2nd OFDM symbol, the 3rd OFDM symbol, the 5th OFDM symbol, the 6th OFDM symbol, the 7th OFDM symbol, the 8th OFDM symbol, and the 9th OFDM symbol.

With reference to the third possible implementation manner of the fifth aspect, in a fourth possible implementation manner of the fifth aspect, the carrying unit is specifically configured to: map the RI to the REs in the first OFDM symbols, map the at least one of the ACK and the NACK to the REs in the second OFDM symbols, and map at least one of the CQI, the PMI, and the data on the PUSCH to a first RE, where the first RE is an RE that carries no UL DMRS, carries no RI, and carries no ACK or NACK.

With reference to the fourth possible implementation manner of the fifth aspect, in a fifth possible implementation manner of the fifth aspect, the carrying unit is specifically configured to: according to a set order, first map a first part of the RI to an RE in the 2nd OFDM symbol in the uplink subframe and an RE in the 6th OFDM symbol in the uplink subframe, and then map a second part, except the first part, of the RI to an RE in the 1st OFDM symbol in the uplink subframe and an RE in the 7th OFDM symbol in the uplink subframe; and according to the set order, first map a first part of the at least one of the ACK and the NACK to an RE in the 3rd OFDM symbol in the uplink subframe and an RE in the 5th OFDM symbol in the uplink subframe, and then map a second part, except the first part, of the at least one of the ACK and the NACK to REs that are in the 1st OFDM symbol and the 7th symbol of the uplink subframe and that carry no RI.

With reference to the fourth possible implementation manner of the fifth aspect, in a sixth possible implementation manner of the fifth aspect, the carrying unit is specifically configured to: according to a set order, first map a first part of the RI to an RE in the 2nd OFDM symbol in the uplink subframe and an RE in the 6th OFDM symbol in the uplink subframe, and then map a second part, except the first part, of the RI to an RE in the 1st OFDM symbol in the uplink subframe and an RE in the 7th OFDM symbol in the uplink subframe; and map, according to the set order, the at least one of the ACK and the NACK to an RE that is in the 1st OFDM symbol in the uplink subframe and that carries no RI, an RE that is in the 3rd OFDM symbol in the uplink subframe and that carries no RI, an RE that is in the 5th OFDM symbol in the uplink subframe and that carries no RI, and an RE that is in the 7th OFDM symbol in the uplink subframe and that carries no RI.

With reference to the fourth possible implementation manner of the fifth aspect, in a seventh possible implementation manner of the fifth aspect, the carrying unit is specifically configured to: map, according to a set order, the RI to an RE in the 1st OFDM symbol in the uplink subframe, an RE in the 2nd OFDM symbol in the uplink subframe, an RE in the 6th OFDM symbol in the uplink subframe, and an RE in the 7th OFDM symbol in the uplink subframe; and according to the set order, first map a first part of the at least one of the ACK and the NACK to an RE in the 3rd OFDM symbol in the uplink subframe and an RE in the 5th OFDM symbol in the uplink subframe, and then map a second part, except the first part, of the at least one of the ACK and the NACK to an RE that is in the 1st OFDM symbol in the uplink subframe and that carries no RI, an RE that is in the 2nd OFDM symbol in the uplink subframe and that carries no RI, an RE that is in the 6th OFDM symbol in the uplink subframe and that carries no RI, and an RE that is in the 7th OFDM symbol in the uplink subframe and that carries no RI.

With reference to the fourth possible implementation manner of the fifth aspect, in an eighth possible implementation manner of the fifth aspect, the carrying unit is specifically configured to: according to a set order, first map a first part of the RI to an RE in the 1st OFDM symbol in the uplink subframe and an RE in the 7th OFDM symbol in the uplink subframe, and then map a second part, except the first part, of the RI to an RE in the 8th OFDM symbol in the uplink subframe and an RE in the 9th OFDM symbol in the uplink subframe; and according to the set order, first map a first part of the at least one of the ACK and the NACK to an RE in the 3rd OFDM symbol in the uplink subframe and an RE in the 5th OFDM symbol in the uplink subframe, and then map a second part, except the first part, of the at least one of the ACK and the NACK to an RE in the 2nd OFDM symbol in the uplink subframe and an RE in the 6th OFDM symbol in the uplink subframe.

With reference to the fourth possible implementation manner of the fifth aspect, in a ninth possible implementation manner of the fifth aspect, the carrying unit is specifically configured to: according to a set order, first map a first part of the RI to an RE in the 1st OFDM symbol in the uplink subframe and an RE in the 7th OFDM symbol in the uplink subframe, and then map a second part, except the first part, of the RI to an RE in the 8th OFDM symbol in the uplink subframe and an RE in the 9th OFDM symbol in the uplink subframe; and map, according to the set order, the at least one of the ACK and the NACK to an RE in the 2nd OFDM symbol in the uplink subframe, an RE in the 3rd OFDM symbol in the uplink subframe, an RE in the 5th OFDM symbol in the uplink subframe, and an RE in the 6th OFDM symbol in the uplink subframe.

With reference to the fourth possible implementation manner of the fifth aspect, in a tenth possible implementation manner of the fifth aspect, the carrying unit is specifically configured to: map, according to a set order, the RI to an RE in the 1st OFDM symbol in the uplink subframe, an RE in the 7th OFDM symbol in the uplink subframe, an RE in the 8th OFDM symbol in the uplink subframe, and an RE in the 9th OFDM symbol in the uplink subframe; and according to the set order, first map a first part of the at least one of the ACK and the NACK to an RE in the 3rd OFDM symbol in the uplink subframe and an RE in the 5th OFDM symbol in the uplink subframe, and then map a second part, except the first part, of the at least one of the ACK and the NACK to an RE in the 2nd OFDM symbol in the uplink subframe and an RE in the 6th OFDM symbol in the uplink subframe.

With reference to the third possible implementation manner of the fifth aspect, in an eleventh possible implementation manner of the fifth aspect, the carrying unit is specifically configured to: map the RI to the REs in the first OFDM symbols; map at least one of the CQI, the PMI, and the data on the PUSCH to an RE that carries neither UL DMRS nor RI; and map the at least one of the ACK and the NACK to the REs in the second OFDM symbols, and overwrite at least one of the CQI, the PMI, and the data on the PUSCH that are carried on the REs in the second OFDM symbols.

With reference to the eleventh possible implementation manner of the fifth aspect, in a twelfth possible implementation manner of the fifth aspect, the carrying unit is specifically configured to: according to a set order, first map a first part of the RI to an RE in the 2nd OFDM symbol in the uplink subframe and an RE in the 6th OFDM symbol in the uplink subframe, and then map a second part, except the first part, of the RI to an RE in the 1st OFDM symbol in the uplink subframe and an RE in the 7th OFDM symbol in the uplink subframe; and according to the set order, first map a first part of the at least one of the ACK and the NACK to an RE in the 3rd OFDM symbol in the uplink subframe and an RE in the 5th OFDM symbol in the uplink subframe, then map a second part, except the first part, of the at least one of the ACK and the NACK to REs that are in the 1st OFDM symbol and the 7th symbol of the uplink subframe and that carry no RI, and overwrite the at least one of the CQI, the PMI, and the data on the PUSCH that are carried on the RE in the 1st OFDM symbol, the RE in the 3rd OFDM symbol, the RE in the 5th OFDM symbol, and the RE in the 7th OFDM symbol.

With reference to the eleventh possible implementation manner of the fifth aspect, in a thirteenth possible implementation manner of the fifth aspect, the carrying unit is specifically configured to: according to a set order, first map a first part of the RI to an RE in the 2nd OFDM symbol in the uplink subframe and an RE in the 6th OFDM symbol in the uplink subframe, and then map a second part, except the first part, of the RI to an RE in the 1st OFDM symbol in the uplink subframe and an RE in the 7th OFDM symbol in the uplink subframe; and map, according to the set order, the at least one of the ACK and the NACK to an RE that is in the 1st OFDM symbol in the uplink subframe and that carries no RI, an RE that is in the 3rd OFDM symbol in the uplink subframe and that carries no RI, an RE that is in the 5th OFDM symbol in the uplink subframe and that carries no RI, and an RE that is in the 7th OFDM symbol in the uplink subframe and that carries no RI, and overwrite the at least one of the CQI, the PMI, and the data on the PUSCH that are carried on the RE in the 1st OFDM symbol, the RE in the 3rd OFDM symbol, the RE in the 5th OFDM symbol, and the RE in the 7th OFDM symbol.

With reference to the eleventh possible implementation manner of the fifth aspect, in a fourteenth possible implementation manner of the fifth aspect, the carrying unit is specifically configured to: map, according to a set order, the RI to an RE in the 1st OFDM symbol in the uplink subframe, an RE in the 2nd OFDM symbol in the uplink subframe, an RE in the 6th OFDM symbol in the uplink subframe, and an RE in the 7th OFDM symbol in the uplink subframe; and according to the set order, first map a first part of the at least one of the ACK and the NACK to an RE in the 3rd OFDM symbol in the uplink subframe and an RE in the 5th OFDM symbol in the uplink subframe, then map a second part, except the first part, of the at least one of the ACK and the NACK to an RE that is in the 1st OFDM symbol in the uplink subframe and that carries no RI, an RE that is in the 2nd OFDM symbol in the uplink subframe and that carries no RI, an RE that is in the 6th OFDM symbol in the uplink subframe and that carries no RI, and an RE that is in the 7th OFDM symbol in the uplink subframe and that carries no RI, and overwrite the at least one of the CQI, the PMI, and the data on the PUSCH that are carried on the RE in the 1st OFDM symbol, the RE in the 2nd OFDM symbol, the RE in the 3rd OFDM symbol, the RE in the 5th OFDM symbol, the RE in the 6th OFDM symbol, and the RE in the 7th OFDM symbol.

With reference to the eleventh possible implementation manner of the fifth aspect, in a fifteenth possible implementation manner of the fifth aspect, the carrying unit is specifically configured to: according to a set order, first map a first part of the RI to an RE in the 1st OFDM symbol in the uplink subframe and an RE in the 7th OFDM symbol in the uplink subframe, and then map a second part, except the first part, of the RI to an RE in the 8th OFDM symbol in the uplink subframe and an RE in the 9th OFDM symbol in the uplink subframe; and according to the set order, first map a first part of the at least one of the ACK and the NACK to an RE in the 3rd OFDM symbol in the uplink subframe and an RE in the 5th OFDM symbol in the uplink subframe, then map a second part, except the first part, of the at least one of the ACK and the NACK to an RE in the 2nd OFDM symbol in the uplink subframe and an RE in the 6th OFDM symbol in the uplink subframe, and overwrite the at least one of the CQI, the PMI, and the data on the PUSCH that are carried on the RE in the 2nd OFDM symbol, the RE in the 3rd OFDM symbol, the RE in the 5th OFDM symbol, and the RE in the 6th OFDM symbol.

With reference to the eleventh possible implementation manner of the fifth aspect, in a sixteenth possible implementation manner of the fifth aspect, the carrying unit is specifically configured to: according to a set order, first map a first part of the RI to an RE in the 1st OFDM symbol in the uplink subframe and an RE in the 7th OFDM symbol in the uplink subframe, and then map a second part, except the first part, of the RI to an RE in the 8th OFDM symbol in the uplink subframe and an RE in the 9th OFDM symbol in the uplink subframe; and map, according to the set order, the at least one of the ACK and the NACK to an RE in the 2nd OFDM symbol in the uplink subframe, an RE in the 3rd OFDM symbol in the uplink subframe, an RE in the 5th OFDM symbol in the uplink subframe, and an RE in the 6th OFDM symbol in the uplink subframe, and overwrite the at least one of the CQI, the PMI, and the data on the PUSCH that are carried on the RE in the 2nd OFDM symbol, the RE in the 3rd OFDM symbol, the RE in the 5th OFDM symbol, and the RE in the 6th OFDM symbol.

With reference to the eleventh possible implementation manner of the fifth aspect, in a seventeenth possible implementation manner of the fifth aspect, the carrying unit is specifically configured to: map, according to a set order, the RI to an RE in the 1st OFDM symbol in the uplink subframe, an RE in the 7th OFDM symbol in the uplink subframe, an RE in the 8th OFDM symbol in the uplink subframe, and an RE in the 9th OFDM symbol in the uplink subframe; and according to the set order, first map a first part of the at least one of the ACK and the NACK to an RE in the 3rd OFDM symbol in the uplink subframe and an RE in the 5th OFDM symbol in the uplink subframe, then map a second part, except the first part, of the at least one of the ACK and the NACK to an RE in the 2nd OFDM symbol in the uplink subframe and an RE in the 6th OFDM symbol in the uplink subframe, and overwrite the at least one of the CQI, the PMI, and the data on the PUSCH that are carried on the RE in the 2nd OFDM symbol, the RE in the 3rd OFDM symbol, the RE in the 5th OFDM symbol, and the RE in the 6th OFDM symbol.

With reference to any possible implementation manner of the fifth to the tenth implementation manners of the fifth aspect or any possible implementation manner of the twelfth to the seventeenth implementation manners of the fifth aspect, in an eighteenth possible implementation manner of the fifth aspect, the set order is an order from the last carrier to the first carrier in the uplink subframe and from an RE in the 1st OFDM symbol to an RE in the last OFDM symbol in each carrier, according to which data is carried on the REs in the uplink subframe, where the data includes at least one of the UCI and the UL DMRS.

With reference to any possible implementation manner of the fourth to the eighteenth implementation manners of the fifth aspect, in a nineteenth possible implementation manner of the first aspect, the sending unit is further configured to send indication information to the base station, where the indication information is used to indicate locations, in a time-frequency resource of the uplink subframe, of REs occupied by the RI and the at least one of the ACK and the NACK.

With reference to the nineteenth possible implementation manner of the fifth aspect, in a twentieth possible implementation manner of the fifth aspect, the time-frequency resource includes at least one of the following resources: a resource block, a resource block pair, and a resource block group.

According to a sixth aspect, an embodiment of the present invention provides a base station. In a first uplink demodulation reference signal UL DMRS pattern, REs in one orthogonal frequency division multiplexing OFDM symbol in an uplink subframe are used to carry the UL DMRS. The base station includes: a receiving unit, configured to receive an uplink subframe sent by user equipment UE, where resource elements REs in the uplink subframe carry uplink control information UCI according to the first uplink demodulation reference signal UL DMRS pattern, where an OFDM symbol in which the REs carrying the UCI are located is adjacent to the OFDM symbol in which the REs carrying the UL DMRS are located; and an acquiring unit, configured to acquire, according to the first UL DMRS pattern, the UCI carried in the uplink subframe received by the receiving unit.

In a first possible implementation manner of the sixth aspect, the UL DMRS is carried on REs in the 4th OFDM symbol in the uplink subframe, where the uplink subframe includes REs in 14 OFDM symbols.

With reference to the sixth aspect or the first possible implementation manner of the sixth aspect, in a second possible implementation manner of the sixth aspect, in the uplink subframe, an RE that carries neither UL DMRS nor UCI further carries at least one of the following: a channel quality indicator CQI, a precoding matrix indication PMI, and data on a physical uplink shared channel PUSCH.

With reference to the sixth aspect, or the first possible implementation manner of the sixth aspect, or the second possible implementation manner of the sixth aspect, in a third possible implementation manner of the sixth aspect, the UCI includes: a rank indication RI, and at least one of an acknowledgement ACK and a negative acknowledgement NACK; in the uplink subframe, the RI is carried on REs in the following at least two first OFDM symbols: the 1st OFDM symbol, the 2nd OFDM symbol, the 3rd OFDM symbol, the 5th OFDM symbol, the 6th OFDM symbol, the 7th OFDM symbol, the 8th OFDM symbol, and the 9th OFDM symbol; and in the uplink subframe, at least one of the ACK and the NACK is carried on REs in the following at least two second OFDM symbols: the 1st OFDM symbol, the 2nd OFDM symbol, the 3rd OFDM symbol, the 5th OFDM symbol, the 6th OFDM symbol, the 7th OFDM symbol, the 8th OFDM symbol, and the 9th OFDM symbol.

With reference to the third possible implementation manner of the sixth aspect, in a fourth possible implementation manner of the sixth aspect, the acquiring unit is specifically configured to: acquire the RI carried on the REs in the first OFDM symbols; acquire the at least one of the ACK and the NACK that is carried on the REs in the second OFDM symbols; and acquire at least one of the CQI, the PMI, and the data on the PUSCH that is carried on a first RE, where the first RE is an RE that carries no UL DMRS, carries no RI, and carries no ACK or NACK.

With reference to the fourth possible implementation manner of the sixth aspect, in a fifth possible implementation manner of the sixth aspect, the acquiring unit is specifically configured to: acquire a first part of the RI that is carried on an RE in the 2nd OFDM symbol in the uplink subframe and an RE in the 6th OFDM symbol in the uplink subframe, and a second part, except the first part, of the RI that is carried on an RE in the 1st OFDM symbol in the uplink subframe and an RE in the 7th OFDM symbol in the uplink subframe; and acquire a first part of the at least one of the ACK and the NACK that is carried on an RE in the 3rd OFDM symbol in the uplink subframe and an RE in the 5th OFDM symbol in the uplink subframe, and a second part, except the first part, of the at least one of the ACK and the NACK that is carried on an RE in the 1st OFDM symbol in the uplink subframe and an RE in the 7th OFDM symbol in the uplink subframe.

With reference to the fourth possible implementation manner of the sixth aspect, in a sixth possible implementation manner of the sixth aspect, the acquiring unit is specifically configured to: acquire a first part of the RI that is carried on an RE in the 2nd OFDM symbol in the uplink subframe and an RE in the 6th OFDM symbol in the uplink subframe, and a second part, except the first part, of the RI that is carried on an RE in the 1st OFDM symbol in the uplink subframe and an RE in the 7th OFDM symbol in the uplink subframe; and acquire the at least one of the ACK and the NACK that is carried on an RE in the 1st OFDM symbol in the uplink subframe, an RE in the 3rd OFDM symbol in the uplink subframe, an RE in the 5th OFDM symbol in the uplink subframe, and an RE in the 7th OFDM symbol in the uplink subframe.

With reference to the fourth possible implementation manner of the sixth aspect, in a seventh possible implementation manner of the sixth aspect, the acquiring unit is specifically configured to: acquire the RI carried on an RE in the 1st OFDM symbol in the uplink subframe, an RE in the 2nd OFDM symbol in the uplink subframe, an RE in the 6th OFDM symbol in the uplink subframe, and an RE in the 7th OFDM symbol in the uplink subframe; and acquire a first part of the at least one of the ACK and the NACK that is carried on an RE in the 3rd OFDM symbol in the uplink subframe and an RE in the 5th OFDM symbol in the uplink subframe, and a second part, except the first part, of the at least one of the ACK and the NACK that is carried on an RE in the 1st OFDM symbol in the uplink subframe, an RE in the 2nd OFDM symbol in the uplink subframe, an RE in the 6th OFDM symbol in the uplink subframe, and an RE in the 7th OFDM symbol in the uplink subframe.

With reference to the fourth possible implementation manner of the sixth aspect, in an eighth possible implementation manner of the sixth aspect, the acquiring unit is specifically configured to: acquire a first part of the RI that is carried on an RE in the 1st OFDM symbol in the uplink subframe and an RE in the 7th OFDM symbol in the uplink subframe, and a second part, except the first part, of the RI that is carried on an RE in the 8th OFDM symbol in the uplink subframe and an RE in the 9th OFDM symbol in the uplink subframe; and acquire a first part of the at least one of the ACK and the NACK that is carried on an RE in the 3rd OFDM symbol in the uplink subframe and an RE in the 5th OFDM symbol in the uplink subframe, and a second part, except the first part, of the at least one of the ACK and the NACK that is carried on an RE in the 2nd OFDM symbol in the uplink subframe and an RE in the 6th OFDM symbol in the uplink subframe.

With reference to the fourth possible implementation manner of the sixth aspect, in a ninth possible implementation manner of the sixth aspect, the acquiring unit is specifically configured to: acquire a first part of the RI that is carried on an RE in the 1st OFDM symbol in the uplink subframe and an RE in the 7th OFDM symbol in the uplink subframe, and a second part, except the first part, of the RI that is carried on an RE in the 8th OFDM symbol in the uplink subframe and an RE in the 9th OFDM symbol in the uplink subframe; and acquire the at least one of the ACK and the NACK that is carried on an RE in the 2nd OFDM symbol in the uplink subframe, an RE in the 3rd OFDM symbol in the uplink subframe, an RE in the 5th OFDM symbol in the uplink subframe, and an RE in the 6th OFDM symbol in the uplink subframe.

With reference to the fourth possible implementation manner of the sixth aspect, in a tenth possible implementation manner of the sixth aspect, the acquiring unit is specifically configured to: acquire the RI carried on an RE in the 1st OFDM symbol in the uplink subframe, an RE in the 7th OFDM symbol in the uplink subframe, an RE in the 8th OFDM symbol in the uplink subframe, and an RE in the 9th OFDM symbol in the uplink subframe; and acquire a first part of the at least one of the ACK and the NACK that is carried on an RE in the 3rd OFDM symbol in the uplink subframe and an RE in the 5th OFDM symbol in the uplink subframe, and a second part, except the first part, of the at least one of the ACK and the NACK that is carried on REs in the 2nd OFDM symbol and the 6th OFDM symbol that are in the uplink subframe.

With reference to any possible implementation manner of the fifth to the tenth implementation manners of the sixth aspect, in an eleventh possible implementation manner of the sixth aspect, the receiving unit is further configured to receive indication information sent by the UE, where the indication information is used to indicate locations, in a time-frequency resource of the uplink subframe, of REs occupied by the RI and the at least one of the ACK and the NACK; and the acquiring unit is specifically configured to: acquire, according to the indication information received by the receiving unit, the RI carried on the REs in the first OFDM symbols; and acquire, according to the indication information received by the receiving unit, the at least one of the ACK and the NACK that is carried on the REs in the second OFDM symbols.

With reference to the eleventh possible implementation manner of the sixth aspect, in a twelfth possible implementation manner of the sixth aspect, the time-frequency resource includes at least one of the following resources: a resource block, a resource block pair, and a resource block group.

According to a seventh aspect, an embodiment of the present invention further provides user equipment UE. In a first uplink demodulation reference signal UL DMRS pattern, resource elements REs in one orthogonal frequency division multiplexing OFDM symbol in a first uplink subframe are used to carry a UL DMRS, or some REs in two OFDM symbols in a first uplink subframe are used to carry a UL DMRS; in a second UL DMRS pattern, all REs in two OFDM symbols in a second uplink subframe are used to carry a UL DMRS. The UE includes: a receiving unit, configured to receive trigger information sent by a base station, where the trigger information is used to trigger the UE to switch from sending the first uplink subframe according to the first UL DMRS pattern to sending the second uplink subframe according to the second UL DMRS pattern; and a sending unit, configured to: according to the trigger information received by the receiving unit and according to the second UL DMRS pattern, map uplink control information UCI to the second uplink subframe, and send the second uplink subframe to the base station.

In a first possible implementation manner of the seventh aspect, the trigger information is downlink control information DCI, where the DCI includes a one-bit indicator, and the one-bit indicator is used to trigger the UE to switch from sending the first uplink subframe according to the first UL DMRS pattern to sending the second uplink subframe according to the second UL DMRS pattern.

In a second possible implementation manner of the seventh aspect, the trigger information is a DCI indication corresponding to the uplink subframe, where a channel state information request CSI request in the DCI indication is used to trigger the UE to switch from sending the first uplink subframe according to the first UL DMRS pattern to sending the second uplink subframe according to the second UL DMRS pattern.

With reference to the second possible implementation manner of the seventh aspect, in a third possible implementation manner of the seventh aspect, the DCI indication is carried on a physical downlink control channel PDCCH, and a format of the PDCCH is a DCI format used for uplink scheduling.

With reference to the third possible implementation manner of the seventh aspect, in a fourth possible implementation manner of the seventh aspect, the DCI format used for uplink scheduling includes DCI format 0 or DCI format 4.

In a fifth possible implementation manner of the seventh aspect, the first uplink subframe is a subframe that carries a physical uplink control channel PUCCH, and the PUCCH and a physical uplink shared channel PUSCH cannot be transmitted in the first uplink subframe at the same time; and the trigger information is further used to instruct the UE to send scheduling information of the PUSCH in the first uplink subframe.

In a sixth possible implementation manner of the seventh aspect, the second uplink subframe is a subframe that carries a physical uplink control channel PUCCH, and the PUCCH and a physical uplink shared channel PUSCH cannot be transmitted in the second uplink subframe at the same time; and the trigger information is further used to instruct the UE to send scheduling information of the PUSCH in the second uplink subframe.

According to an eighth aspect, an embodiment of the present invention further provides a base station. In a first uplink demodulation reference signal UL DMRS pattern, resource elements REs in one orthogonal frequency division multiplexing OFDM symbol in a first uplink subframe are used to carry a UL DMRS, or some REs in two OFDM symbols in a first uplink subframe are used to carry a UL DMRS; in a second UL DMRS pattern, all REs in two OFDM symbols in a second uplink subframe are used to carry a UL DMRS. The base station includes: a sending unit, configured to send trigger information to user equipment UE, where the trigger information is used to trigger the UE to switch from sending the first uplink subframe according to the first UL DMRS pattern to sending the second uplink subframe according to the second UL DMRS pattern; a receiving unit, configured to receive the second uplink subframe sent by the UE according to the second UL DMRS pattern; and an acquiring unit, configured to acquire, according to the second UL DMRS pattern, the UCI carried in the second uplink subframe received by the receiving unit.

In a first possible implementation manner of the eighth aspect, the trigger information is downlink control information DCI, where the DCI includes a one-bit indicator, and the one-bit indicator is used to trigger the UE to switch from sending the first uplink subframe according to the first UL DMRS pattern to sending the second uplink subframe according to the second UL DMRS pattern.

In a second possible implementation manner of the eighth aspect, the trigger information is a DCI indication corresponding to the uplink subframe, where a channel state information request CSI request in the DCI indication is used to trigger the UE to switch from sending the first uplink subframe according to the first UL DMRS pattern to sending the second uplink subframe according to the second UL DMRS pattern.

With reference to the second possible implementation manner of the eighth aspect, in a third possible implementation manner of the eighth aspect, the DCI indication is carried on a physical downlink control channel PDCCH, and a format of the PDCCH is a DCI format used for uplink scheduling.

With reference to the third possible implementation manner of the eighth aspect, in a fourth possible implementation manner of the eighth aspect, the DCI format used for uplink scheduling includes at least one of the following: DCI format 0 or DCI format 4.

In a fifth possible implementation manner of the eighth aspect, the first uplink subframe is a subframe that carries a physical uplink control channel PUCCH, and the PUCCH and a physical uplink shared channel PUSCH cannot be transmitted in the first uplink subframe at the same time; and the trigger information is further used to instruct the UE to send scheduling information of the PUSCH in the first uplink subframe.

In a sixth possible implementation manner of the eighth aspect, the second uplink subframe is a subframe that carries a physical uplink control channel PUCCH, and the PUCCH and a physical uplink shared channel PUSCH cannot be transmitted in the second uplink subframe at the same time; and the trigger information is further used to instruct the UE to send scheduling information of the PUSCH in the second uplink subframe.

According to a ninth aspect, an embodiment of the present invention further provides user equipment UE. In a first uplink demodulation reference signal UL DMRS pattern, resource elements REs in one orthogonal frequency division multiplexing OFDM symbol in an uplink subframe are used to carry the UL DMRS. The UE includes: a processor, configured to map uplink control information UCI to REs in the uplink subframe according to the first UL DMRS pattern, where an OFDM symbol in which the REs carrying the UCI are located is adjacent to the OFDM symbol in which the REs carrying the UL DMRS are located; and a transmitter, configured to send, to a base station, the uplink subframe that carries the UCI and that is obtained by the processor.

In a first possible implementation manner of the ninth aspect, the UL DMRS is carried on REs in the 4th OFDM symbol in the uplink subframe, where the uplink subframe includes 14 OFDM symbols.

With reference to the ninth aspect or the first possible implementation manner of the ninth aspect, in a second possible implementation manner of the ninth aspect, in the uplink subframe, an RE that carries neither UL DMRS nor UCI further carries at least one of the following: a channel quality indicator CQI, a precoding matrix indication PMI, and data on a physical uplink shared channel PUSCH.

With reference to the ninth aspect, or the first possible implementation manner of the ninth aspect, or the second possible implementation manner of the ninth aspect, in a third possible implementation manner of the ninth aspect, the UCI includes: a rank indication RI, and at least one of an acknowledgement ACK and a negative acknowledgement NACK; in the uplink subframe, the RI is carried on REs in the following at least two first OFDM symbols: the 1st OFDM symbol, the 2nd OFDM symbol, the 3rd OFDM symbol, the 5th OFDM symbol, the 6th OFDM symbol, the 7th OFDM symbol, the 8th OFDM symbol, and the 9th OFDM symbol; and in the uplink subframe, at least one of the ACK and the NACK is carried on REs in the following at least two second OFDM symbols: the 1st OFDM symbol, the 2nd OFDM symbol, the 3rd OFDM symbol, the 5th OFDM symbol, the 6th OFDM symbol, the 7th OFDM symbol, the 8th OFDM symbol, and the 9th OFDM symbol.

With reference to the third possible implementation manner of the ninth aspect, in a fourth possible implementation manner of the ninth aspect, the processor is specifically configured to: map the RI to the REs in the first OFDM symbols, map the at least one of the ACK and the NACK to the REs in the second OFDM symbols, and map at least one of the CQI, the PMI, and the data on the PUSCH to a first RE, where the first RE is an RE that carries no UL DMRS, carries no RI, and carries no ACK or NACK.

With reference to the fourth possible implementation manner of the ninth aspect, in a fifth possible implementation manner of the ninth aspect, the processor is specifically configured to: according to a set order, first map a first part of the RI to an RE in the 2nd OFDM symbol in the uplink subframe and an RE in the 6th OFDM symbol in the uplink subframe, and then map a second part, except the first part, of the RI to an RE in the 1st OFDM symbol in the uplink subframe and an RE in the 7th OFDM symbol in the uplink subframe; and according to the set order, first map a first part of the at least one of the ACK and the NACK to an RE in the 3rd OFDM symbol in the uplink subframe and an RE in the 5th OFDM symbol in the uplink subframe, and then map a second part, except the first part, of the at least one of the ACK and the NACK to REs that are in the 1st OFDM symbol and the 7th symbol of the uplink subframe and that carry no RI.

With reference to the fourth possible implementation manner of the ninth aspect, in a sixth possible implementation manner of the ninth aspect, the processor is specifically configured to: according to a set order, first map a first part of the RI to an RE in the 2nd OFDM symbol in the uplink subframe and an RE in the 6th OFDM symbol in the uplink subframe, and then map a second part, except the first part, of the RI to an RE in the 1st OFDM symbol in the uplink subframe and an RE in the 7th OFDM symbol in the uplink subframe; and map, according to the set order, the at least one of the ACK and the NACK to an RE that is in the 1st OFDM symbol in the uplink subframe and that carries no RI, an RE that is in the 3rd OFDM symbol in the uplink subframe and that carries no RI, an RE that is in the 5th OFDM symbol in the uplink subframe and that carries no RI, and an RE that is in the 7th OFDM symbol in the uplink subframe and that carries no RI.

With reference to the fourth possible implementation manner of the ninth aspect, in a seventh possible implementation manner of the ninth aspect, the processor is specifically configured to: map, according to a set order, the RI to an RE in the 1st OFDM symbol in the uplink subframe, an RE in the 2nd OFDM symbol in the uplink subframe, an RE in the 6th OFDM symbol in the uplink subframe, and an RE in the 7th OFDM symbol in the uplink subframe; and according to the set order, first map a first part of the at least one of the ACK and the NACK to an RE in the 3rd OFDM symbol in the uplink subframe and an RE in the 5th OFDM symbol in the uplink subframe, and then map a second part, except the first part, of the at least one of the ACK and the NACK to an RE that is in the 1st OFDM symbol in the uplink subframe and that carries no RI, an RE that is in the 2nd OFDM symbol in the uplink subframe and that carries no RI, an RE that is in the 6th OFDM symbol in the uplink subframe and that carries no RI, and an RE that is in the 7th OFDM symbol in the uplink subframe and that carries no RI.

With reference to the fourth possible implementation manner of the ninth aspect, in an eighth possible implementation manner of the ninth aspect, the processor is specifically configured to: according to a set order, first map a first part of the RI to an RE in the 1st OFDM symbol in the uplink subframe and an RE in the 7th OFDM symbol in the uplink subframe, and then map a second part, except the first part, of the RI to an RE in the 8th OFDM symbol in the uplink subframe and an RE in the 9th OFDM symbol in the uplink subframe; and according to the set order, first map a first part of the at least one of the ACK and the NACK to an RE in the 3rd OFDM symbol in the uplink subframe and an RE in the 5th OFDM symbol in the uplink subframe, and then map a second part, except the first part, of the at least one of the ACK and the NACK to an RE in the 2nd OFDM symbol in the uplink subframe and an RE in the 6th OFDM symbol in the uplink subframe.

With reference to the fourth possible implementation manner of the ninth aspect, in a ninth possible implementation manner of the ninth aspect, the processor is specifically configured to: according to a set order, first map a first part of the RI to an RE in the 1st OFDM symbol in the uplink subframe and an RE in the 7th OFDM symbol in the uplink subframe, and then map a second part, except the first part, of the RI to an RE in the 8th OFDM symbol in the uplink subframe and an RE in the 9th OFDM symbol in the uplink subframe; and map, according to the set order, the at least one of the ACK and the NACK to an RE in the 2nd OFDM symbol in the uplink subframe, an RE in the 3rd OFDM symbol in the uplink subframe, an RE in the 5th OFDM symbol in the uplink subframe, and an RE in the 6th OFDM symbol in the uplink subframe.

With reference to the fourth possible implementation manner of the ninth aspect, in a tenth possible implementation manner of the ninth aspect, the processor is specifically configured to: map, according to a set order, the RI to an RE in the 1st OFDM symbol in the uplink subframe, an RE in the 7th OFDM symbol in the uplink subframe, an RE in the 8th OFDM symbol in the uplink subframe, and an RE in the 9th OFDM symbol in the uplink subframe; and according to the set order, first map a first part of the at least one of the ACK and the NACK to an RE in the 3rd OFDM symbol in the uplink subframe and an RE in the 5th OFDM symbol in the uplink subframe, and then map a second part, except the first part, of the at least one of the ACK and the NACK to an RE in the 2nd OFDM symbol in the uplink subframe and an RE in the 6th OFDM symbol in the uplink subframe.

With reference to the third possible implementation manner of the ninth aspect, in an eleventh possible implementation manner of the ninth aspect, the processor is specifically configured to: map the RI to the REs in the first OFDM symbols; map at least one of the CQI, the PMI, and the data on the PUSCH to an RE that carries neither UL DMRS nor RI; and map the at least one of the ACK and the NACK to the REs in the second OFDM symbols, and overwrite at least one of the CQI, the PMI, and the data on the PUSCH that are carried on the REs in the second OFDM symbols.

With reference to the eleventh possible implementation manner of the ninth aspect, in a twelfth possible implementation manner of the ninth aspect, the processor is specifically configured to: according to a set order, first map a first part of the RI to an RE in the 2nd OFDM symbol in the uplink subframe and an RE in the 6th OFDM symbol in the uplink subframe, and then map a second part, except the first part, of the RI to an RE in the 1st OFDM symbol in the uplink subframe and an RE in the 7th OFDM symbol in the uplink subframe; and according to the set order, first map a first part of the at least one of the ACK and the NACK to an RE in the 3rd OFDM symbol in the uplink subframe and an RE in the 5th OFDM symbol in the uplink subframe, then map a second part, except the first part, of the at least one of the ACK and the NACK to REs that are in the 1st OFDM symbol and the 7th symbol of the uplink subframe and that carry no RI, and overwrite the at least one of the CQI, the PMI, and the data on the PUSCH that are carried on the RE in the 1st OFDM symbol, the RE in the 3rd OFDM symbol, the RE in the 5th OFDM symbol, and the RE in the 7th OFDM symbol.

With reference to the eleventh possible implementation manner of the ninth aspect, in a thirteenth possible implementation manner of the ninth aspect, the processor is specifically configured to: according to a set order, first map a first part of the RI to an RE in the 2nd OFDM symbol in the uplink subframe and an RE in the 6th OFDM symbol in the uplink subframe, and then map a second part, except the first part, of the RI to an RE in the 1st OFDM symbol in the uplink subframe and an RE in the 7th OFDM symbol in the uplink subframe; and map, according to the set order, the at least one of the ACK and the NACK to an RE that is in the 1st OFDM symbol in the uplink subframe and that carries no RI, an RE that is in the 3rd OFDM symbol in the uplink subframe and that carries no RI, an RE that is in the 5th OFDM symbol in the uplink subframe and that carries no RI, and an RE that is in the 7th OFDM symbol in the uplink subframe and that carries no RI, and overwrite the at least one of the CQI, the PMI, and the data on the PUSCH that are carried on the RE in the 1st OFDM symbol, the RE in the 3rd OFDM symbol, the RE in the 5th OFDM symbol, and the RE in the 7th OFDM symbol.

With reference to the eleventh possible implementation manner of the ninth aspect, in a fourteenth possible implementation manner of the ninth aspect, the processor is specifically configured to: map, according to a set order, the RI to an RE in the 1st OFDM symbol in the uplink subframe, an RE in the 2nd OFDM symbol in the uplink subframe, an RE in the 6th OFDM symbol in the uplink subframe, and an RE in the 7th OFDM symbol in the uplink subframe; and according to the set order, first map a first part of the at least one of the ACK and the NACK to an RE in the 3rd OFDM symbol in the uplink subframe and an RE in the 5th OFDM symbol in the uplink subframe, then map a second part, except the first part, of the at least one of the ACK and the NACK to an RE that is in the 1st OFDM symbol in the uplink subframe and that carries no RI, an RE that is in the 2nd OFDM symbol in the uplink subframe and that carries no RI, an RE that is in the 6th OFDM symbol in the uplink subframe and that carries no RI, and an RE that is in the 7th OFDM symbol in the uplink subframe and that carries no RI, and overwrite the at least one of the CQI, the PMI, and the data on the PUSCH that are carried on the RE in the 1st OFDM symbol, the RE in the 2nd OFDM symbol, the RE in the 3rd OFDM symbol, the RE in the 5th OFDM symbol, the RE in the 6th OFDM symbol, and the RE in the 7th OFDM symbol.

With reference to the eleventh possible implementation manner of the ninth aspect, in a fifteenth possible implementation manner of the ninth aspect, the processor is specifically configured to: according to a set order, first map a first part of the RI to an RE in the 1st OFDM symbol in the uplink subframe and an RE in the 7th OFDM symbol in the uplink subframe, and then map a second part, except the first part, of the RI to an RE in the 8th OFDM symbol in the uplink subframe and an RE in the 9th OFDM symbol in the uplink subframe; and according to the set order, first map a first part of the at least one of the ACK and the NACK to an RE in the 3rd OFDM symbol in the uplink subframe and an RE in the 5th OFDM symbol in the uplink subframe, then map a second part, except the first part, of the at least one of the ACK and the NACK to an RE in the 2nd OFDM symbol in the uplink subframe and an RE in the 6th OFDM symbol in the uplink subframe, and overwrite the at least one of the CQI, the PMI, and the data on the PUSCH that are carried on the RE in the 2nd OFDM symbol, the RE in the 3rd OFDM symbol, the RE in the 5th OFDM symbol, and the RE in the 6th OFDM symbol.

With reference to the eleventh possible implementation manner of the ninth aspect, in a sixteenth possible implementation manner of the ninth aspect, the processor is specifically configured to: according to a set order, first map a first part of the RI to an RE in the 1st OFDM symbol in the uplink subframe and an RE in the 7th OFDM symbol in the uplink subframe, and then map a second part, except the first part, of the RI to an RE in the 8th OFDM symbol in the uplink subframe and an RE in the 9th OFDM symbol in the uplink subframe; and map, according to the set order, the at least one of the ACK and the NACK to an RE in the 2nd OFDM symbol in the uplink subframe, an RE in the 3rd OFDM symbol in the uplink subframe, an RE in the 5th OFDM symbol in the uplink subframe, and an RE in the 6th OFDM symbol in the uplink subframe, and overwrite the at least one of the CQI, the PMI, and the data on the PUSCH that are carried on the RE in the 2nd OFDM symbol, the RE in the 3rd OFDM symbol, the RE in the 5th OFDM symbol, and the RE in the 6th OFDM symbol.

With reference to the eleventh possible implementation manner of the ninth aspect, in a seventeenth possible implementation manner of the ninth aspect, the processor is specifically configured to: map, according to a set order, the RI to an RE in the 1st OFDM symbol in the uplink subframe, an RE in the 7th OFDM symbol in the uplink subframe, an RE in the 8th OFDM symbol in the uplink subframe, and an RE in the 9th OFDM symbol in the uplink subframe; and according to the set order, first map a first part of the at least one of the ACK and the NACK to an RE in the 3rd OFDM symbol in the uplink subframe and an RE in the 5th OFDM symbol in the uplink subframe, then map a second part, except the first part, of the at least one of the ACK and the NACK to an RE in the 2nd OFDM symbol in the uplink subframe and an RE in the 6th OFDM symbol in the uplink subframe, and overwrite the at least one of the CQI, the PMI, and the data on the PUSCH that are carried on the RE in the 2nd OFDM symbol, the RE in the 3rd OFDM symbol, the RE in the 5th OFDM symbol, and the RE in the 6th OFDM symbol.

With reference to any possible implementation manner of the fifth to the tenth implementation manners of the ninth aspect or any possible implementation manner of the twelfth to the seventeenth implementation manners of the ninth aspect, in an eighteenth possible implementation manner of the ninth aspect, the set order is an order from the last carrier to the first carrier in the uplink subframe and from an RE in the 1st OFDM symbol to an RE in the last OFDM symbol in each carrier, according to which data is carried on the REs in the uplink subframe, where the data includes at least one of the UCI and the UL DMRS.

With reference to any possible implementation manner of the fourth to the eighteenth implementation manners of the ninth aspect, in a nineteenth possible implementation manner of the ninth aspect, the transmitter is further configured to send indication information to the base station, where the indication information is used to indicate locations, in a time-frequency resource of the uplink subframe, of REs occupied by the RI and the at least one of the ACK and the NACK.

With reference to the nineteenth possible implementation manner of the ninth aspect, in a twentieth possible implementation manner of the ninth aspect, the time-frequency resource includes at least one of the following resources: a resource block, a resource block pair, and a resource block group.

According to a tenth aspect, an embodiment of the present invention provides a base station. In a first uplink demodulation reference signal UL DMRS pattern, REs in one orthogonal frequency division multiplexing OFDM symbol in an uplink subframe are used to carry the UL DMRS. The base station includes: a receiver, configured to receive an uplink subframe sent by user equipment UE, where resource elements REs in the uplink subframe carry uplink control information UCI according to the first uplink demodulation reference signal UL DMRS pattern, where an OFDM symbol in which the REs carrying the UCI are located is adjacent to the OFDM symbol in which the REs carrying the UL DMRS are located; and a processor, configured to acquire, according to the first UL DMRS pattern, the UCI carried in the uplink subframe received by the receiver.

In a first possible implementation manner of the tenth aspect, the UL DMRS is carried on REs in the 4th OFDM symbol in the uplink subframe, where the uplink subframe includes REs in 14 OFDM symbols.

With reference to the tenth aspect or the first possible implementation manner of the tenth aspect, in a second possible implementation manner of the tenth aspect, in the uplink subframe, an RE that carries neither UL DMRS nor UCI further carries at least one of the following: a channel quality indicator CQI, a precoding matrix indication PMI, and data on a physical uplink shared channel PUSCH.

With reference to the tenth aspect, or the first possible implementation manner of the tenth aspect, or the second possible implementation manner of the tenth aspect, in a third possible implementation manner of the tenth aspect, the UCI includes: a rank indication RI, and at least one of an acknowledgement ACK and a negative acknowledgement NACK; in the uplink subframe, the RI is carried on REs in the following at least two first OFDM symbols: the 1st OFDM symbol, the 2nd OFDM symbol, the 3rd OFDM symbol, the 5th OFDM symbol, the 6th OFDM symbol, the 7th OFDM symbol, the 8th OFDM symbol, and the 9th OFDM symbol; and in the uplink subframe, at least one of the ACK and the NACK is carried on REs in the following at least two second OFDM symbols: the 1st OFDM symbol, the 2nd OFDM symbol, the 3rd OFDM symbol, the 5th OFDM symbol, the 6th OFDM symbol, the 7th OFDM symbol, the 8th OFDM symbol, and the 9th OFDM symbol.

With reference to the third possible implementation manner of the tenth aspect, in a fourth possible implementation manner of the tenth aspect, the processor is specifically configured to: acquire the RI carried on the REs in the first OFDM symbols; acquire the at least one of the ACK and the NACK that is carried on the REs in the second OFDM symbols; and acquire at least one of the CQI, the PMI, and the data on the PUSCH that is carried on a first RE, where the first RE is an RE that carries no UL DMRS, carries no RI, and carries no ACK or NACK.

With reference to the fourth possible implementation manner of the tenth aspect, in a fifth possible implementation manner of the tenth aspect, the processor is specifically configured to: acquire a first part of the RI that is carried on an RE in the 2nd OFDM symbol in the uplink subframe and an RE in the 6th OFDM symbol in the uplink subframe, and a second part, except the first part, of the RI that is carried on an RE in the 1st OFDM symbol in the uplink subframe and an RE in the 7th OFDM symbol in the uplink subframe; and acquire a first part of the at least one of the ACK and the NACK that is carried on an RE in the 3rd OFDM symbol in the uplink subframe and an RE in the 5th OFDM symbol in the uplink subframe, and a second part, except the first part, of the at least one of the ACK and the NACK that is carried on an RE in the 1st OFDM symbol in the uplink subframe and an RE in the 7th OFDM symbol in the uplink subframe.

With reference to the fourth possible implementation manner of the tenth aspect, in a sixth possible implementation manner of the tenth aspect, the processor is specifically configured to: acquire a first part of the RI that is carried on an RE in the 2nd OFDM symbol in the uplink subframe and an RE in the 6th OFDM symbol in the uplink subframe, and a second part, except the first part, of the RI that is carried on an RE in the 1st OFDM symbol in the uplink subframe and an RE in the 7th OFDM symbol in the uplink subframe; and acquire the at least one of the ACK and the NACK that is carried on an RE in the 1st OFDM symbol in the uplink subframe, an RE in the 3rd OFDM symbol in the uplink subframe, an RE in the 5th OFDM symbol in the uplink subframe, and an RE in the 7th OFDM symbol in the uplink subframe.

With reference to the fourth possible implementation manner of the tenth aspect, in a seventh possible implementation manner of the tenth aspect, the processor is specifically configured to: acquire the RI carried on an RE in the 1st OFDM symbol in the uplink subframe, an RE in the 2nd OFDM symbol in the uplink subframe, an RE in the 6th OFDM symbol in the uplink subframe, and an RE in the 7th OFDM symbol in the uplink subframe; and acquire a first part of the at least one of the ACK and the NACK that is carried on an RE in the 3rd OFDM symbol in the uplink subframe and an RE in the 5th OFDM symbol in the uplink subframe, and a second part, except the first part, of the at least one of the ACK and the NACK that is carried on an RE in the 1st OFDM symbol in the uplink subframe, an RE in the 2nd OFDM symbol in the uplink subframe, an RE in the 6th OFDM symbol in the uplink subframe, and an RE in the 7th OFDM symbol in the uplink subframe.

With reference to the fourth possible implementation manner of the tenth aspect, in an eighth possible implementation manner of the tenth aspect, the processor is specifically configured to: acquire a first part of the RI that is carried on an RE in the 1st OFDM symbol in the uplink subframe and an RE in the 7th OFDM symbol in the uplink subframe, and a second part, except the first part, of the RI that is carried on an RE in the 8th OFDM symbol in the uplink subframe and an RE in the 9th OFDM symbol in the uplink subframe; and acquire a first part of the at least one of the ACK and the NACK that is carried on an RE in the 3rd OFDM symbol in the uplink subframe and an RE in the 5th OFDM symbol in the uplink subframe, and a second part, except the first part, of the ACK and the NACK that is carried on an RE in the 2nd OFDM symbol in the uplink subframe and an RE in the 6th OFDM symbol in the uplink subframe.

With reference to the fourth possible implementation manner of the tenth aspect, in a ninth possible implementation manner of the tenth aspect, the processor is specifically configured to: acquire a first part of the RI that is carried on an RE in the 1st OFDM symbol in the uplink subframe and an RE in the 7th OFDM symbol in the uplink subframe, and a second part, except the first part, of the RI that is carried on an RE in the 8th OFDM symbol in the uplink subframe and an RE in the 9th OFDM symbol in the uplink subframe; and acquire the at least one of the ACK and the NACK that is carried on an RE in the 2nd OFDM symbol in the uplink subframe, an RE in the 3rd OFDM symbol in the uplink subframe, an RE in the 5th OFDM symbol in the uplink subframe, and an RE in the 6th OFDM symbol in the uplink subframe.

With reference to the fourth possible implementation manner of the tenth aspect, in a tenth possible implementation manner of the tenth aspect, the processor is specifically configured to: acquire the RI carried on an RE in the 1st OFDM symbol in the uplink subframe, an RE in the 7th OFDM symbol in the uplink subframe, an RE in the 8th OFDM symbol in the uplink subframe, and an RE in the 9th OFDM symbol in the uplink subframe; and acquire a first part of the at least one of the ACK and the NACK that is carried on an RE in the 3rd OFDM symbol in the uplink subframe and an RE in the 5th OFDM symbol in the uplink subframe, and a second part, except the first part, of the at least one of the ACK and the NACK that is carried on REs in the 2nd OFDM symbol and the 6th OFDM symbol that are in the uplink subframe.

With reference to any possible implementation manner of the fifth to the tenth implementation manners of the tenth aspect, in an eleventh possible implementation manner of the tenth aspect, the receiver is further configured to receive indication information sent by the UE, where the indication information is used to indicate locations, in a time-frequency resource of the uplink subframe, of REs occupied by the RI and the at least one of the ACK and the NACK; and the processor is specifically configured to: acquire, according to the indication information received by the receiver, the RI carried on the REs in the first OFDM symbols; and acquire, according to the indication information received by the receiver, the at least one of the ACK and the NACK that is carried on the REs in the second OFDM symbols.

With reference to the eleventh possible implementation manner of the tenth aspect, in a twelfth possible implementation manner of the tenth aspect, the time-frequency resource includes at least one of the following resources: a resource block, a resource block pair, and a resource block group.

According to an eleventh aspect, an embodiment of the present invention further provides user equipment UE. In a first uplink demodulation reference signal UL DMRS pattern, resource elements REs in one orthogonal frequency division multiplexing OFDM symbol in a first uplink subframe are used to carry a UL DMRS, or some REs in two OFDM symbols in a first uplink subframe are used to carry a UL DMRS; in a second UL DMRS pattern, all REs in two OFDM symbols in a second uplink subframe are used to carry a UL DMRS. The UE includes: a receiver, configured to receive trigger information sent by a base station, where the trigger information is used to trigger the UE to switch from sending the first uplink subframe according to the first UL DMRS pattern to sending the second uplink subframe according to the second UL DMRS pattern; and a transmitter, configured to: according to the trigger information received by the receiver and according to the second UL DMRS pattern, map uplink control information UCI to the second uplink subframe, and send the second uplink subframe to the base station.

In a first possible implementation manner of the eleventh aspect, the trigger information is downlink control information DCI, where the DCI includes a one-bit indicator, and the one-bit indicator is used to trigger the UE to switch from sending the first uplink subframe according to the first UL DMRS pattern to sending the second uplink subframe according to the second UL DMRS pattern.

In a second possible implementation manner of the eleventh aspect, the trigger information is a DCI indication corresponding to the uplink subframe, where a channel state information request CSI request in the DCI indication is used to trigger the UE to switch from sending the first uplink subframe according to the first UL DMRS pattern to sending the second uplink subframe according to the second UL DMRS pattern.

With reference to the second possible implementation manner of the eleventh aspect, in a third possible implementation manner of the eleventh aspect, the DCI indication is carried on a physical downlink control channel PDCCH, and a format of the PDCCH is a DCI format used for uplink scheduling.

With reference to the third possible implementation manner of the eleventh aspect, in a fourth possible implementation manner of the eleventh aspect, the DCI format used for uplink scheduling includes DCI format 0 or DCI format 4.

In a fifth possible implementation manner of the eleventh aspect, the first uplink subframe is a subframe that carries a physical uplink control channel PUCCH, and the PUCCH and a physical uplink shared channel PUSCH cannot be transmitted in the first uplink subframe at the same time; and the trigger information is further used to instruct the UE to send scheduling information of the PUSCH in the first uplink subframe.

In a sixth possible implementation manner of the eleventh aspect, the second uplink subframe is a subframe that carries a physical uplink control channel PUCCH, and the PUCCH and a physical uplink shared channel PUSCH cannot be transmitted in the second uplink subframe at the same time; and the trigger information is further used to instruct the UE to send scheduling information of the PUSCH in the second uplink subframe.

According to a twelfth aspect, an embodiment of the present invention further provides a base station. In a first uplink demodulation reference signal UL DMRS pattern, resource elements REs in one orthogonal frequency division multiplexing OFDM symbol in a first uplink subframe are used to carry a UL DMRS, or some REs in two OFDM symbols in a first uplink subframe are used to carry a UL DMRS; in a second UL DMRS pattern, all REs in two OFDM symbols in a second uplink subframe are used to carry a UL DMRS. The base station includes: a transmitter, configured to send trigger information to user equipment UE, where the trigger information is used to trigger the UE to switch from sending the first uplink subframe according to the first UL DMRS pattern to sending the second uplink subframe according to the second UL DMRS pattern; a receiver, configured to receive the second uplink subframe sent by the UE according to the second UL DMRS pattern; and a processor, configured to acquire, according to the second UL DMRS pattern, the UCI carried in the second uplink subframe received by the receiver.

In a first possible implementation manner of the twelfth aspect, the trigger information is downlink control information DCI, where the DCI includes a one-bit indicator, and the one-bit indicator is used to trigger the UE to switch from sending the first uplink subframe according to the first UL DMRS pattern to sending the second uplink subframe according to the second UL DMRS pattern.

In a second possible implementation manner of the twelfth aspect, the trigger information is a DCI indication corresponding to the uplink subframe, where a channel state information request CSI request in the DCI indication is used to trigger the UE to switch from sending the first uplink subframe according to the first UL DMRS pattern to sending the second uplink subframe according to the second UL DMRS pattern.

With reference to the second possible implementation manner of the twelfth aspect, in a third possible implementation manner of the twelfth aspect, the DCI indication is carried on a physical downlink control channel PDCCH, and a format of the PDCCH is a DCI format used for uplink scheduling.

With reference to the third possible implementation manner of the twelfth aspect, in a fourth possible implementation manner of the twelfth aspect, the DCI format used for uplink scheduling includes at least one of the following: DCI format 0 or DCI format 4.

In a fifth possible implementation manner of the twelfth aspect, the first uplink subframe is a subframe that carries a physical uplink control channel PUCCH, and the PUCCH and a physical uplink shared channel PUSCH cannot be transmitted in the first uplink subframe at the same time; and the trigger information is further used to instruct the UE to send scheduling information of the PUSCH in the first uplink subframe.

In a sixth possible implementation manner of the twelfth aspect, the second uplink subframe is a subframe that carries a physical uplink control channel PUCCH, and the PUCCH and a physical uplink shared channel PUSCH cannot be transmitted in the second uplink subframe at the same time; and the trigger information is further used to instruct the UE to send scheduling information of the PUSCH in the second uplink subframe.

According to the uplink control information transmission method, the user equipment, and the base station provided in the embodiments of the present invention, the UE maps UCI to REs in an uplink subframe according to a first UL DMRS pattern, where an OFDM symbol in which the REs carrying the UCI are located is adjacent to an OFDM symbol in which REs carrying a UL DMRS are located; and the UE sends, to the base station, the uplink subframe that carries the UCI. Because the UCI is carried at a location adjacent to that of the UL DMRS in the uplink subframe, performance of demodulating the UCI by the base station is improved, thereby improving a data transmission rate and a network throughput.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

FIG. 16 is a sixth schematic diagram of a UCI sending format according to the present invention;

FIG. 17 is a flowchart of Embodiment 11 of an uplink control information transmission method according to the present invention;

DETAILED DESCRIPTION

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
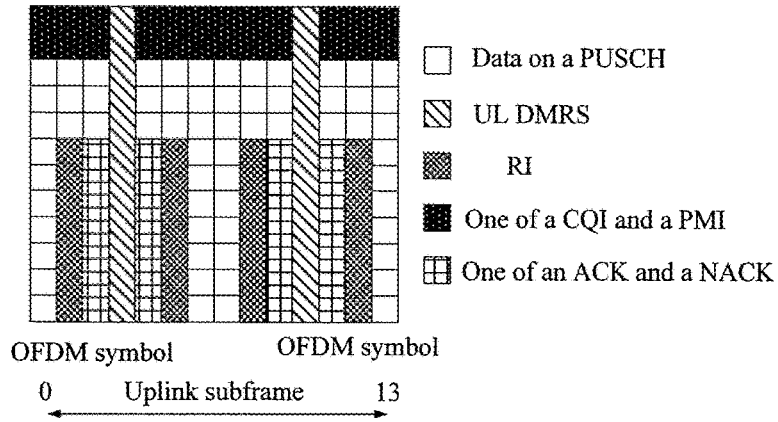
FIG. 1 is a schematic diagram of a UCI sending format in the prior art.

In a Long Term Evolution (Long Term Evolution, LTE for short) Release 8 (Release 8, R8 for short) to Release 11 (Release 11, R11 for short) system, a sending format of UCI in a subframe, for example, is shown in FIG. 1, where an RI and at least one of an ACK and a NACK, which are in the UCI, are carried on either side of a UL DMRS, so that a base station can perform channel estimation more accurately, and performance of demodulating at least one of the ACK or the NACK and the RI is ensured, thereby improving a data transmission rate and a network throughput.

Figure 2:
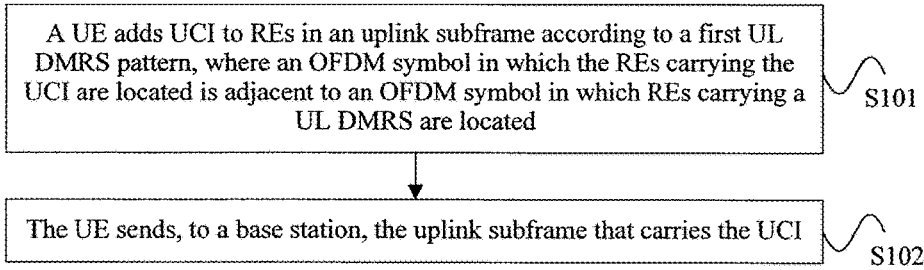
FIG. 2 is a flowchart of Embodiment 1 of an uplink control information transmission method according to the present invention.

FIG. 2 is a flowchart of Embodiment 1 of an uplink control information transmission method according to the present invention. As shown in FIG. 2, the method in this embodiment may be executed by user equipment (User Equipment, UE for short). The method in this embodiment may include the following steps:

S101. The UE maps uplink control information (Uplink Control Information, UCI for short) to REs (Resource Element, RE for short) in an uplink subframe according to a first uplink demodulation reference signal (Uplink Demodulation Reference Signal, UL DMRS for short) pattern, where an orthogonal frequency division multiplexing (Orthogonal Frequency Division Multiplexing, OFDM for short) symbol in which the REs carrying the UCI are located is adjacent to an OFDM symbol in which REs carrying a UL DMRS are located.

S102. The UE sends, to a base station, the uplink subframe that carries the UCI.

In this embodiment, in the first UL DMRS pattern, REs in one OFDM symbol in an uplink subframe are used to carry a UL DMRS; in some application scenarios, a quantity of UL DMRSs sent by the UE to the base station may be properly reduced, that is, the UE may send a UL DMRS to the base station over the REs in the OFDM symbol in the uplink subframe, that is, the UE transmits one UL DMRS over the REs in the OFDM symbol in the uplink subframe in the first UL DMRS pattern. The first UL DMRS pattern in this embodiment may be a UL DMRS overhead reduction pattern. For example, when a serving cell of the UE is a small cell, the UE may properly reduce the quantity of UL DMRSs sent to the base station, that is, the UE sends a UL DMRS over REs in one OFDM symbol in an uplink subframe, and the uplink subframe may be an uplink subframe using the first UL DMRS pattern. When the UE needs to send the UCI to the base station by using the uplink subframe, the UE maps, according to the first UL DMRS pattern, the UCI to the REs using the uplink subframe, and the OFDM symbol in which the REs carrying the UCI are located is adjacent to the OFDM symbol in which the REs carrying the UL DMRS are located. Then, the UE sends, to the base station, the uplink subframe that carries the UCI, that is, the UE sends, to the base station, all information in a time-frequency resource of the uplink subframe that carries the UCI. The base station may acquire the UCI carried on the REs in the OFDM symbol in the uplink subframe using the first UL DMRS pattern. Because in the uplink subframe, the OFDM symbol in which the REs carrying the UCI are located is adjacent to the OFDM symbol in which the REs carrying the UL DMRS are located, performance of demodulating the UCI by the base station can be improved.

According to the uplink control information transmission method provided in Embodiment 1 of the present invention, UE maps UCI to REs in an uplink subframe according to a first UL DMRS pattern, where an OFDM symbol in which the REs carrying the UCI are located is adjacent to an OFDM symbol in which REs carrying a UL DMRS are located; and the UE sends, to a base station, the uplink subframe that carries the UCI. Because the UCI is carried at a location adjacent to that of the UL DMRS in the uplink subframe, performance of demodulating the UCI by the base station is improved, thereby improving a data transmission rate and a network throughput.

Figure 3:
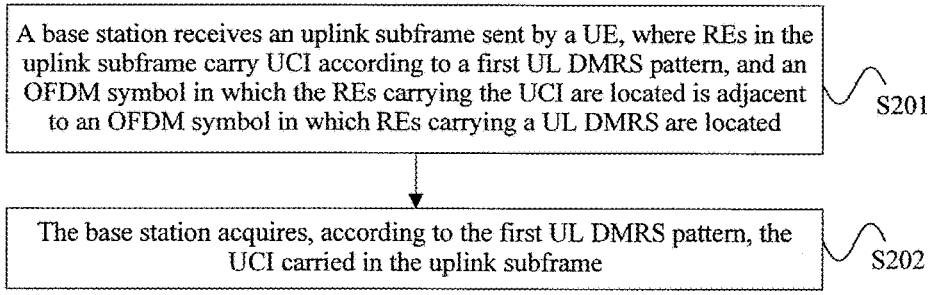
FIG. 3 is a flowchart of Embodiment 2 of an uplink control information transmission method according to the present invention.

FIG. 3 is a flowchart of Embodiment 2 of an uplink control information transmission method according to the present invention. As shown in FIG. 3, the method in this embodiment may be executed by a network side device (for example, a base station). The method in this embodiment may include the following steps:

S201. The base station receives an uplink subframe sent by UE, where REs in the uplink subframe carry UCI according to a first UL DMRS pattern, and an OFDM symbol in which the REs carrying the UCI are located is adjacent to an OFDM symbol in which REs carrying a UL DMRS are located.

S202. The base station acquires, according to the first UL DMRS pattern, the UCI carried in the uplink subframe.

In this embodiment, in the first UL DMRS pattern, REs in one OFDM symbol in an uplink subframe are used to carry a UL DMRS; the base station may receive the uplink subframe sent by the UE, where the REs in the OFDM symbol in the uplink subframe are used to carry the UL DMRS, because in some application scenarios, a quantity of UL DMRSs sent by the UE to the base station may be properly reduced. For example, when a serving cell of the UE is a small cell, the UE may properly reduce the quantity of UL DMRSs sent to the base station, that is, the UE sends a UL DMRS over REs in one OFDM symbol in an uplink subframe, and the uplink subframe may be an uplink subframe using the first UL DMRS pattern. The first UL DMRS pattern in this embodiment may be a UL DMRS overhead reduction pattern.

In this embodiment, the UCI sent by the UE to the base station is also transmitted by using the uplink subframe, and the OFDM symbol in which the REs carrying the UCI are located is adjacent to the OFDM symbol in which the REs carrying the UL DMRS are located; then, the base station may acquire, according to the first UL DMRS pattern, the UCI carried on the uplink subframe. Because the UCI is carried at a location adjacent to that of the UL DMRS in the uplink subframe, performance of demodulating the UCI by the base station can be improved.

According to the uplink control information transmission method provided in this embodiment of the present invention, a base station receives an uplink subframe sent by UE, where REs in the uplink subframe carry UCI according to a first UL DMRS pattern, and an OFDM symbol in which the REs carrying the UCI are located is adjacent to an OFDM symbol in which REs carrying a UL DMRS are located; and the base station acquires, according to the first UL DMRS pattern, the UCI carried in the uplink subframe. Because the UCI is carried at a location adjacent to that of the UL DMRS in the uplink subframe, performance of demodulating the UCI by the base station is improved, thereby improving a data transmission rate and a network throughput.

In Embodiment 3 of an uplink control information transmission method of the present invention, based on method Embodiment 1 of the present invention or method Embodiment 2 of the present invention, in this embodiment, the UL DMRS is carried on REs in the 4th OFDM symbol (OFDM symbol 3) in the uplink subframe, where the uplink subframe includes REs in 14 OFDM symbols. A time-frequency resource corresponding to one uplink subframe may include REs in 14 OFDM symbols, where the 14 OFDM symbols are separately: the 1st OFDM symbol (OFDM symbol 0), the 2nd OFDM symbol (OFDM symbol 1), the 3rd OFDM symbol (OFDM symbol 2), the 4th OFDM symbol (OFDM symbol 3), the 5th OFDM symbol (OFDM symbol 4), the 6th OFDM symbol (OFDM symbol 5), the 7th OFDM symbol (OFDM symbol 6), the 8th OFDM symbol (OFDM symbol 7), the 9th OFDM symbol (OFDM symbol 8), the 10th OFDM symbol (OFDM symbol 9), the 11th OFDM symbol (OFDM symbol 10), the 12th OFDM symbol (OFDM symbol 11), the 13th OFDM symbol (OFDM symbol 12), and the 14th OFDM symbol (OFDM symbol 13). The UE may map, to the REs in the 4th OFDM symbol in the uplink subframe, the UL DMRS sent by using the uplink subframe. Correspondingly, the base station may acquire the UL DMRS carried on the REs in the 4th OFDM symbol in the uplink subframe.

Further, in the uplink subframe, an RE that carries neither UL DMRS nor UCI further carries at least one of the following: a channel quality indicator CQI, a precoding matrix indication PMI, and data on a physical uplink shared channel PUSCH.

Still further, the UCI in this embodiment includes: a rank indication RI, and at least one of an acknowledgement ACK and a negative acknowledgement NACK. In the uplink subframe, the RI is carried on REs in the following at least two first OFDM symbols: the 1st OFDM symbol, the 2nd OFDM symbol, the 3rd OFDM symbol, the 5th OFDM symbol, the 6th OFDM symbol, the 7th OFDM symbol, the 8th OFDM symbol, and the 9th OFDM symbol; and in the uplink subframe, at least one of the ACK and the NACK is carried on REs in the following at least two second OFDM symbols: the 1st OFDM symbol, the 2nd OFDM symbol, the 3rd OFDM symbol, the 5th OFDM symbol, the 6th OFDM symbol, the 7th OFDM symbol, the 8th OFDM symbol, and the 9th OFDM symbol.

Specifically, the UCI in this embodiment may include the RI and the at least one of the ACK and the NACK; the UE may map the RI and the at least one of the ACK and the NACK to the uplink subframe using the foregoing first UL DMRS pattern, and the uplink subframe that carries the UCI is formed. Correspondingly, the base station may acquire the RI and the at least one of the ACK and the NACK from the uplink subframe that carries the UCI.

According to the uplink control information transmission method provided in Embodiment 3 of the present invention, UE maps UCI to REs in an uplink subframe according to a first UL DMRS pattern, where an OFDM symbol in which the REs carrying the UCI are located is adjacent to an OFDM symbol in which REs carrying a UL DMRS are located; and the UE sends, to a base station, the uplink subframe that carries the UCI. The base station may receive the uplink subframe sent by the UE, where the REs in the uplink subframe carry UCI according to the first UL DMRS pattern, and the OFDM symbol in which the REs carrying the UCI are located is adjacent to the OFDM symbol in which the REs carrying the UL DMRS are located; and the base station acquires, according to the first UL DMRS pattern, the UCI carried in the uplink subcarrier. Because the UCI is carried at a location adjacent to that of the UL DMRS in the uplink subframe, performance of demodulating the UCI by the base station is improved, thereby improving a data transmission rate and a network throughput.

Figure 4:
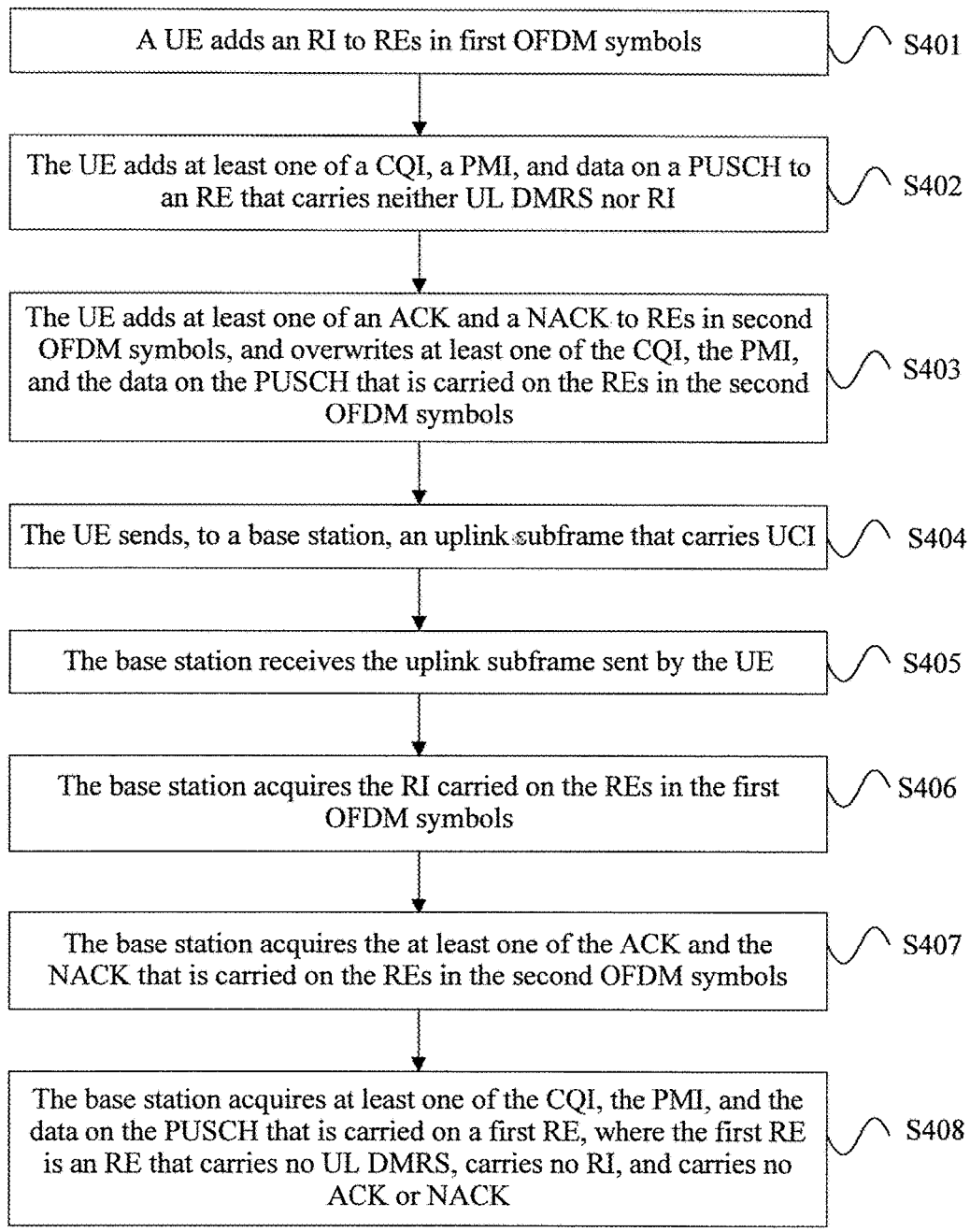
FIG. 4 is a flowchart of Embodiment 4 of an uplink control information transmission method according to the present invention.

FIG. 4 is a flowchart of Embodiment 4 of an uplink control information transmission method according to the present invention. As shown in FIG. 4, the method in this embodiment may include the following steps:

S401. UE maps an RI to REs in first OFDM symbols.

In this embodiment, in a first UL DMRS pattern, REs in one OFDM symbol in an uplink subframe are used to carry a UL DMRS; in the uplink subframe, the UE maps the RI in UCI to the REs in the first OFDM symbols adjacent to a UL DMRS OFDM symbol, where the UL DMRS OFDM symbol is an OFDM symbol that carries the UL DMRS, and the UL DMRS OFDM symbol is the 4th OFDM symbol. Therefore, at least two first OFDM symbols adjacent to the 4th OFDM symbol may be: the 1st OFDM symbol, the 2nd OFDM symbol, the 3rd OFDM symbol, the 5th OFDM symbol, the 6th OFDM symbol, the 7th OFDM symbol, the 8th OFDM symbol, and the 9th OFDM symbol.

S402. The UE maps at least one of a CQI, a PMI, and data on a PUSCH to an RE that carries neither UL DMRS nor RI.

In this embodiment, the UE maps the RI to the REs in the first OFDM symbols, and the UE maps the at least one of the CQI, the PMI, and the data on the PUSCH to the RE that carries neither UL DMRS nor RI in the uplink subframe. In this case, all REs in the uplink subframe are occupied by the UL DMRS, the RI, and the at least one of the CQI, the PMI, and the data on the PUSCH.

S403. The UE maps at least one of an ACK and a NACK to REs in second OFDM symbols, and overwrites at least one of the CQI, the PMI, and the data on the PUSCH that are carried on the REs in the second OFDM symbols.

In this embodiment, after the UE maps the at least one of the CQI, the PMI, and the data on the PUSCH to the RE that carries neither UL DMRS nor RI, the UE maps the at least one of the ACK and the NACK to the REs in the second OFDM symbols adjacent to the UL DMRS OFDM symbol, where the UL DMRS OFDM symbol is the OFDM symbol that carries the UL DMRS, and the UL DMRS OFDM symbol is the 4th symbol. Therefore, at least two second OFDM symbols adjacent to the 4th OFDM symbol may be: the 1st OFDM symbol, the 2nd OFDM symbol, the 3rd OFDM symbol, the 5th OFDM symbol, the 6th OFDM symbol, the 7th OFDM symbol, the 8th OFDM symbol, and the 9th OFDM symbol. The UE may map the at least one of the ACK and the NACK to the REs that are in the second OFDM symbols and carry no RI but carry the at least one of the CQI, the PMI, and the data on the PUSCH, and when the at least one of the ACK and the NACK is carried on the REs, the at least one of the CQI, the PMI, and the data on the PUSCH that is on the REs is overwritten.

S404. The UE sends, to a base station, an uplink subframe that carries UCI.

In this embodiment, a specific implementation process of S404 is similar to a specific implementation process of S102 in method Embodiment 1 of the present invention. For details, reference may be made to related descriptions in the foregoing embodiment, and the details are not described herein again in this embodiment of the present invention.

S405. The base station receives the uplink subframe sent by the UE.

In this embodiment, a specific implementation process of S405 is similar to a specific implementation process of S201 in method Embodiment 2 of the present invention. For details, reference may be made to related descriptions in the foregoing embodiment, and the details are not described herein again in this embodiment of the present invention.

S406. The base station acquires the RI carried on the REs in the first OFDM symbols.

S407. The base station acquires the at least one of the ACK and the NACK that is carried on the REs in the second OFDM symbols.

S408. The base station acquires at least one of the CQI, the PMI, and the data on the PUSCH that is carried on a first RE, where the first RE is an RE that carries no UL DMRS, carries no RI, and carries no ACK or NACK.

In this embodiment, in the foregoing uplink subframe, the base station may acquire the RI carried on the REs in the first OFDM symbols; may also acquire the at least one of the ACK and the NACK that is carried on the REs in the second OFDM symbols; and may further acquire the at least one of the CQI, the PMI, and the data on the PUSCH that is carried on the first RE, where the first RE is the RE that carries no UL DMRS, carries no RI, and carries no ACK or NACK.

It should be noted that an execution order between S406, S407, and S408 is not limited in this embodiment of the present invention.

In another feasible implementation manner in this embodiment of the present invention, an implementation process of S401 to S403 may be as follows: UE maps an RI to REs in first OFDM symbols; the UE maps at least one of an ACK and a NACK to REs in second OFDM symbols; and the UE maps at least one of a CQI, a PMI, and data on a PUSCH to a first RE, where the first RE is an RE that carries no UL DMRS, carries no RI, and carries no ACK or NACK.

According to the uplink control information transmission method provided in Embodiment 4 of the present invention, UE maps an RI to REs in first OFDM symbols, maps at least one of a CQI, a PMI, and data on a PUSCH to an RE that carries neither UL DMRS nor RI, maps at least one of an ACK and a NACK to REs in second OFDM symbols, overwrites at least one of the CQI, the PMI, and the data on the PUSCH that are carried on the REs in the second OFDM symbols, and sends, to a base station, an uplink subframe that carries UCI. After receiving the uplink subframe, the base station acquires the RI carried on the REs in the first OFDM symbols, acquires the at least one of the ACK and the NACK that is carried on the REs in the second OFDM symbols, and acquires at least one of the CQI, the PMI, and the data on the PUSCH that is carried on a first RE. Because the UCI is carried at a location adjacent to that of the UL DMRS in the uplink subframe, performance of demodulating the UCI by the base station is improved, thereby improving a data transmission rate and a network throughput.

Figure 5:
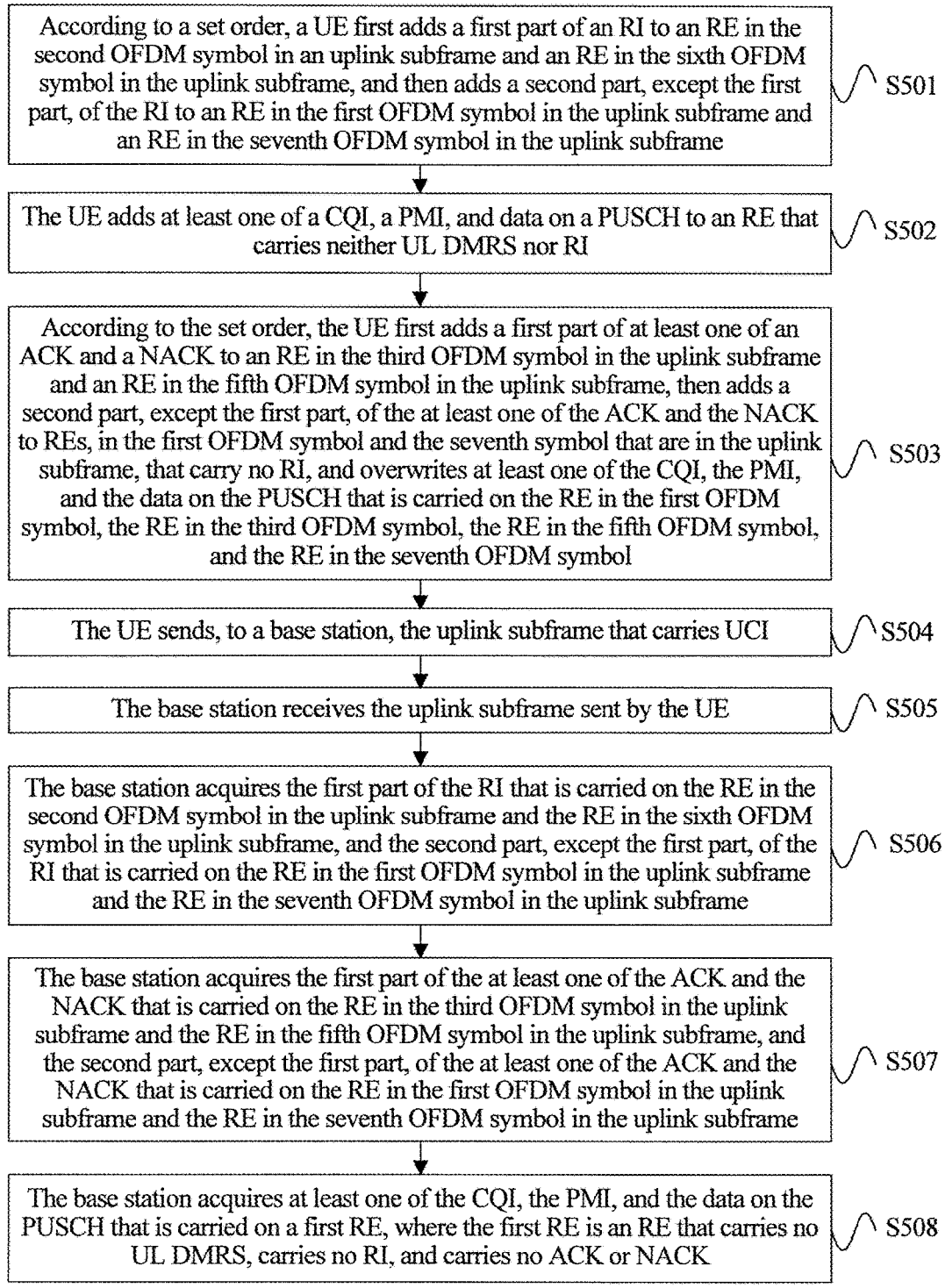
FIG. 5 is a flowchart of Embodiment 5 of an uplink control information transmission method according to the present invention.

FIG. 5 is a flowchart of Embodiment 5 of an uplink control information transmission method according to the present invention. As shown in FIG. 5, the method in this embodiment may include the following steps:

S501. According to a set order, UE first maps a first part of an RI to an RE in the 2nd OFDM symbol in an uplink subframe and an RE in the 6th OFDM symbol in the uplink subframe, and then maps a second part, except the first part, of the RI to an RE in the 1st OFDM symbol in the uplink subframe and an RE in the 7th OFDM symbol in the uplink subframe.

In this embodiment, in a first UL DMRS pattern, REs in one OFDM symbol in the uplink subframe are used to carry a UL DMRS; in the uplink subframe, the UE first maps, according to the set order, the first part of the RI to REs in the 2nd OFDM symbol and the 6th OFDM symbol, and then maps, according to the set order, the second part, except the first part, of the RI (that is, the remaining part of the RI) to the REs in the 1st OFDM symbol and the 7th OFDM symbol. If the RI does not occupy all REs in the 2nd OFDM symbol and the 6th OFDM symbol, or the RI exactly occupies all REs in the 2nd OFDM symbol and the 6th OFDM symbol, it indicates that the first part of the RI is a complete RI, and the second part, except the first part, of the RI is zero, and the UE does not need to map the second part, except the first part, of the RI to the REs in the 1st OFDM symbol and the 7th OFDM symbol.

S502. The UE maps at least one of a CQI, a PMI, and data on a PUSCH to an RE that carries neither UL DMRS nor RI.

In this embodiment, a specific implementation process of S502 is similar to a specific implementation process of S402 in method Embodiment 4 of the present invention. For details, reference may be made to related descriptions in the foregoing embodiment, and the details are not described herein again in this embodiment of the present invention.

S503. According to the set order, the UE first maps a first part of at least one of an ACK and a NACK to an RE in the 3rd OFDM symbol in the uplink subframe and an RE in the 5th OFDM symbol in the uplink subframe, then maps a second part, except the first part, of the at least one of the ACK and the NACK to REs, in the 1st OFDM symbol and the 7th symbol that are in the uplink subframe, that carry no RI, and overwrites at least one of the CQI, the PMI, and the data on the PUSCH that is carried on the RE in the 1st OFDM symbol, the RE in the 3rd OFDM symbol, the RE in the 5th OFDM symbol, and the RE in the 7th OFDM symbol.

In this embodiment, in the uplink subframe, the UE first maps, according to the set order, the first part of the at least one of the ACK and the NACK to the REs in the 3rd OFDM symbol and the 5th OFDM symbol, then maps, according to the set order, the second part, except the first part, of the at least one of the ACK and the NACK (that is, the remaining part of the at least one of the ACK and the NACK) to the REs that are in the 1st OFDM symbol and the 7th symbol and that carry no RI, and overwrites the at least one of the CQI, the PMI, and the data on the PUSCH that are carried on the REs in the 1st OFDM symbol, the 3rd OFDM symbol, the 5th OFDM symbol, and the 7th OFDM symbol. If the at least one of the ACK and the NACK does not occupy all REs in the 3rd OFDM symbol and the 5th OFDM symbol, or the at least one of the ACK and the NACK exactly occupies all REs in the 3rd OFDM symbol and the 5th OFDM symbol, it indicates that the first part of the at least one of the ACK and the NACK is at least one of a complete ACK and a complete NACK, and the second part, except the first part, of the at least one of the ACK and the NACK is zero, and the UE does not need to map the second part, except the first part, of the at least one of the ACK and the NACK to the REs in the 1st OFDM symbol and the 7th OFDM symbol.

Figure 6:
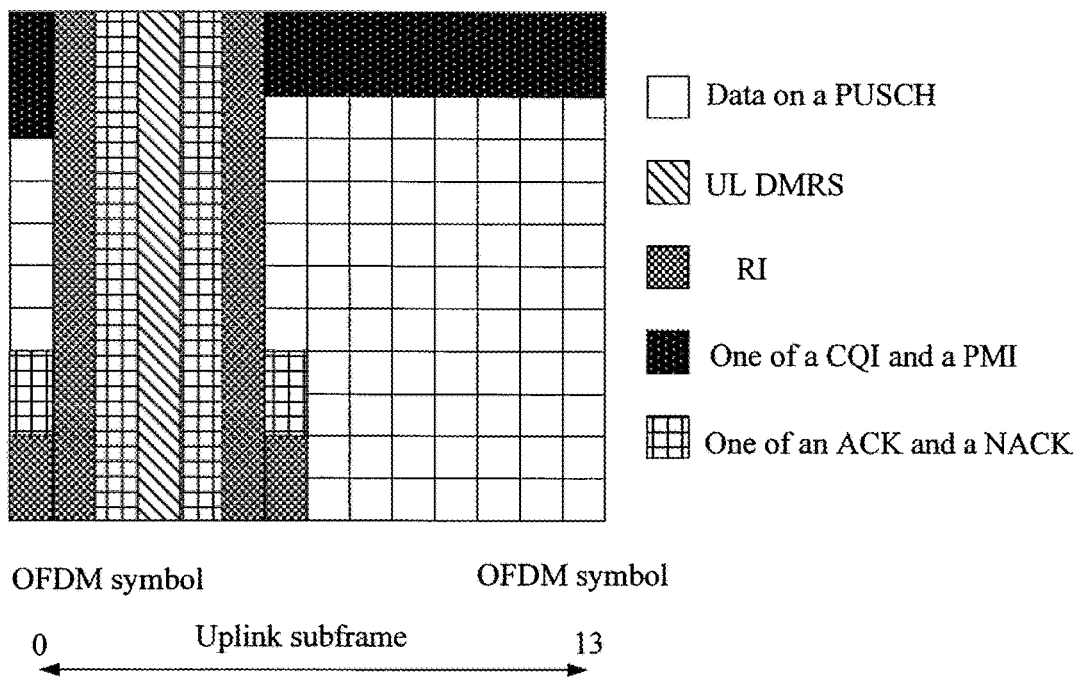
FIG. 6 is a first schematic diagram of a UCI sending format according to the present invention.

In this embodiment, the UE maps the UL DMRS, the RI, the at least one of the CQI, the PMI, and the data on the PUSCH, and the at least one of the ACK and the NACK to the uplink subframe, and a UCI sending format shown in FIG. 6 may be formed. In this embodiment, the UCI sending format shown in FIG. 6 is used to map UCI to the uplink subframe, and then the uplink subframe that carries the UCI is sent to a base station. It should be noted that FIG. 6 is merely used as an example for description, and this embodiment of the present invention is not limited to the UCI sending format shown in FIG. 6.

S504. The UE sends, to a base station, the uplink subframe that carries UCI.

S505. The base station receives the uplink subframe sent by the UE.

In this embodiment, a specific implementation process of S504 and S505 is similar to a specific implementation process of S404 and S405 in method Embodiment 4 of the present invention. For details, reference may be made to related descriptions in the foregoing embodiment, and the details are not described herein again in this embodiment of the present invention.

S506. The base station acquires the first part of the RI that is carried on the RE in the 2nd OFDM symbol in the uplink subframe and the RE in the 6th OFDM symbol in the uplink subframe, and the second part, except the first part, of the RI that is carried on the RE in the 1st OFDM symbol in the uplink subframe and the RE in the 7th OFDM symbol in the uplink subframe.

S507. The base station acquires the first part of the at least one of the ACK and the NACK that is carried on the RE in the 3rd OFDM symbol in the uplink subframe and the RE in the 5th OFDM symbol in the uplink subframe, and the second part, except the first part, of the at least one of the ACK and the NACK that is carried on the RE in the 1st OFDM symbol in the uplink subframe and the RE in the 7th OFDM symbol in the uplink subframe.

S508. The base station acquires at least one of the CQI, the PMI, and the data on the PUSCH that is carried on a first RE, where the first RE is an RE that carries no UL DMRS, carries no RI, and carries no ACK or NACK.

In this embodiment, according to the UCI sending format shown in FIG. 6, the base station may acquire the first part of the RI that is carried on the RE in the 2nd OFDM symbol and the RE in the 6th OFDM symbol, and the second part, except the first part, of the RI that is carried on the RE in the 1st OFDM symbol and the RE in the 7th OFDM symbol, where if the RE in the 1st OFDM symbol and the RE in the 7th OFDM symbol carry no RI, the base station may not acquire the RI from the RE in the 1st OFDM symbol and the RE in the 7th OFDM symbol; the base station may also acquire the first part of the at least one of the ACK and the NACK that is carried on the RE in the 3rd OFDM symbol and the RE in the 5th OFDM symbol, and the second part, except the first part, of the at least one of the ACK and the NACK that is carried on the RE in the 1st OFDM symbol and the RE in the 7th OFDM symbol, where if the RE in the 1st OFDM symbol and the RE in the 7th OFDM symbol carry neither ACK nor NACK, the base station may not acquire the at least one of the ACK and the NACK from the RE in the 1st OFDM symbol and the RE in the 7th OFDM symbol; the base station may further acquire the at least one of the CQI, the PMI, and the data on the PUSCH from the RE that carries no UL DMRS, carries no RI, and carries no ACK or NACK.

It should be noted that an execution order between S506, S507, and S508 is not limited in this embodiment of the present invention.

In another feasible implementation manner in this embodiment of the present invention, an implementation process of S501 to S503 may be as follows: According to a set order, UE first maps a first part of an RI to an RE in the 2nd OFDM symbol in an uplink subframe and an RE in the 6th OFDM symbol in the uplink subframe, and then maps a second part, except the first part, of the RI to an RE in the 1st OFDM symbol in the uplink subframe and an RE in the 7th OFDM symbol in the uplink subframe; according to the set order, the UE first maps a first part of at least one of an ACK and a NACK to an RE in the 3rd OFDM symbol in the uplink subframe and an RE in the 5th OFDM symbol in the uplink subframe, and then maps a second part, except the first part, of the at least one of the ACK and the NACK to REs, in the 1st OFDM symbol and the 7th symbol that are in the uplink subframe, that carry no RI; and the UE maps at least one of a CQI, a PMI, and data on a PUSCH to a first RE, where the first RE is an RE that carries no UL DMRS, carries no RI, and carries no ACK or NACK.

According to the uplink control information transmission method provided in Embodiment 5 of the present invention, because UCI is carried at a location adjacent to that of a UL DMRS in an uplink subframe, performance of demodulating the UCI by a base station is improved, thereby improving a data transmission rate and a network throughput.

Figure 7:
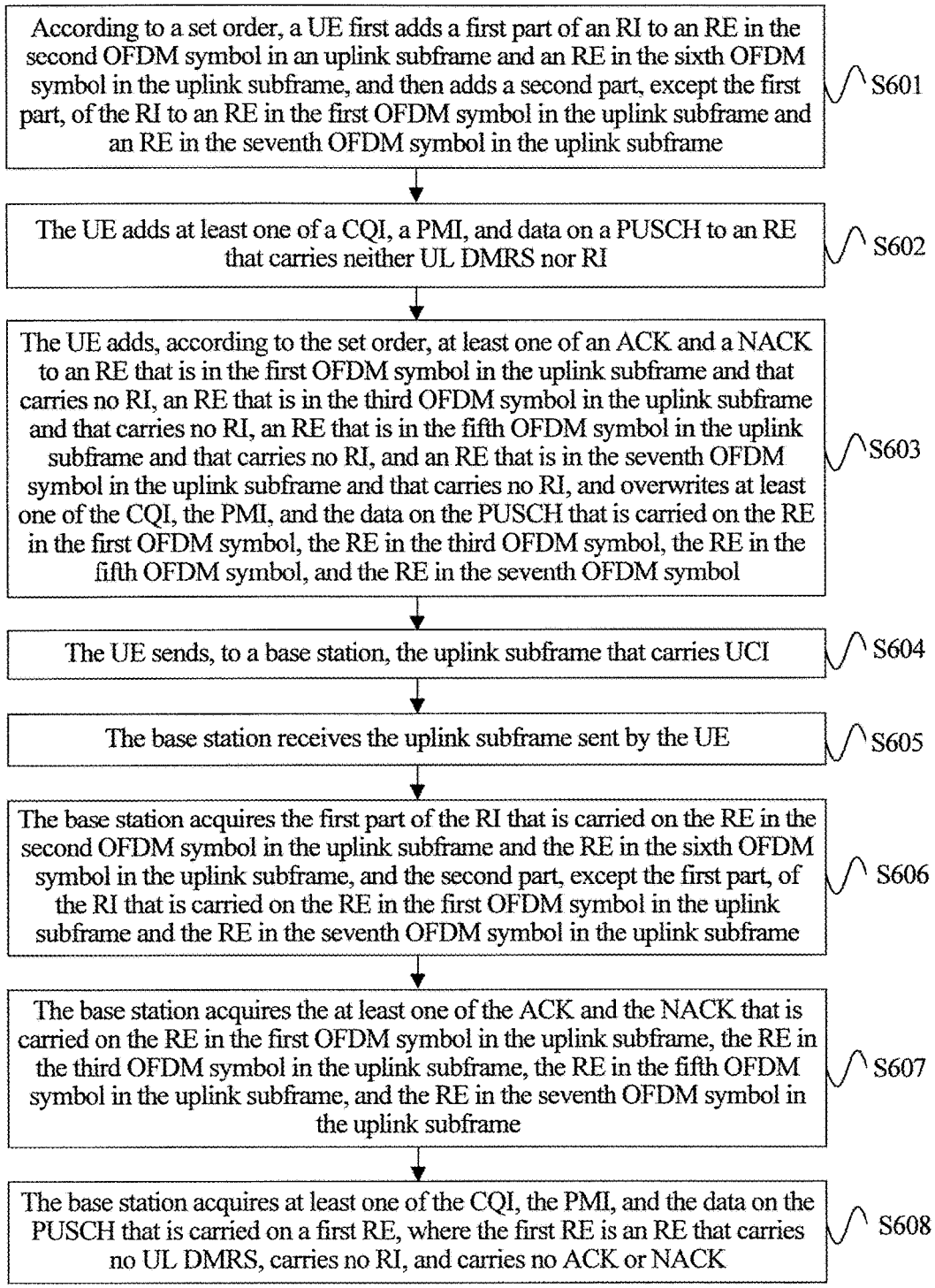
FIG. 7 is a flowchart of Embodiment 6 of an uplink control information transmission method according to the present invention.

FIG. 7 is a flowchart of Embodiment 6 of an uplink control information transmission method according to the present invention. As shown in FIG. 7, the method in this embodiment may include the following steps:

S601. According to a set order, UE first maps a first part of an RI to an RE in the 2nd OFDM symbol in an uplink subframe and an RE in the 6th OFDM symbol in the uplink subframe, and then maps a second part, except the first part, of the RI to an RE in the 1st OFDM symbol in the uplink subframe and an RE in the 7th OFDM symbol in the uplink subframe.

In this embodiment, a specific implementation process of S601 is similar to a specific implementation process of S501 in method Embodiment 5 of the present invention. For details, reference may be made to related descriptions in the foregoing embodiment, and the details are not described herein again in this embodiment of the present invention.

S602. The UE maps at least one of a CQI, a PMI, and data on a PUSCH to an RE that carries neither UL DMRS nor RI.

In this embodiment, a specific implementation process of S602 is similar to a specific implementation process of S402 in method Embodiment 4 of the present invention. For details, reference may be made to related descriptions in the foregoing embodiment, and the details are not described herein again in this embodiment of the present invention.

S603. The UE maps, according to the set order, at least one of an ACK and a NACK to an RE that is in the 1st OFDM symbol in the uplink subframe and that carries no RI, an RE that is in the 3rd OFDM symbol in the uplink subframe and that carries no RI, an RE that is in the 5th OFDM symbol in the uplink subframe and that carries no RI, and an RE that is in the 7th OFDM symbol in the uplink subframe and that carries no RI, and overwrites at least one of the CQI, the PMI, and the data on the PUSCH that is carried on the RE in the 1st OFDM symbol, the RE in the 3rd OFDM symbol, the RE in the 5th OFDM symbol, and the RE in the 7th OFDM symbol.

Figure 8:
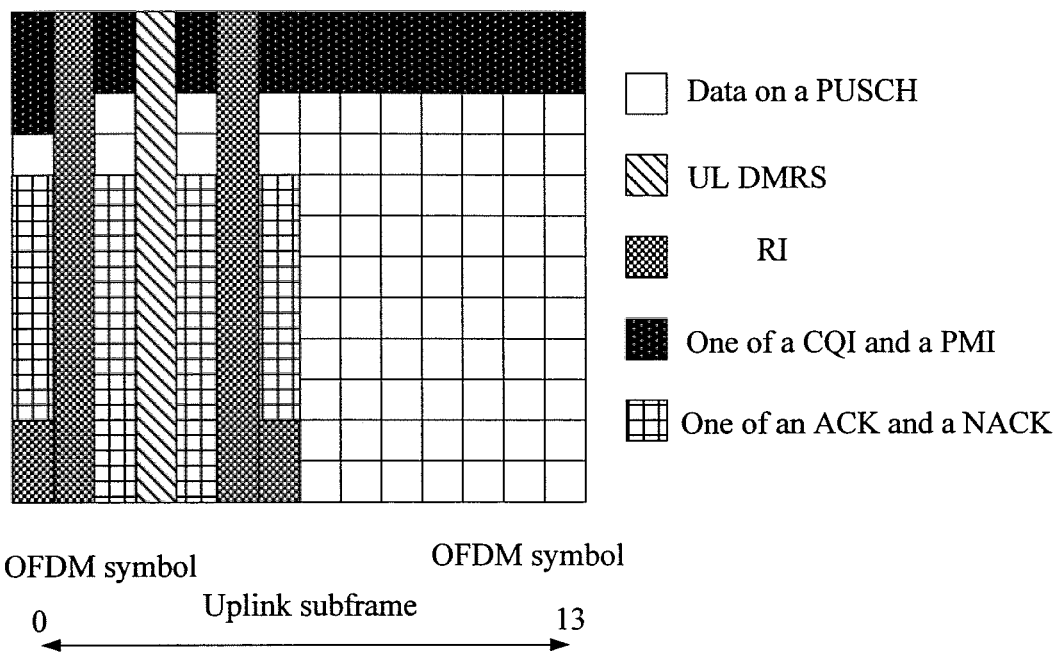
FIG. 8 is a second schematic diagram of a UCI sending format according to the present invention.

In this embodiment, the UE maps the UL DMRS, the RI, the at least one of the CQI, the PMI, and the data on the PUSCH, and the at least one of the ACK and the NACK to the uplink subframe, and a UCI sending format shown in FIG. 8 may be formed. In this embodiment, the UCI sending format shown in FIG. 8 is used to map UCI to the uplink subframe, and then the uplink subframe that carries the UCI is sent to a base station. It should be noted that FIG. 8 is merely used as an example for description, and this embodiment of the present invention is not limited to the UCI sending format shown in FIG. 8.

S604. The UE sends, to a base station, the uplink subframe that carries UCI.

S605. The base station receives the uplink subframe sent by the UE.

In this embodiment, a specific implementation process of S504 and S505 is similar to a specific implementation process of S404 and S405 in method Embodiment 4 of the present invention. For details, reference may be made to related descriptions in the foregoing embodiment, and the details are not described herein again in this embodiment of the present invention.

S606. The base station acquires the first part of the RI that is carried on the RE in the 2nd OFDM symbol in the uplink subframe and the RE in the 6th OFDM symbol in the uplink subframe, and the second part, except the first part, of the RI that is carried on the RE in the 1st OFDM symbol in the uplink subframe and the RE in the 7th OFDM symbol in the uplink subframe.

S607. The base station acquires the at least one of the ACK and the NACK that is carried on the RE in the 1st OFDM symbol in the uplink subframe, the RE in the 3rd OFDM symbol in the uplink subframe, the RE in the 5th OFDM symbol in the uplink subframe, and the RE in the 7th OFDM symbol in the uplink subframe.

S608. The base station acquires at least one of the CQI, the PMI, and the data on the PUSCH that is carried on a first RE, where the first RE is an RE that carries no UL DMRS, carries no RI, and carries no ACK or NACK.

In this embodiment, according to the UCI sending format shown in FIG. 8, the base station may acquire the first part of the RI that is carried on the RE in the 2nd OFDM symbol and the RE in the 6th OFDM symbol, and the second part, except the first part, of the RI that is carried on the REs in the 1st OFDM symbol and the 7th OFDM symbol, where if the RE in the 1st OFDM symbol and the RE in the 7th OFDM symbol carry no RI, the base station may not acquire the RI from the RE in the 1st OFDM symbol and the RE in the 7th OFDM symbol; the base station may also acquire the at least one of the ACK and the NACK that is carried on the RE in the 1st OFDM symbol, the RE in the 3rd OFDM symbol, the RE in the 5th OFDM symbol, and the RE in the 7th OFDM symbol; and the base station may further acquire the at least one of the CQI, the PMI, and the data on the PUSCH from the RE that carries no UL DMRS, carries no RI, and carries no ACK or NACK.

It should be noted that an execution order between S606, S607, and S608 is not limited in this embodiment of the present invention.

In another feasible implementation manner in this embodiment of the present invention, an implementation process of S601 to S603 may be as follows: According to a set order, UE first maps a first part of an RI to an RE in the 2nd OFDM symbol in an uplink subframe and an RE in the 6th OFDM symbol in the uplink subframe, and then maps a second part, except the first part, of the RI to an RE in the 1st OFDM symbol in the uplink subframe and an RE in the 7th OFDM symbol in the uplink subframe; the UE maps, according to the set order, at least one of an ACK and a NACK to an RE that is in the 1st OFDM symbol in the uplink subframe and that carries no RI, an RE that is in the 3rd OFDM symbol in the uplink subframe and that carries no RI, an RE that is in the 5th OFDM symbol in the uplink subframe and that carries no RI, and an RE that is in the 7th OFDM symbol in the uplink subframe and that carries no RI; and the UE maps at least one of a CQI, a PMI, and data on a PUSCH to a first RE, where the first RE is an RE that carries no UL DMRS, carries no RI, and carries no ACK or NACK.

According to the uplink control information transmission method provided in Embodiment 6 of the present invention, because UCI is carried at a location adjacent to that of a UL DMRS in an uplink subframe, performance of demodulating the UCI by a base station is improved, thereby improving a data transmission rate and a network throughput.

Figure 9:
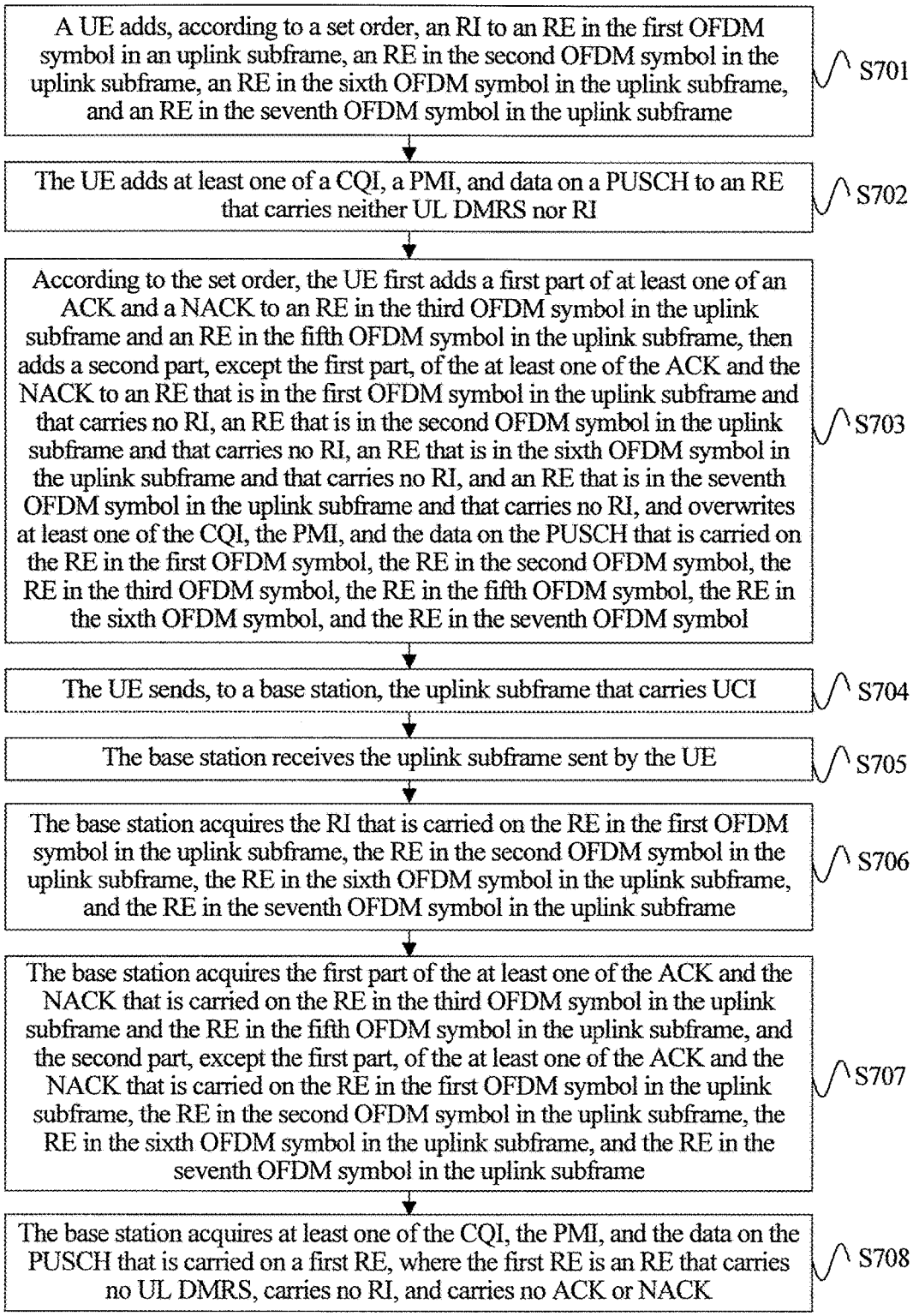
FIG. 9 is a flowchart of Embodiment 7 of an uplink control information transmission method according to the present invention.

FIG. 9 is a flowchart of Embodiment 7 of an uplink control information transmission method according to the present invention. As shown in FIG. 9, the method in this embodiment may include the following steps:

S701. UE maps, according to a set order, an RI to an RE in the 1st OFDM symbol in an uplink subframe, an RE in the 2nd OFDM symbol in the uplink subframe, an RE in the 6th OFDM symbol in the uplink subframe, and an RE in the 7th OFDM symbol in the uplink subframe.

S702. The UE maps at least one of a CQI, a PMI, and data on a PUSCH to an RE that carries neither UL DMRS nor RI.

In this embodiment, a specific implementation process of S702 is similar to a specific implementation process of S402 in method Embodiment 4 of the present invention. For details, reference may be made to related descriptions in the foregoing embodiment, and the details are not described herein again in this embodiment of the present invention.

S703. According to the set order, the UE first maps a first part of at least one of an ACK and a NACK to an RE in the 3rd OFDM symbol in the uplink subframe and an RE in the 5th OFDM symbol in the uplink subframe, then maps a second part, except the first part, of the at least one of the ACK and the NACK to an RE that is in the 1st OFDM symbol in the uplink subframe and that carries no RI, an RE that is in the 2nd OFDM symbol in the uplink subframe and that carries no RI, an RE that is in the 6th OFDM symbol in the uplink subframe and that carries no RI, and an RE that is in the 7th OFDM symbol in the uplink subframe and that carries no RI, and overwrites at least one of the CQI, the PMI, and the data on the PUSCH that is carried on the RE in the 1st OFDM symbol, the RE in the 2nd OFDM symbol, the RE in the 3rd OFDM symbol, the RE in the 5th OFDM symbol, the RE in the 6th OFDM symbol, and the RE in the 7th OFDM symbol.

In this embodiment, in the uplink subframe, the UE first maps, according to the set order, the at least one of the ACK and the NACK to all REs in the 3rd OFDM symbol and the 5th OFDM symbol; then maps, according to the set order, the second part, except the first part, of the at least one of the ACK and the NACK (that is, the remaining part of the ACK and/or the NACK) to the REs that are in the 1st OFDM symbol, the 2nd OFDM symbol, the 6th OFDM symbol, and the 7th OFDM symbol and that carry no RI; and overwrites the at least one of the CQI, the PMI, and the data on the PUSCH that are carried on the REs in the 1st OFDM symbol, the 2nd OFDM symbol, the 3rd OFDM symbol, the 5th OFDM symbol, the 6th OFDM symbol, and the 7th OFDM symbol. If the at least one of the ACK and the NACK does not occupy all REs in the 3rd OFDM symbol and the 5th OFDM symbol, or the at least one of the ACK and the NACK exactly occupies all REs in the 3rd OFDM symbol and the 5th OFDM symbol, it indicates that the first part of the at least one of the ACK and the NACK is at least one of a complete ACK and a complete NACK, and the second part, except the first part, of the at least one of the ACK and the NACK is zero, and the UE does not need to map the second part, except the first part, of the at least one of the ACK and the NACK to the REs in the 1st OFDM symbol, the 2nd OFDM symbol, the 6th OFDM symbol, and the 7th OFDM symbol.

Figure 10:
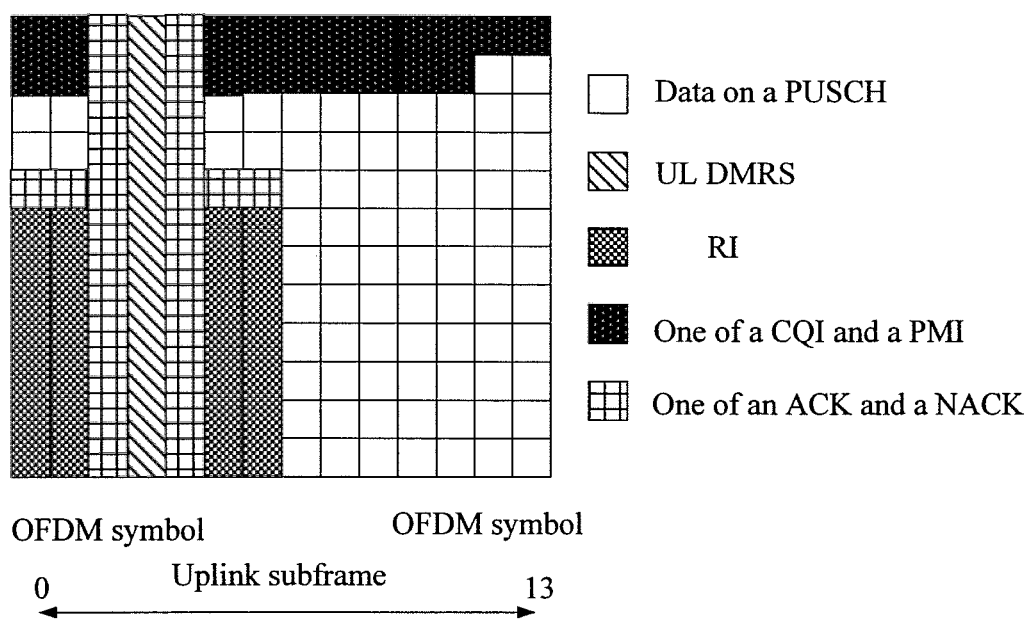
FIG. 10 is a third schematic diagram of a UCI sending format according to the present invention.

In this embodiment, the UE maps the UL DMRS, the RI, the at least one of the CQI, the PMI, and the data on the PUSCH, and the at least one of the ACK and the NACK to the uplink subframe using a first UL DMRS pattern, and a UCI sending format shown in FIG. 10 may be formed. In this embodiment, the UCI sending format shown in FIG. 10 is used to map UCI to the uplink subframe, and then the uplink subframe that carries the UCI is sent to a base station. It should be noted that FIG. 10 is merely used as an example for description, and this embodiment of the present invention is not limited to the UCI sending format shown in FIG. 10.

S704. The UE sends, to a base station, the uplink subframe that carries UCI.

S705. The base station receives the uplink subframe sent by the UE.

In this embodiment, a specific implementation process of S704 and S705 is similar to a specific implementation process of S404 and S405 in method Embodiment 4 of the present invention. For details, reference may be made to related descriptions in the foregoing embodiment, and the details are not described herein again in this embodiment of the present invention.

S706. The base station acquires the RI that is carried on the RE in the 1st OFDM symbol in the uplink subframe, the RE in the 2nd OFDM symbol in the uplink subframe, the RE in the 6th OFDM symbol in the uplink subframe, and the RE in the 7th OFDM symbol in the uplink subframe.

S707. The base station acquires the first part of the at least one of the ACK and the NACK that is carried on the RE in the 3rd OFDM symbol in the uplink subframe and the RE in the 5th OFDM symbol in the uplink subframe, and the second part, except the first part, of the at least one of the ACK and the NACK that is carried on the RE in the 1st OFDM symbol in the uplink subframe, the RE in the 2nd OFDM symbol in the uplink subframe, the RE in the 6th OFDM symbol in the uplink subframe, and the RE in the 7th OFDM symbol in the uplink subframe.

S708. The base station acquires at least one of the CQI, the PMI, and the data on the PUSCH that is carried on a first RE, where the first RE is an RE that carries no UL DMRS, carries no RI, and carries no ACK or NACK.

In this embodiment, according to the UCI sending format shown in FIG. 10, the base station may acquire the RI that is carried on the RE in the 1st OFDM symbol, the RE in the 2nd OFDM symbol, the RE in the 6th OFDM symbol, and the RE in the 7th OFDM symbol; the base station may also acquire the first part of the at least one of the ACK and the NACK that is carried on the RE in the 3rd OFDM symbol and the RE in the 5th OFDM symbol, and the second part, except the first part, of the at least one of the ACK and the NACK that is carried on the RE in the 1st OFDM symbol, the RE in the 2nd OFDM symbol, the RE in the 6th OFDM symbol, and the RE in the 7th OFDM symbol, where if the RE in the 3rd OFDM symbol and the RE in the 5th OFDM symbol carry no ACK and NACK, the base station may not acquire the at least one of the ACK and the NACK from the RE in the 1st OFDM symbol, the RE in the 2nd OFDM symbol, the RE in the 6th OFDM symbol, and the RE in the 7th OFDM symbol; the base station may further acquire the at least one of the CQI, the PMI, and the data on the PUSCH from the RE that carries no UL DMRS, carries no RI, and carries no ACK or NACK.

It should be noted that an execution order between S706, S707, and S708 is not limited in this embodiment of the present invention.

In another feasible implementation manner in this embodiment of the present invention, an implementation process of S701 to S703 may be as follows: UE maps, according to a set order, an RI to an RE in the 1st OFDM symbol in an uplink subframe, an RE in the 2nd OFDM symbol in the uplink subframe, an RE in the 6th OFDM symbol in the uplink subframe, and an RE in the 7th OFDM symbol in the uplink subframe; according to the set order, the UE first maps a first part of at least one of an ACK and a NACK to an RE in the 3rd OFDM symbol in the uplink subframe and an RE in the 5th OFDM symbol in the uplink subframe, and then maps a second part, except the first part, of the at least one of the ACK and the NACK to an RE that is in the 1st OFDM symbol in the uplink subframe and that carries no RI, an RE that is in the 2nd OFDM symbol in the uplink subframe and that carries no RI, an RE that is in the 6th OFDM symbol in the uplink subframe and that carries no RI, and an RE that is in the 7th OFDM symbol in the uplink subframe and that carries no RI; and the UE maps at least one of a CQI, a PMI, and data on a PUSCH to a first RE, where the first RE is an RE that carries no UL DMRS, carries no RI, and carries no ACK or NACK.

According to the uplink control information transmission method provided in Embodiment 7 of the present invention, because UCI is carried at a location adjacent to that of a UL DMRS in an uplink subframe, performance of demodulating the UCI by a base station is improved, thereby improving a data transmission rate and a network throughput.

Figure 11:
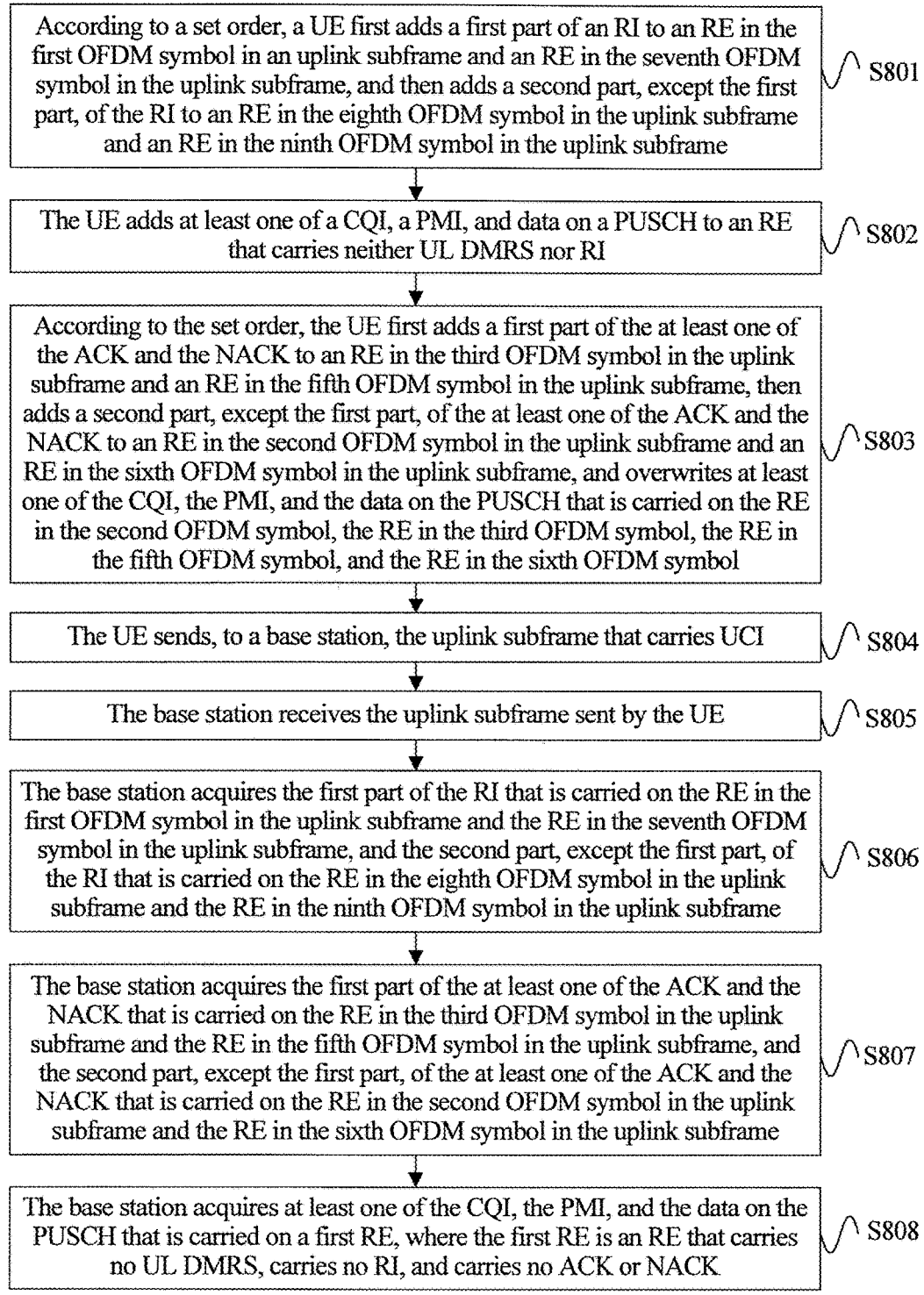
FIG. 11 is a flowchart of Embodiment 8 of an uplink control information transmission method according to the present invention.

FIG. 11 is a flowchart of Embodiment 8 of an uplink control information transmission method according to the present invention. As shown in FIG. 11, the method in this embodiment may include the following steps:

S801. According to a set order, UE first maps a first part of an RI to an RE in the 1st OFDM symbol in an uplink subframe and an RE in the 7th OFDM symbol in the uplink subframe, and then maps a second part, except the first part, of the RI to an RE in the 8th OFDM symbol in the uplink subframe and an RE in the 9th OFDM symbol in the uplink subframe.

In this embodiment, in the uplink subframe, the UE first maps, according to the set order, the first part of the RI to the REs in the 1st OFDM symbol and the 7th OFDM symbol, and then maps, according to the set order, the second part, except the first part, of the RI (that is, the remaining part of the RI) to the REs in the 8th OFDM symbol and the ninth OFDM symbol. If the RI does not occupy all REs in the 1st OFDM symbol and the 7th OFDM symbol, or the RI exactly occupies all REs in the 1st OFDM symbol and the 7th OFDM symbol, it indicates that the first part of the RI is a complete RI, and the second part, except the first part, of the RI is zero, and the UE does not need to map the second part, except the first part, of the RI to the REs in the 8th OFDM symbol and the ninth OFDM symbol.

S802. The UE maps at least one of a CQI, a PMI, and data on a PUSCH to an RE that carries neither UL DMRS nor RI.

In this embodiment, a specific implementation process of S802 is similar to a specific implementation process of S402 in method Embodiment 4 of the present invention. For details, reference may be made to related descriptions in the foregoing embodiment, and the details are not described herein again in this embodiment of the present invention.

S803. According to the set order, the UE first maps a first part of the at least one of the ACK and the NACK to an RE in the 3rd OFDM symbol in the uplink subframe and an RE in the 5th OFDM symbol in the uplink subframe, then maps a second part, except the first part, of the at least one of the ACK and the NACK to an RE in the 2nd OFDM symbol in the uplink subframe and an RE in the 6th OFDM symbol in the uplink subframe, and overwrites at least one of the CQI, the PMI, and the data on the PUSCH that is carried on the RE in the 2nd OFDM symbol, the RE in the 3rd OFDM symbol, the RE in the 5th OFDM symbol, and the RE in the 6th OFDM symbol.

In this embodiment, in the uplink subframe, the UE first maps, according to the set order, the first part of the at least one of the ACK and the NACK to the REs in the 3rd OFDM symbol and the 5th OFDM symbol; then maps, according to the set order, the second part, except the first part, of the at least one of the ACK and the NACK (that is, the remaining part of the ACK and/or the NACK) to the REs in the 2nd OFDM symbol and the 6th OFDM symbol; and overwrites the at least one of the CQI, the PMI, and the data on the PUSCH that are carried on the REs in the 2nd OFDM symbol, the 3rd OFDM symbol, the 5th OFDM symbol, and the seventh OFDM symbol. If the at least one of the ACK and the NACK does not occupy all REs in the 3rd OFDM symbol and the 5th OFDM symbol, or the at least one of the ACK and the NACK exactly occupies all REs in the 3rd OFDM symbol and the 5th OFDM symbol, it indicates that the first part of the at least one of the ACK and the NACK is at least one of a complete ACK and a complete NACK, and the second part, except the first part, of the at least one of the ACK and the NACK is zero, and the UE does not need to map the second part, except the first part, of the at least one of the ACK and the NACK to the REs in the 2nd OFDM symbol and the 6th OFDM symbol.

Figure 12:
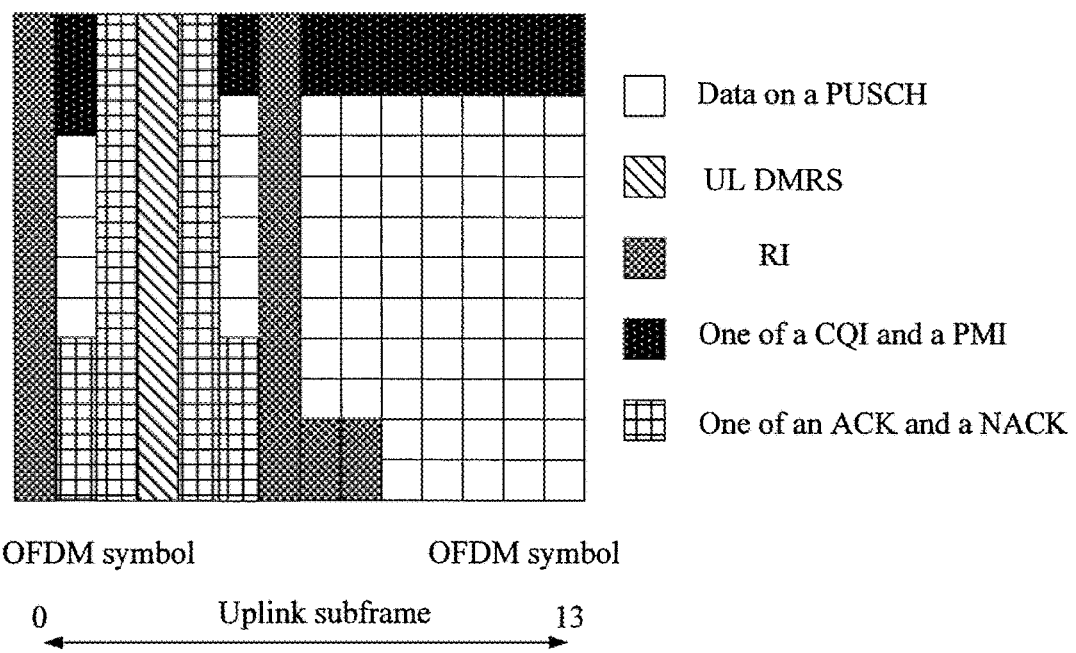
FIG. 12 is a fourth schematic diagram of a UCI sending format according to the present invention.

In this embodiment, the UE maps the UL DMRS, the RI, the at least one of the CQI, the PMI, and the data on the PUSCH, and the at least one of the ACK and the NACK to the uplink subframe, and a UCI sending format shown in FIG. 12 may be formed. In this embodiment, the UCI sending foonat shown in FIG. 12 is used to map UCI to the uplink subframe, and then the uplink subframe that carries the UCI is sent to a base station. It should be noted that FIG. 10 is merely used as an example for description, and this embodiment of the present invention is not limited to the UCI sending format shown in FIG. 10.

S804. The UE sends, to a base station, the uplink subframe that carries UCI.

S805. The base station receives the uplink subframe sent by the UE.

In this embodiment, a specific implementation process of S804 and S805 is similar to a specific implementation process of S404 and S405 in method Embodiment 4 of the present invention. For details, reference may be made to related descriptions in the foregoing embodiment, and the details are not described herein again in this embodiment of the present invention.

S806. The base station acquires the first part of the RI that is carried on the RE in the 1st OFDM symbol in the uplink subframe and the RE in the 7th OFDM symbol in the uplink subframe, and the second part, except the first part, of the RI that is carried on the RE in the 8th OFDM symbol in the uplink subframe and the RE in the 9th OFDM symbol in the uplink subframe.

S807. The base station acquires the first part of the at least one of the ACK and the NACK that is carried on the RE in the 3rd OFDM symbol in the uplink subframe and the RE in the 5th OFDM symbol in the uplink subframe, and the second part, except the first part, of the at least one of the ACK and the NACK that is carried on the RE in the 2nd OFDM symbol in the uplink subframe and the RE in the 6th OFDM symbol in the uplink subframe.

S808. The base station acquires at least one of the CQI, the PMI, and the data on the PUSCH that is carried on a first RE, where the first RE is an RE that carries no UL DMRS, carries no RI, and carries no ACK or NACK.

In this embodiment, according to the UCI sending format shown in FIG. 12, the base station may acquire the first part of the RI that is carried on the RE in the 1st OFDM symbol and the RE in the 7th OFDM symbol, and the second part, except the first part, of the RI that is carried on the RE in the 8th OFDM symbol and the RE in the ninth OFDM symbol, where if the RE in the 8th OFDM symbol and the RE in the 9th OFDM symbol carry no RI, the base station may not acquire the RI from the RE in the 8th OFDM symbol and the RE in the ninth OFDM symbol; the base station may also acquire the at least one of the ACK and the NACK that is carried on the RE in the 3rd OFDM symbol and the RE in the 5th OFDM symbol and that is carried on the RE in the 2nd OFDM symbol and the RE in the 6th OFDM symbol, where if the RE in the 2nd OFDM symbol and the RE in the 6th OFDM symbol carry neither ACK nor NACK, the base station may not acquire the at least one of the ACK and the NACK from the RE in the 2nd OFDM symbol and the RE in the 6th OFDM symbol; the base station may further acquire the at least one of the CQI, the PMI, and the data on the PUSCH from the RE that carries no UL DMRS, carries no RI, and carries no ACK or NACK.

It should be noted that an execution order between S806, S807, and S808 is not limited in this embodiment of the present invention.

In another feasible implementation manner in this embodiment of the present invention, an implementation process of S801 to S803 may be as follows: According to a set order, UE first maps a first part of an RI to an RE in the 1st OFDM symbol in an uplink subframe and an RE in the 7th OFDM symbol in the uplink subframe, and then maps a second part, except the first part, of the RI to an RE in the 8th OFDM symbol in the uplink subframe and an RE in the 9th OFDM symbol in the uplink subframe; according to the set order, the UE first maps a first part of at least one of an ACK and a NACK to an RE in the 3rd OFDM symbol in the uplink subframe and an RE in the 5th OFDM symbol in the uplink subframe, and then maps a second part, except the first part, of the at least one of the ACK and the NACK to an RE in the 2nd OFDM symbol in the uplink subframe and an RE in the 6th OFDM symbol in the uplink subframe; and the UE maps at least one of a CQI, a PMI, and data on a PUSCH to a first RE, where the first RE is an RE that carries no UL DMRS, carries no RI, and carries no ACK or NACK.

According to the uplink control information transmission method provided in Embodiment 8 of the present invention, because UCI is carried at a location adjacent to that of a UL DMRS in an uplink subframe, performance of demodulating the UCI by a base station is improved, thereby improving a data transmission rate and a network throughput.

Figure 13:
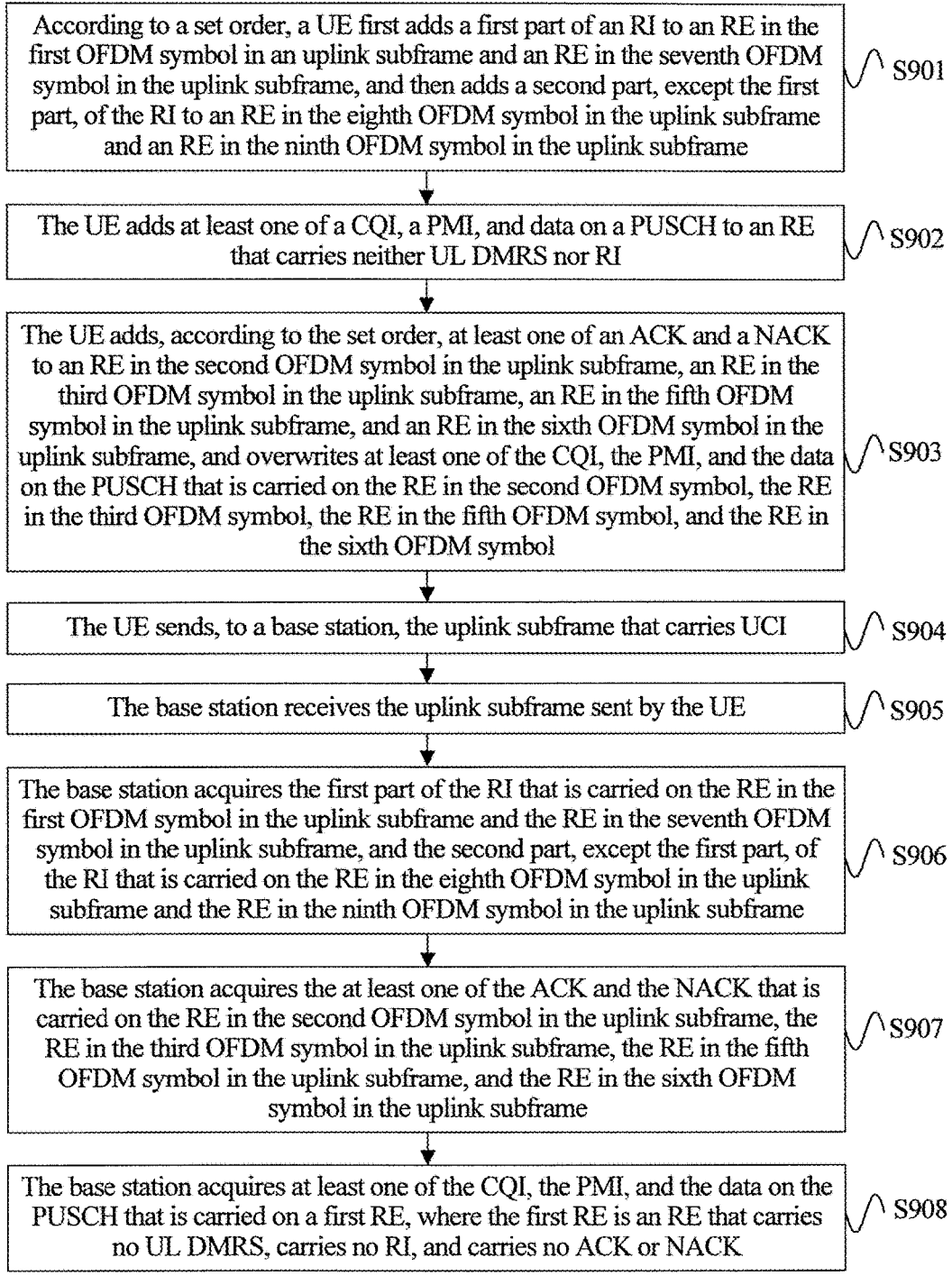
FIG. 13 is a flowchart of Embodiment 9 of an uplink control information transmission method according to the present invention.

FIG. 13 is a flowchart of Embodiment 9 of an uplink control information transmission method according to the present invention. As shown in FIG. 13, the method in this embodiment may include the following steps:

S901. According to a set order, UE first maps a first part of an RI to an RE in the 1st OFDM symbol in an uplink subframe and an RE in the 7th OFDM symbol in the uplink subframe, and then maps a second part, except the first part, of the RI to an RE in the 8th OFDM symbol in the uplink subframe and an RE in the 9th OFDM symbol in the uplink subframe.

In this embodiment, a specific implementation process of S901 is similar to a specific implementation process of S801 in method Embodiment 8 of the present invention. For details, reference may be made to related descriptions in the foregoing embodiment, and the details are not described herein again in this embodiment of the present invention.

S902. The UE maps at least one of a CQI, a PMI, and data on a PUSCH to an RE that carries neither UL DMRS nor RI.

In this embodiment, a specific implementation process of S902 is similar to a specific implementation process of S402 in method Embodiment 4 of the present invention. For details, reference may be made to related descriptions in the foregoing embodiment, and the details are not described herein again in this embodiment of the present invention.

S903. The UE maps, according to the set order, at least one of an ACK and a NACK to an RE in the 2nd OFDM symbol in the uplink subframe, an RE in the 3rd OFDM symbol in the uplink subframe, an RE in the 5th OFDM symbol in the uplink subframe, and an RE in the 6th OFDM symbol in the uplink subframe, and overwrites at least one of the CQI, the PMI, and the data on the PUSCH that is carried on the RE in the 2nd OFDM symbol, the RE in the 3rd OFDM symbol, the RE in the 5th OFDM symbol, and the RE in the 6th OFDM symbol.

Figure 14:
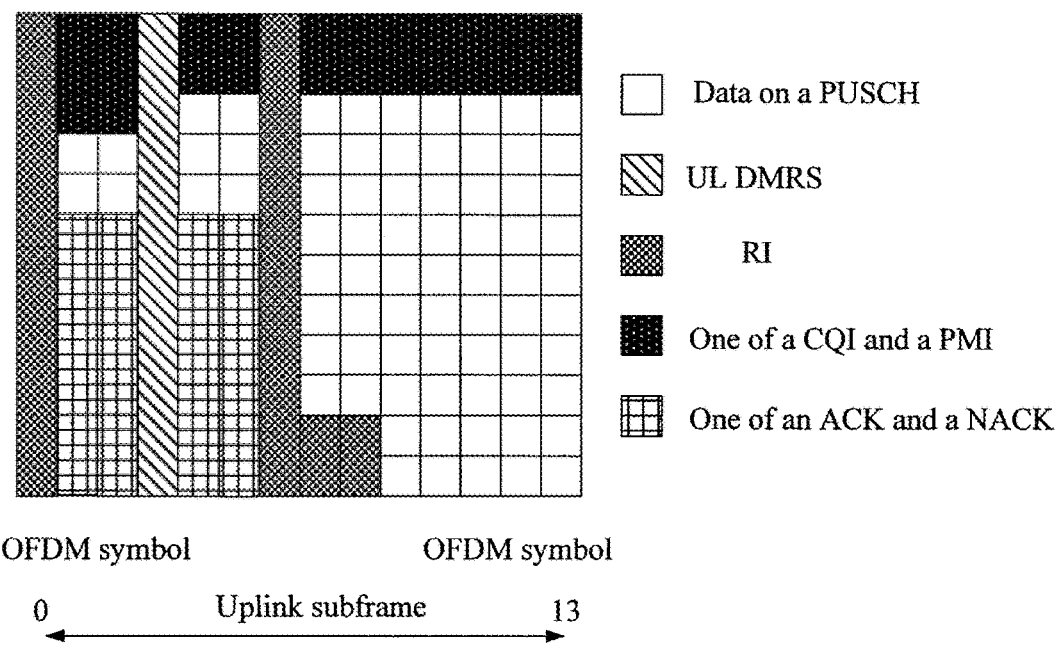
FIG. 14 is a fifth schematic diagram of a UCI sending format according to the present invention.

In this embodiment, the UE maps the UL DMRS, the RI, the at least one of the CQI, the PMI, and the data on the PUSCH, and the at least one of the ACK and the NACK to the uplink subframe, and a UCI sending format shown in FIG. 14 may be formed. In this embodiment, the UCI sending format shown in FIG. 14 is used to map UCI to the uplink subframe, and then the uplink subframe that carries the UCI is sent to a base station. It should be noted that FIG. 14 is merely used as an example for description, and this embodiment of the present invention is not limited to the UCI sending format shown in FIG. 14.

S904. The UE sends, to a base station, the uplink subframe that carries UCI.

S905. The base station receives the uplink subframe sent by the UE.

In this embodiment, a specific implementation process of S904 and S905 is similar to a specific implementation process of S404 and S405 in method Embodiment 4 of the present invention. For details, reference may be made to related descriptions in the foregoing embodiment, and the details are not described herein again in this embodiment of the present invention.

S906. The base station acquires the first part of the RI that is carried on the RE in the 1st OFDM symbol in the uplink subframe and the RE in the 7th OFDM symbol in the uplink subframe, and the second part, except the first part, of the RI that is carried on the RE in the 8th OFDM symbol in the uplink subframe and the RE in the 9th OFDM symbol in the uplink subframe.

S907. The base station acquires the at least one of the ACK and the NACK that is carried on the RE in the 2nd OFDM symbol in the uplink subframe, the RE in the 3rd OFDM symbol in the uplink subframe, the RE in the 5th OFDM symbol in the uplink subframe, and the RE in the 6th OFDM symbol in the uplink subframe.

S908. The base station acquires at least one of the CQI, the PMI, and the data on the PUSCH that is carried on a first RE, where the first RE is an RE that carries no UL DMRS, carries no RI, and carries no ACK or NACK.

In this embodiment, according to the UCI sending fonnat shown in FIG. 14, the base station may acquire the first part of the RI that is carried on the RE in the 1st OFDM symbol and the RE in the 7th OFDM symbol, and the second part, except the first part, of the RI that is carried on the RE in the 8th OFDM symbol and the RE in the ninth OFDM symbol, where if the RE in the 8th OFDM symbol and the RE in the 9th OFDM symbol carry no RI, the base station may not acquire the RI from the RE in the 8th OFDM symbol and the RE in the ninth OFDM symbol; the base station may also acquire the at least one of the ACK and the NACK that is carried on the RE in the 2nd OFDM symbol, the RE in the 3rd OFDM symbol, the RE in the 5th OFDM symbol, and the RE in the 6th OFDM symbol; the base station may further acquire the at least one of the CQI, the PMI, and the data on the PUSCH from the RE that carries no UL DMRS, carries no RI, and carries no ACK or NACK.

It should be noted that an execution order between S906, S907, and S908 is not limited in this embodiment of the present invention.

In another feasible implementation manner in this embodiment of the present invention, an implementation process of S901 to S903 may be as follows: According to a set order, UE first maps a first part of an RI to an RE in the 1st OFDM symbol in an uplink subframe and an RE in the 7th OFDM symbol in the uplink subframe, and then maps a second part, except the first part, of the RI to an RE in the 8th OFDM symbol in the uplink subframe and an RE in the 9th OFDM symbol in the uplink subframe; the UE maps, according to the set order, at least one of an ACK and a NACK to an RE in the 2nd OFDM symbol in the uplink subframe, an RE in the 3rd OFDM symbol in the uplink subframe, an RE in the 5th OFDM symbol in the uplink subframe, and an RE in the 6th OFDM symbol in the uplink subframe; and the UE maps at least one of a CQI, a PMI, and data on a PUSCH to a first RE, where the first RE is an RE that carries no UL DMRS, carries no RI, and carries no ACK or NACK.

According to the uplink control information transmission method provided in Embodiment 9 of the present invention, because UCI is carried at a location adjacent to that of a UL DMRS in an uplink subframe, performance of demodulating the UCI by a base station is improved, thereby improving a data transmission rate and a network throughput.

Figure 15:
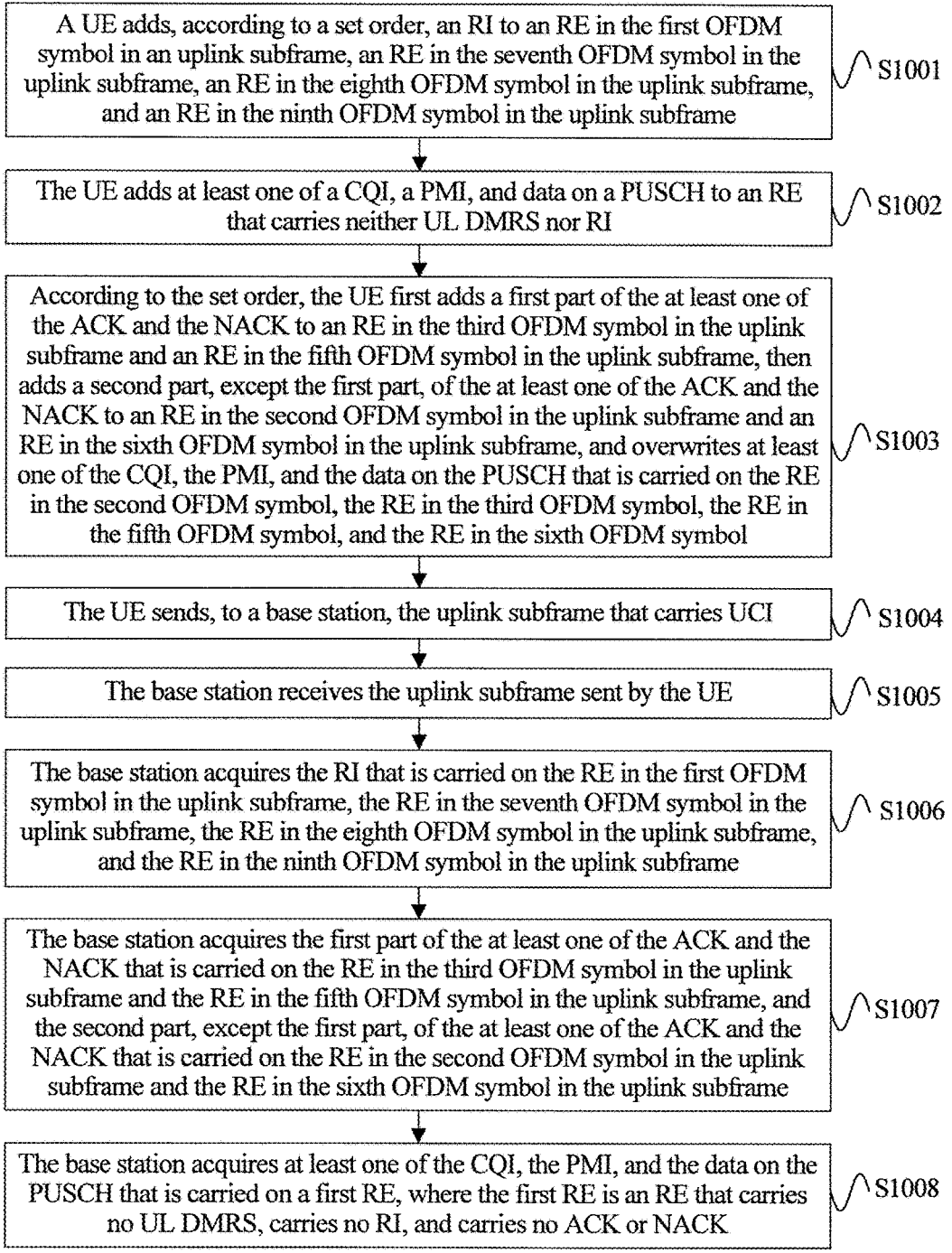
FIG. 15 is a flowchart of Embodiment 10 of an uplink control information transmission method according to the present invention.

FIG. 15 is a flowchart of Embodiment 10 of an uplink control information transmission method according to the present invention. As shown in FIG. 15, the method in this embodiment may include the following steps:

S1001. UE maps, according to a set order, an RI to an RE in the 1st OFDM symbol in an uplink subframe, an RE in the 7th OFDM symbol in the uplink subframe, an RE in the 8th OFDM symbol in the uplink subframe, and an RE in the 9th OFDM symbol in the uplink subframe.

S1002. The UE maps at least one of a CQI, a PMI, and data on a PUSCH to an RE that carries neither UL DMRS nor RI.

In this embodiment, a specific implementation process of S1002 is similar to a specific implementation process of S402 in method Embodiment 4 of the present invention. For details, reference may be made to related descriptions in the foregoing embodiment, and the details are not described herein again in this embodiment of the present invention.

S1003. According to the set order, the UE first maps a first part of at least one of an ACK and a NACK to an RE in the 3rd OFDM symbol in the uplink subframe and an RE in the 5th OFDM symbol in the uplink subframe, then maps a second part, except the first part, of the at least one of the ACK and the NACK to an RE in the 2nd OFDM symbol in the uplink subframe and an RE in the 6th OFDM symbol in the uplink subframe, and overwrites at least one of the CQI, the PMI, and the data on the PUSCH that is carried on the RE in the 2nd OFDM symbol, the RE in the 3rd OFDM symbol, the RE in the 5th OFDM symbol, and the RE in the 6th OFDM symbol.

In this embodiment, in the uplink subframe, the UE first maps, according to the set order, the first part of the at least one of the ACK and the NACK to the REs in the 3rd OFDM symbol and the 5th OFDM symbol; then maps, according to the set order, the second part, except the first part, of the at least one of the ACK and the NACK (that is, the remaining part of the at least one of the ACK and the NACK) to the REs in the 2nd OFDM symbol and the 6th OFDM symbol; and overwrites the at least one of the CQI, the PMI, and the data on the PUSCH that are carried on the REs in the 2nd OFDM symbol, the 3rd OFDM symbol, the 5th OFDM symbol, and the 7th OFDM symbol. If the at least one of the ACK and the NACK does not occupy all REs in the 3rd OFDM symbol and the 5th OFDM symbol, or the at least one of the ACK and the NACK exactly occupies all REs in the 3rd OFDM symbol and the 5th OFDM symbol, it indicates that the first part of the at least one of the ACK and the NACK is at least one of a complete ACK and a complete NACK, and the second part, except the first part, of the at least one of the ACK and the NACK is zero, and the UE does not need to map the second part, except the first part, of the at least one of the ACK and the NACK to the REs in the 2nd OFDM symbol and the 6th OFDM symbol.

In this embodiment, the UE maps the UL DMRS, the RI, the at least one of the CQI, the PMI, and the data on the PUSCH, and the at least one of the ACK and the NACK to the uplink subframe, and a UCI sending format shown in FIG. 16 may be formed. In this embodiment, the UCI sending format shown in FIG. 16 is used to map UCI to the uplink subframe, and then the uplink subframe that carries the UCI is sent to a base station. It should be noted that FIG. 16 is merely used as an example for description, and this embodiment of the present invention is not limited to the UCI sending format shown in FIG. 16.

S1004. The UE sends, to a base station, the uplink subframe that carries UCI.

S1005. The base station receives the uplink subframe sent by the UE.

In this embodiment, a specific implementation process of S1004 and S1005 is similar to a specific implementation process of S404 and S405 in method Embodiment 4 of the present invention. For details, reference may be made to related descriptions in the foregoing embodiment, and the details are not described herein again in this embodiment of the present invention.

S1006. The base station acquires the RI that is carried on the RE in the 1st OFDM symbol in the uplink subframe, the RE in the 7th OFDM symbol in the uplink subframe, the RE in the 8th OFDM symbol in the uplink subframe, and the RE in the 9th OFDM symbol in the uplink subframe.

S1007. The base station acquires the first part of the at least one of the ACK and the NACK that is carried on the RE in the 3rd OFDM symbol in the uplink subframe and the RE in the 5th OFDM symbol in the uplink subframe, and the second part, except the first part, of the at least one of the ACK and the NACK that is carried on the RE in the 2nd OFDM symbol in the uplink subframe and the RE in the 6th OFDM symbol in the uplink subframe.

S1008. The base station acquires at least one of the CQI, the PMI, and the data on the PUSCH that is carried on a first RE, where the first RE is an RE that carries no UL DMRS, carries no RI, and carries no ACK or NACK.

In this embodiment, according to the UCI sending founat shown in FIG. 16, the base station may acquire the RI that is carried on the RE in the 1st OFDM symbol, the RE in the 7th OFDM symbol, the RE in the 8th OFDM symbol, and the RE in the ninth OFDM symbol; the base station may also acquire the first part of the at least one of the ACK and the NACK that is carried on the RE in the 3rd OFDM symbol and the RE in the 5th OFDM symbol, and the second part, except the first part, of the at least one of the ACK and the NACK that is carried on the REs in the 2nd OFDM symbol and the 6th OFDM symbol, where if the RE in the 2nd OFDM symbol and the RE in the 6th OFDM symbol carry no ACK and NACK, the base station may not acquire the at least one of the ACK and the NACK from the RE in the 2nd OFDM symbol and the RE in the 6th OFDM symbol; the base station may further acquire the at least one of the CQI, the PMI, and the data on the PUSCH from the RE that carries no UL DMRS, carries no RI, and carries no ACK or NACK.

It should be noted that an execution order between S1006, S1007, and S1008 is not limited in this embodiment of the present invention.

In another feasible implementation manner in this embodiment of the present invention, an implementation process of S1001 to S1003 may be as follows: UE maps, according to a set order, an RI to an RE in the 1st OFDM symbol in an uplink subframe, an RE in the 7th OFDM symbol in the uplink subframe, an RE in the 8th OFDM symbol in the uplink subframe, and an RE in the 9th OFDM symbol in the uplink subframe; according to the set order, the UE first maps a first part of at least one of an ACK and a NACK to an RE in the 3rd OFDM symbol in the uplink subframe and an RE in the 5th OFDM symbol in the uplink subframe, and then maps a second part, except the first part, of the at least one of the ACK and the NACK to an RE in the 2nd OFDM symbol in the uplink subframe and an RE in the 6th OFDM symbol in the uplink subframe; and the UE maps at least one of a CQI, a PMI, and data on a PUSCH to a first RE, where the first RE is an RE that carries no UL DMRS, carries no RI, and carries no ACK or NACK.

According to the uplink control information transmission method provided in Embodiment 10 of the present invention, because UCI is carried at a location adjacent to that of a UL DMRS in an uplink subframe, performance of demodulating the UCI by a base station is improved, thereby improving a data transmission rate and a network throughput.

Preferably, on a basis of any embodiment from method Embodiment 4 of the present invention to method Embodiment 10 of the present invention, the foregoing set order is an order from the last carrier to the first carrier in the uplink subframe and from an RE in the 1st OFDM symbol to an RE in the last OFDM symbol in each carrier, according to which data is carried on the REs in the uplink subframe, where the data includes at least one of the UCI and the UL DMRS.

Further, the UE may further send indication information to the base station, where the indication information is used to indicate locations, in a time-frequency resource of the uplink subframe, of REs occupied by the RI and the at least one of the ACK and the NACK. Correspondingly, the base station may receive the indication information sent by the UE, and then the base station may acquire, according to the indication information, the RI carried on the REs in first OFDM symbols, and may also acquire, according to the indication information, the at least one of the ACK and the NACK that is carried on the REs in second OFDM symbols.

Still further, the time-frequency resource includes at least one of the following resources: a resource block, a resource block pair, and a resource block group.

FIG. 17 is a flowchart of Embodiment 11 of an uplink control information transmission method according to the present invention. As shown in FIG. 17, the method in this embodiment may be executed by UE. The method in this embodiment may include the following steps:

S1101. The UE receives trigger information sent by a base station, where the trigger information is used to trigger the UE to switch from sending a first uplink subframe according to a first UL DMRS pattern to sending a second uplink subframe according to a second UL DMRS pattern.

S1102. According to the trigger information and according to the second UL DMRS pattern, the UE maps UCI to the second uplink subframe and sends the second uplink subframe to the base station.

Figure 18:
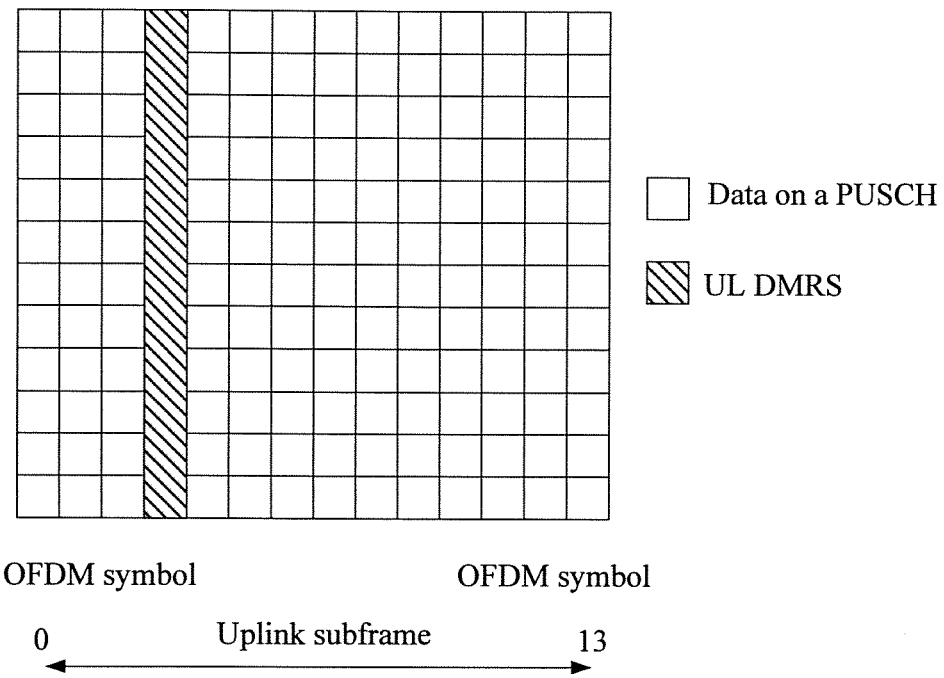
FIG. 18 is a first schematic diagram of a first uplink subframe sent by UE according to a first UL DMRS pattern in FIG. 17.
Figure 19:
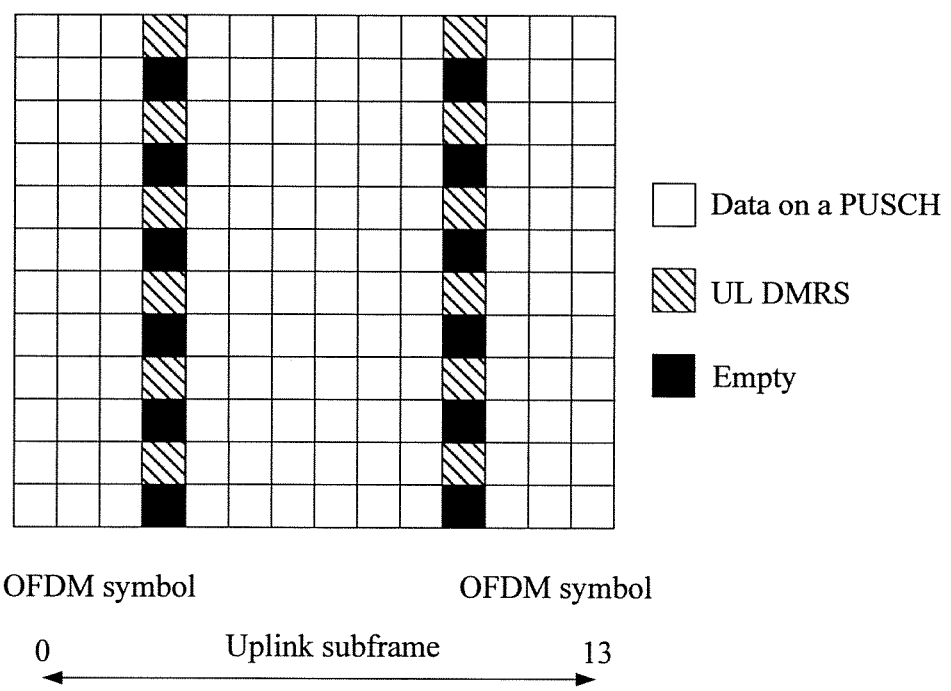
FIG. 19 is a second schematic diagram of a first uplink subframe sent by UE according to a first UL DMRS pattern in FIG. 17.
Figure 20:
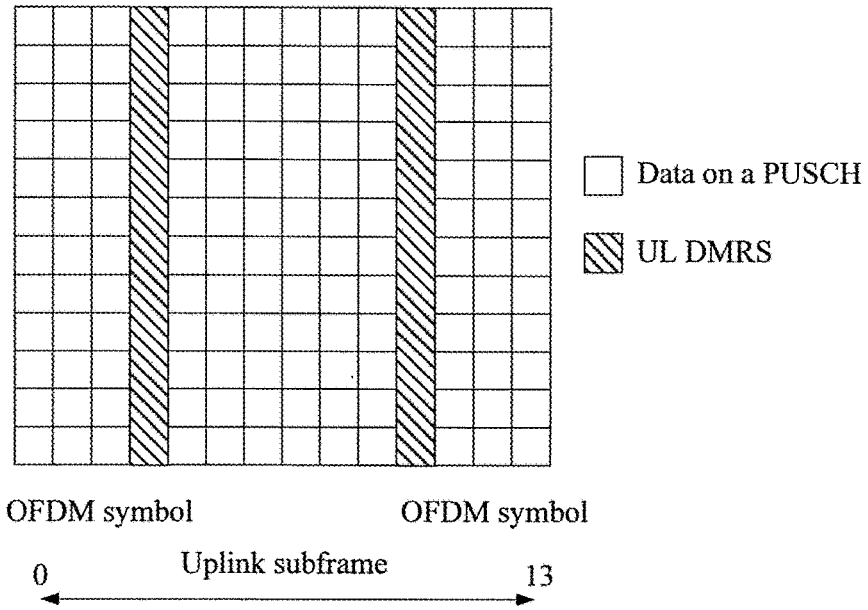
FIG. 20 is a schematic diagram of a second uplink subframe sent by UE according to a second UL DMRS pattern in FIG. 17.

In this embodiment, one uplink subframe may include REs in 14 OFDM symbols. In some application scenarios, a quantity of UL DMRSs sent by the UE to the base station may be properly reduced. For example, in the first UL DMRS pattern, REs in one OFDM symbol in a first uplink subframe are used to carry a UL DMRS (as shown in FIG. 18), or some REs in two OFDM symbols in a first uplink subframe are used to carry a UL DMRS, that is, each symbol of the two OFDM symbols have some REs used to carry the UL DMRS (as shown in FIG. 19). The first UL DMRS pattern in this embodiment may be a UL DMRS overhead reduction pattern. It should be noted that, in the first UL DMRS pattern, in the case in which some REs in two OFDM symbols in a first uplink subframe are used to carry a UL DMRS, REs that are in the two OFDM symbols occupied by the UL DMRS and that carry no UL DMRS are empty. However, in some other application scenarios, for example, in the second UL DMRS pattern, all REs in two OFDM symbols in a second uplink subframe are used to carry a UL DMRS (as shown in FIG. 20). The second UL DMRS pattern in this embodiment may be a Normal UL DMRS pattern. For example, when a serving cell of the UE is a small cell, the UE may properly reduce the quantity of UL DMRSs sent to the base station; the uplink subframe may be the first uplink subframe sent according to the first UL DMRS pattern. When the serving cell of the UE is a macrocell, the uplink subframe is the second uplink subframe sent according to the second UL DMRS pattern. It should be noted that FIG. 18, FIG. 19, and FIG. 20 are merely used as examples for description, and this embodiment of the present invention is not limited to the first uplink subframe sent according to the first UL DMRS pattern as shown in FIG. 18 and FIG. 19, and is not limited to the second uplink subframe sent according to the second UL DMRS pattern as shown in FIG. 20, either.

In this embodiment, when the UE is about to send the first uplink subframe to the base station according to the first UL DMRS pattern, if the UE needs to send UCI to the base station, the base station sends trigger information to the UE, where the trigger information is used to trigger the UE to switch from sending the first uplink subframe according to the first UL DMRS pattern to sending the second uplink subframe according to the second UL DMRS pattern; therefore, after receiving the trigger information, according to the trigger information and according to the second UL DMRS pattern, the UE maps the UCI to the second uplink subframe and sends the second uplink subframe to the base station, that is, the UE maps the UCI to locations adjacent to two OFDM symbols in the uplink subframe in which all REs in the two OFDM symbols are used to carry the UL DMRS, and sends the uplink subframe to the base station.

For example, a UCI sending format shown in FIG. 1 may be formed in this embodiment of the present invention. In this embodiment, the UCI sending format shown in FIG. 1 is used to map the UCI to the uplink subframe, and then the uplink subframe that carries the UCI is sent to the base station.

According to the uplink information transmission method provided in Embodiment 11 of the present invention, UE receives trigger information sent by a base station, where the trigger information is used to trigger the UE to switch from sending a first uplink subframe according to a first UL DMRS pattern to sending a second uplink subframe according to a second UL DMRS pattern; and according to the trigger information and according to the second UL DMRS pattern, the UE maps UCI to the second uplink subframe and sends the second uplink subframe to the base station; in this way, the UCI sent to the base station is carried in an uplink subframe in which all REs in two OFDM symbols are used to carry a UL DMRS, and the UCI is carried on locations adjacent to the two OFDM symbols, thereby improving performance of demodulating the UCI by the base station, and improving a data transmission rate and a network throughput.

Figure 21:
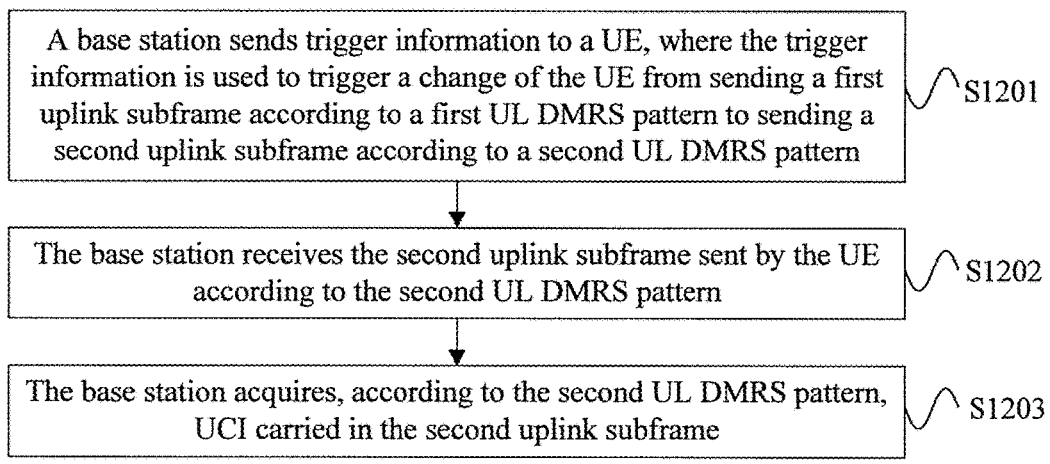
FIG. 21 is a flowchart of Embodiment 12 of an uplink control information transmission method according to the present invention.

FIG. 21 is a flowchart of Embodiment 12 of an uplink control information transmission method according to the present invention. As shown in FIG. 21, the method in this embodiment may be executed by a network side device (for example, a base station). The method in this embodiment may include the following steps:

S1201. The base station sends trigger information to UE, where the trigger information is used to trigger the UE to switch from sending a first uplink subframe according to a first UL DMRS pattern to sending a second uplink subframe according to a second UL DMRS pattern.

S1202. The base station receives the second uplink subframe sent by the UE according to the second UL DMRS pattern.

S1203. The base station acquires, according to the second UL DMRS pattern, UCI carried in the second uplink subframe.

In this embodiment, one uplink subframe may include REs in 14 OFDM symbols. In some application scenarios, a quantity of UL DMRSs sent by the UE to the base station may be properly reduced. For example, in the first UL DMRS pattern, REs in one OFDM symbol in a first uplink subframe are used to carry a UL DMRS (as shown in FIG. 18), or some REs in two OFDM symbols in a first uplink subframe are used to carry a UL DMRS, that is, each symbol of the two OFDM symbols have some REs used to carry the UL DMRS (as shown in FIG. 19). The first UL DMRS pattern in this embodiment may be a UL DMRS overhead reduction pattern. It should be noted that, in the first UL DMRS pattern, in the case in which some REs in two OFDM symbols in a first uplink subframe are used to carry a UL DMRS, REs that are in the two OFDM symbols occupied by the UL DMRS and that carry no UL DMRS are empty. However, in some other application scenarios, for example, in the second UL DMRS pattern, all REs in two OFDM symbols in a second uplink subframe are used to carry a UL DMRS (as shown in FIG. 20). The second UL DMRS pattern in this embodiment may be a Normal UL DMRS pattern. For example, when a serving cell of the UE is a small cell, the UE may properly reduce the quantity of UL DMRSs sent to the base station; the uplink subframe may be the first uplink subframe sent according to the first UL DMRS pattern. When the serving cell of the UE is a macrocell, the uplink subframe is the second uplink subframe sent according to the second UL DMRS pattern. It should be noted that FIG. 18, FIG. 19, and FIG. 20 are merely used as examples for description, and this embodiment of the present invention is not limited to the first uplink subframe sent according to the first UL DMRS pattern as shown in FIG. 18 and FIG. 19, and is not limited to the second uplink subframe sent according to the second UL DMRS pattern as shown in FIG. 20, either.

In this embodiment, when the UE is about to send the first uplink subframe to the base station according to the first UL DMRS pattern, if the UE needs to send UCI to the base station, the base station sends trigger information to the UE, where the trigger information is used to trigger the UE to switch from sending the first uplink subframe according to the first UL DMRS pattern to sending the second uplink subframe according to the second UL DMRS pattern; therefore, after receiving the trigger information, according to the trigger information and according to the second UL DMRS pattern, the UE maps the UCI to the second uplink subframe and sends the second uplink subframe to the base station, that is, the UE maps the UCI to locations adjacent to two OFDM symbols in the uplink subframe in which all REs in the two OFDM symbols are used to carry the UL DMRS, and sends the uplink subframe to the base station. For example, a UCI sending format is shown in FIG. 1. Therefore, the base station may acquire, according to the second UL DMRS pattern and from the locations in the uplink subframe that are adjacent to the two OFDM symbols in which all the REs are used to carry the UL DMRS, the UCI sent by the UE.

According to the uplink control information transmission method provided in Embodiment 12 of the present invention, a base station sends trigger information to UE, where the trigger information is used to trigger the UE to switch from sending a first uplink subframe according to a first UL DMRS pattern to sending a second uplink subframe according to a second UL DMRS pattern; the base station receives the second uplink subframe sent by the UE according to the second UL DMRS pattern; and the base station acquires, according to the second UL DMRS pattern, UCI carried in the second uplink subframe. Because the UCI is carried on locations adjacent to two OFDM symbols in which all REs are used to carry a UL DMRS, the base station can acquire the UCI from the locations adjacent to the two OFDM symbols in the uplink subframe, thereby improving performance of demodulating the UCI by the base station, and improving a data transmission rate and a network throughput.

Further, on a basis of Embodiment 11 or Embodiment 12 of the present invention, the trigger information in the foregoing embodiment may be implemented in the following three feasible implementation manners.

In a first feasible implementation manner, the trigger information is downlink control information (Downlink Control Information, DCI for short), where the DCI includes a one-bit indicator, and the one-bit indicator is used to trigger the UE to switch from sending the first uplink subframe according to the first UL DMRS pattern to sending the second uplink subframe according to the second UL DMRS pattern. For example, the trigger information is maped to UCI sent by the base station to the UE, a one-bit indicator may be maped to the DCI; when the one-bit indicator is a set value, the one-bit indicator may be used to trigger the UE to switch from sending the first uplink subframe according to the first UL DMRS pattern to sending the second uplink subframe according to the second UL DMRS pattern, and the UE switches, according to the set value of the one-bit indicator, from sending the first uplink subframe according to the first UL DMRS pattern to sending the second uplink subframe according to the second UL DMRS pattern. The trigger information in this embodiment is explicitly indicated in dynamic DCI.

In a second feasible implementation manner, the trigger information is a DCI indication corresponding to the uplink subframe, where a channel state information (Channel State Information, CSI) request (request) in the DCI indication is used to trigger the UE to switch from sending the first uplink subframe according to the first UL DMRS pattern to sending the second uplink subframe according to the second UL DMRS pattern. Preferably, the CSI request used to trigger the UE to switch from sending the first uplink subframe according to the first UL DMRS pattern to sending the second uplink subframe according to the second UL DMRS pattern is a non-zero value. Further, the DCI indication is carried on a physical downlink control channel (Physical Downlink Control Channel, PDCCH), and a format of the PDCCH is a DCI format used for uplink scheduling. For example, the DCI format used for uplink scheduling includes DCI format 0 or DCI format 4. The trigger information in this embodiment is implicitly indicated.

In a third feasible implementation manner, the first uplink subframe is a subframe that carries a physical uplink control channel (Physical Uplink Control Channel, PUCCH for short), and the PUCCH and a physical uplink shared channel (Physical Uplink Shared Channel, PUSCH for short) cannot be transmitted in the first uplink subframe at the same time; and the trigger information is further used to instruct the UE to send scheduling information of the PUSCH in the first uplink subframe. The trigger information in this embodiment is implicitly indicated.

In a fourth feasible implementation manner, the second uplink subframe is a subframe that carries a PUCCH, and the PUCCH and a PUSCH cannot be transmitted in the second uplink subframe at the same time; and the trigger information is further used to instruct the UE to send scheduling information of the PUSCH in the second uplink subframe. The trigger information in this embodiment is implicitly indicated.

Figure 22:
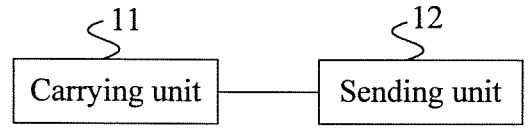
FIG. 22 is a schematic structural diagram of Embodiment 1 of UE according to the present invention.

FIG. 22 is a schematic structural diagram of Embodiment 1 of UE according to the present invention. As shown in FIG. 22, in this embodiment, in a first uplink demodulation reference signal UL DMRS pattern, resource elements REs in one orthogonal frequency division multiplexing OFDM symbol in an uplink subframe are used to carry the UL DMRS. The UE in this embodiment may include a carrying unit 11 and a sending unit 12. The carrying unit 11 is configured to map uplink control information UCI to REs in the uplink subframe according to the first UL DMRS pattern, where an OFDM symbol in which the REs carrying the UCI are located is adjacent to the OFDM symbol in which the REs carrying the UL DMRS are located. The sending unit 12 is configured to send, to a base station, the uplink subframe that carries the UCI and that is obtained by the carrying unit 11.

The UE in this embodiment may be configured to execute a technical solution executed by the UE in the foregoing method embodiments of the present invention, and implementation principles and technical effects of the UE are similar. For details, reference may be made to related descriptions in the foregoing method embodiments of the present invention, which are not described herein again.

In Embodiment 2 of UE of the present invention, the UE in this embodiment is based on the apparatus structure shown in FIG. 22. Further, the UL DMRS is carried on REs in the 4th OFDM symbol in the uplink subframe, where the uplink subframe includes 14 OFDM symbols.

In the uplink subframe, an RE that carries neither UL DMRS nor UCI further carries at least one of the following: a channel quality indicator CQI, a precoding matrix indication PMI, and data on a physical uplink shared channel PUSCH.

The UCI includes: a rank indication RI, and at least one of an acknowledgement ACK and a negative acknowledgement NACK; in the uplink subframe, the RI is carried on REs in the following at least two first OFDM symbols: the 1st OFDM symbol, the 2nd OFDM symbol, the 3rd OFDM symbol, the 5th OFDM symbol, the 6th OFDM symbol, the 7th OFDM symbol, the 8th OFDM symbol, and the 9th OFDM symbol; in the uplink subframe, at least one of the ACK and the NACK is carried on REs in the following at least two second OFDM symbols: the 1st OFDM symbol, the 2nd OFDM symbol, the 3rd OFDM symbol, the 5th OFDM symbol, the 6th OFDM symbol, the 7th OFDM symbol, the 8th OFDM symbol, and the 9th OFDM symbol.

In one aspect, the carrying unit 11 is specifically configured to: map the RI to the REs in the first OFDM symbols, map the at least one of the ACK and the NACK to the REs in the second OFDM symbols, and map at least one of the CQI, the PMI, and the data on the PUSCH to a first RE, where the first RE is an RE that carries no UL DMRS, carries no RI, and carries no ACK or NACK.

In a first feasible implementation manner of the aspect, the carrying unit 11 is specifically configured to: according to a set order, first map a first part of the RI to an RE in the 2nd OFDM symbol in the uplink subframe and an RE in the 6th OFDM symbol in the uplink subframe, and then map a second part, except the first part, of the RI to an RE in the 1st OFDM symbol in the uplink subframe and an RE in the 7th OFDM symbol in the uplink subframe; and according to the set order, first map a first part of the at least one of the ACK and the NACK to an RE in the 3rd OFDM symbol in the uplink subframe and an RE in the 5th OFDM symbol in the uplink subframe, and then map a second part, except the first part, of the at least one of the ACK and the NACK to REs that are in the 1st OFDM symbol and the 7th symbol of the uplink subframe and that carry no RI.

In a second feasible implementation manner of the aspect, the carrying unit 11 is specifically configured to: according to a set order, first map a first part of the RI to an RE in the 2nd OFDM symbol in the uplink subframe and an RE in the 6th OFDM symbol in the uplink subframe, and then map a second part, except the first part, of the RI to an RE in the 1st OFDM symbol in the uplink subframe and an RE in the 7th OFDM symbol in the uplink subframe; and map, according to the set order, the at least one of the ACK and the NACK to an RE that is in the 1st OFDM symbol in the uplink subframe and that carries no RI, an RE that is in the 3rd OFDM symbol in the uplink subframe and that carries no RI, an RE that is in the 5th OFDM symbol in the uplink subframe and that carries no RI, and an RE that is in the 7th OFDM symbol in the uplink subframe and that carries no RI.

In a third feasible implementation manner of the aspect, the carrying unit 11 is specifically configured to: map, according to a set order, the RI to an RE in the 1st OFDM symbol in the uplink subframe, an RE in the 2nd OFDM symbol in the uplink subframe, an RE in the 6th OFDM symbol in the uplink subframe, and an RE in the 7th OFDM symbol in the uplink subframe; and according to the set order, first map a first part of the at least one of the ACK and the NACK to an RE in the 3rd OFDM symbol in the uplink subframe and an RE in the 5th OFDM symbol in the uplink subframe, and then map a second part, except the first part, of the at least one of the ACK and the NACK to an RE that is in the 1st OFDM symbol in the uplink subframe and that carries no RI, an RE that is in the 2nd OFDM symbol in the uplink subframe and that carries no RI, an RE that is in the 6th OFDM symbol in the uplink subframe and that carries no RI, and an RE that is in the 7th OFDM symbol in the uplink subframe and that carries no RI.

In a fourth feasible implementation manner of the aspect, the carrying unit 11 is specifically configured to: according to a set order, first map a first part of the RI to an RE in the 1st OFDM symbol in the uplink subframe and an RE in the 7th OFDM symbol in the uplink subframe, and then map a second part, except the first part, of the RI to an RE in the 8th OFDM symbol in the uplink subframe and an RE in the 9th OFDM symbol in the uplink subframe; and according to the set order, first map a first part of the at least one of the ACK and the NACK to an RE in the 3rd OFDM symbol in the uplink subframe and an RE in the 5th OFDM symbol in the uplink subframe, and then map a second part, except the first part, of the at least one of the ACK and the NACK to an RE in the 2nd OFDM symbol in the uplink subframe and an RE in the 6th OFDM symbol in the uplink subframe.

In a fifth feasible implementation manner of the aspect, the carrying unit 11 is specifically configured to: according to a set order, first map a first part of the RI to an RE in the 1st OFDM symbol in the uplink subframe and an RE in the 7th OFDM symbol in the uplink subframe, and then map a second part, except the first part, of the RI to an RE in the 8th OFDM symbol in the uplink subframe and an RE in the 9th OFDM symbol in the uplink subframe; and map, according to the set order, the at least one of the ACK and the NACK to an RE in the 2nd OFDM symbol in the uplink subframe, an RE in the 3rd OFDM symbol in the uplink subframe, an RE in the 5th OFDM symbol in the uplink subframe, and an RE in the 6th OFDM symbol in the uplink subframe.

In a sixth feasible implementation manner of the aspect, the carrying unit 11 is specifically configured to: map, according to a set order, the RI to an RE in the 1st OFDM symbol in the uplink subframe, an RE in the 7th OFDM symbol in the uplink subframe, an RE in the 8th OFDM symbol in the uplink subframe, and an RE in the 9th OFDM symbol in the uplink subframe; and according to the set order, first map a first part of the at least one of the ACK and the NACK to an RE in the 3rd OFDM symbol in the uplink subframe and an RE in the 5th OFDM symbol in the uplink subframe, and then map a second part, except the first part, of the at least one of the ACK and the NACK to an RE in the 2nd OFDM symbol in the uplink subframe and an RE in the 6th OFDM symbol in the uplink subframe.

In another aspect, the carrying unit 11 is specifically configured to: map the RI to the REs in the first OFDM symbols; map at least one of the CQI, the PMI, and the data on the PUSCH to an RE that carries neither UL DMRS nor RI; and map the at least one of the ACK and the NACK to the REs in the second OFDM symbols, and overwrite at least one of the CQI, the PMI, and the data on the PUSCH that are carried on the REs in the second OFDM symbols.

In a first feasible implementation manner of the another aspect, the carrying unit 11 is specifically configured to: according to a set order, first map a first part of the RI to an RE in the 2nd OFDM symbol in the uplink subframe and an RE in the 6th OFDM symbol in the uplink subframe, and then map a second part, except the first part, of the RI to an RE in the 1st OFDM symbol in the uplink subframe and an RE in the 7th OFDM symbol in the uplink subframe; and according to the set order, first map a first part of the at least one of the ACK and the NACK to an RE in the 3rd OFDM symbol in the uplink subframe and an RE in the 5th OFDM symbol in the uplink subframe, then map a second part, except the first part, of the at least one of the ACK and the NACK to REs that are in the 1st OFDM symbol and the 7th symbol of the uplink subframe and that carry no RI, and overwrite the at least one of the CQI, the PMI, and the data on the PUSCH that are carried on the RE in the 1st OFDM symbol, the RE in the 3rd OFDM symbol, the RE in the 5th OFDM symbol, and the RE in the 7th OFDM symbol.

In a second feasible implementation manner of the another aspect, the carrying unit 11 is specifically configured to: according to a set order, first map a first part of the RI to an RE in the 2nd OFDM symbol in the uplink subframe and an RE in the 6th OFDM symbol in the uplink subframe, and then map a second part, except the first part, of the RI to an RE in the 1st OFDM symbol in the uplink subframe and an RE in the 7th OFDM symbol in the uplink subframe; and map, according to the set order, the at least one of the ACK and the NACK to an RE that is in the 1st OFDM symbol in the uplink subframe and that carries no RI, an RE that is in the 3rd OFDM symbol in the uplink subframe and that carries no RI, an RE that is in the 5th OFDM symbol in the uplink subframe and that carries no RI, and an RE that is in the 7th OFDM symbol in the uplink subframe and that carries no RI, and overwrite the at least one of the CQI, the PMI, and the data on the PUSCH that are carried on the RE in the 1st OFDM symbol, the RE in the 3rd OFDM symbol, the RE in the 5th OFDM symbol, and the RE in the 7th OFDM symbol.

In a third feasible implementation manner of the another aspect, the carrying unit 11 is specifically configured to: map, according to a set order, the RI to an RE in the 1st OFDM symbol in the uplink subframe, an RE in the 2nd OFDM symbol in the uplink subframe, an RE in the 6th OFDM symbol in the uplink subframe, and an RE in the 7th OFDM symbol in the uplink subframe; and according to the set order, first map a first part of the at least one of the ACK and the NACK to an RE in the 3rd OFDM symbol in the uplink subframe and an RE in the 5th OFDM symbol in the uplink subframe, then map a second part, except the first part, of the at least one of the ACK and the NACK to an RE that is in the 1st OFDM symbol in the uplink subframe and that carries no RI, an RE that is in the 2nd OFDM symbol in the uplink subframe and that carries no RI, an RE that is in the 6th OFDM symbol in the uplink subframe and that carries no RI, and an RE that is in the 7th OFDM symbol in the uplink subframe and that carries no RI, and overwrite the at least one of the CQI, the PMI, and the data on the PUSCH that are carried on the RE in the 1st OFDM symbol, the RE in the 2nd OFDM symbol, the RE in the 3rd OFDM symbol, the RE in the 5th OFDM symbol, the RE in the 6th OFDM symbol, and the RE in the 7th OFDM symbol.

In a fourth feasible implementation manner of the another aspect, the carrying unit 11 is specifically configured to: according to a set order, first map a first part of the RI to an RE in the 1st OFDM symbol in the uplink subframe and an RE in the 7th OFDM symbol in the uplink subframe, and then map a second part, except the first part, of the RI to an RE in the 8th OFDM symbol in the uplink subframe and an RE in the 9th OFDM symbol in the uplink subframe; and according to the set order, first map a first part of the at least one of the ACK and the NACK to an RE in the 3rd OFDM symbol in the uplink subframe and an RE in the 5th OFDM symbol in the uplink subframe, then map a second part, except the first part, of the at least one of the ACK and the NACK to an RE in the 2nd OFDM symbol in the uplink subframe and an RE in the 6th OFDM symbol in the uplink subframe, and overwrite the at least one of the CQI, the PMI, and the data on the PUSCH that are carried on the RE in the 2nd OFDM symbol, the RE in the 3rd OFDM symbol, the RE in the 5th OFDM symbol, and the RE in the 6th OFDM symbol.

In a fifth feasible implementation manner of the another aspect, the carrying unit 11 is specifically configured to: according to a set order, first map a first part of the RI to an RE in the 1st OFDM symbol in the uplink subframe and an RE in the 7th OFDM symbol in the uplink subframe, and then map a second part, except the first part, of the RI to an RE in the 8th OFDM symbol in the uplink subframe and an RE in the 9th OFDM symbol in the uplink subframe; and map, according to the set order, the at least one of the ACK and the NACK to an RE in the 2nd OFDM symbol in the uplink subframe, an RE in the 3rd OFDM symbol in the uplink subframe, an RE in the 5th OFDM symbol in the uplink subframe, and an RE in the 6th OFDM symbol in the uplink subframe, and overwrite the at least one of the CQI, the PMI, and the data on the PUSCH that are carried on the RE in the 2nd OFDM symbol, the RE in the 3rd OFDM symbol, the RE in the 5th OFDM symbol, and the RE in the 6th OFDM symbol.

In a sixth feasible implementation manner of the another aspect, the carrying unit 11 is specifically configured to: map, according to a set order, the RI to an RE in the 1st OFDM symbol in the uplink subframe, an RE in the 7th OFDM symbol in the uplink subframe, an RE in the 8th OFDM symbol in the uplink subframe, and an RE in the 9th OFDM symbol in the uplink subframe; and according to the set order, first map a first part of the at least one of the ACK and the NACK to an RE in the 3rd OFDM symbol in the uplink subframe and an RE in the 5th OFDM symbol in the uplink subframe, then map a second part, except the first part, of the at least one of the ACK and the NACK to an RE in the 2nd OFDM symbol in the uplink subframe and an RE in the 6th OFDM symbol in the uplink subframe, and overwrite the at least one of the CQI, the PMI, and the data on the PUSCH that are carried on the RE in the 2nd OFDM symbol, the RE in the 3rd OFDM symbol, the RE in the 5th OFDM symbol, and the RE in the 6th OFDM symbol.

Preferably, the set order is an order from the last carrier to the first carrier in the uplink subframe and from an RE in the 1st OFDM symbol to an RE in the last OFDM symbol in each carrier, according to which data is carried on the REs in the uplink subframe, where the data includes at least one of the UCI and the UL DMRS.

Optionally, the sending unit 12 is further configured to send indication information to the base station, where the indication information is used to indicate locations, in a time-frequency resource of the uplink subframe, of REs occupied by the RI and the at least one of the ACK and the NACK.

Further, the time-frequency resource includes at least one of the following resources: a resource block, a resource block pair, and a resource block group.

The UE in this embodiment may be configured to execute a technical solution executed by the UE in the foregoing method embodiments of the present invention, and implementation principles and technical effects of the UE are similar. For details, reference may be made to related descriptions in the foregoing method embodiments of the present invention, which are not described herein again.

Figure 23:
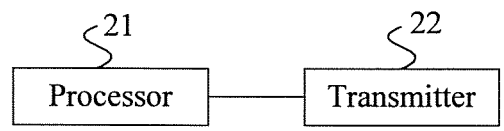
FIG. 23 is a schematic structural diagram of Embodiment 3 of UE according to the present invention.

FIG. 23 is a schematic structural diagram of Embodiment 3 of UE according to the present invention. As shown in FIG. 23, in this embodiment, in a first uplink demodulation reference signal UL DMRS pattern, REs in one orthogonal frequency division multiplexing OFDM symbol in an uplink subframe are used to carry the UL DMRS. The UE in this embodiment may include a processor 21 and a transmitter 22. The processor 21 is configured to map uplink control information UCI to REs in the uplink subframe according to the first UL DMRS pattern, where an OFDM symbol in which the REs carrying the UCI are located is adjacent to the OFDM symbol in which the REs carrying the UL DMRS are located. The transmitter 22 is configured to send, to a base station, the uplink subframe that carries the UCI and that is obtained by the processor 21.

Further, the UL DMRS is carried on REs in the 4th OFDM symbol in the uplink subframe, where the uplink subframe includes 14 OFDM symbols.

In the uplink subframe, an RE that carries neither UL DMRS nor UCI further carries at least one of the following: a channel quality indicator CQI, a precoding matrix indication PMI, and data on a physical uplink shared channel PUSCH.

The UCI includes: a rank indication RI, and at least one of an acknowledgement ACK and a negative acknowledgement NACK; in the uplink subframe, the RI is carried on REs in the following at least two first OFDM symbols: the 1st OFDM symbol, the 2nd OFDM symbol, the 3rd OFDM symbol, the 5th OFDM symbol, the 6th OFDM symbol, the 7th OFDM symbol, the 8th OFDM symbol, and the 9th OFDM symbol; in the uplink subframe, at least one of the ACK and the NACK is carried on REs in the following at least two second OFDM symbols: the 1st OFDM symbol, the 2nd OFDM symbol, the 3rd OFDM symbol, the 5th OFDM symbol, the 6th OFDM symbol, the 7th OFDM symbol, the 8th OFDM symbol, and the 9th OFDM symbol.

In one aspect, the processor 21 is specifically configured to: map the RI to the REs in the first OFDM symbols, map the at least one of the ACK and the NACK to the REs in the second OFDM symbols, and map at least one of the CQI, the PMI, and the data on the PUSCH to a first RE, where the first RE is an RE that carries no UL DMRS, carries no RI, and carries no ACK or NACK.

In a first feasible implementation manner of the aspect, the processor 21 is specifically configured to: according to a set order, first map a first part of the RI to an RE in the 2nd OFDM symbol in the uplink subframe and an RE in the 6th OFDM symbol in the uplink subframe, and then map a second part, except the first part, of the RI to an RE in the 1st OFDM symbol in the uplink subframe and an RE in the 7th OFDM symbol in the uplink subframe; and according to the set order, first map a first part of the at least one of the ACK and the NACK to an RE in the 3rd OFDM symbol in the uplink subframe and an RE in the 5th OFDM symbol in the uplink subframe, and then map a second part, except the first part, of the at least one of the ACK and the NACK to REs that are in the 1st OFDM symbol and the 7th symbol of the uplink subframe and that carry no RI.

In a second feasible implementation manner of the aspect, the processor 21 is specifically configured to: according to a set order, first map a first part of the RI to an RE in the 2nd OFDM symbol in the uplink subframe and an RE in the 6th OFDM symbol in the uplink subframe, and then map a second part, except the first part, of the RI to an RE in the 1st OFDM symbol in the uplink subframe and an RE in the 7th OFDM symbol in the uplink subframe; and map, according to the set order, the at least one of the ACK and the NACK to an RE that is in the 1st OFDM symbol in the uplink subframe and that carries no RI, an RE that is in the 3rd OFDM symbol in the uplink subframe and that carries no RI, an RE that is in the 5th OFDM symbol in the uplink subframe and that carries no RI, and an RE that is in the 7th OFDM symbol in the uplink subframe and that carries no RI.

In a third feasible implementation manner of the aspect, the processor 21 is specifically configured to: map, according to a set order, the RI to an RE in the 1st OFDM symbol in the uplink subframe, an RE in the 2nd OFDM symbol in the uplink subframe, an RE in the 6th OFDM symbol in the uplink subframe, and an RE in the 7th OFDM symbol in the uplink subframe; and according to the set order, first map a first part of the at least one of the ACK and the NACK to an RE in the 3rd OFDM symbol in the uplink subframe and an RE in the 5th OFDM symbol in the uplink subframe, and then map a second part, except the first part, of the at least one of the ACK and the NACK to an RE that is in the 1st OFDM symbol in the uplink subframe and that carries no RI, an RE that is in the 2nd OFDM symbol in the uplink subframe and that carries no RI, an RE that is in the 6th OFDM symbol in the uplink subframe and that carries no RI, and an RE that is in the 7th OFDM symbol in the uplink subframe and that carries no RI.

In a fourth feasible implementation manner of the aspect, the processor 21 is specifically configured to: according to a set order, first map a first part of the RI to an RE in the 1st OFDM symbol in the uplink subframe and an RE in the 7th OFDM symbol in the uplink subframe, and then map a second part, except the first part, of the RI to an RE in the 8th OFDM symbol in the uplink subframe and an RE in the 9th OFDM symbol in the uplink subframe; and according to the set order, first map a first part of the at least one of the ACK and the NACK to an RE in the 3rd OFDM symbol in the uplink subframe and an RE in the 5th OFDM symbol in the uplink subframe, and then map a second part, except the first part, of the at least one of the ACK and the NACK to an RE in the 2nd OFDM symbol in the uplink subframe and an RE in the 6th OFDM symbol in the uplink subframe.

In a fifth feasible implementation manner of the aspect, the processor 21 is specifically configured to: according to a set order, first map a first part of the RI to an RE in the 1st OFDM symbol in the uplink subframe and an RE in the 7th OFDM symbol in the uplink subframe, and then map a second part, except the first part, of the RI to an RE in the 8th OFDM symbol in the uplink subframe and an RE in the 9th OFDM symbol in the uplink subframe; and map, according to the set order, the at least one of the ACK and the NACK to an RE in the 2nd OFDM symbol in the uplink subframe, an RE in the 3rd OFDM symbol in the uplink subframe, an RE in the 5th OFDM symbol in the uplink subframe, and an RE in the 6th OFDM symbol in the uplink subframe.

In a sixth feasible implementation manner of the aspect, the processor 21 is specifically configured to: map, according to a set order, the RI to an RE in the 1st OFDM symbol in the uplink subframe, an RE in the 7th OFDM symbol in the uplink subframe, an RE in the 8th OFDM symbol in the uplink subframe, and an RE in the 9th OFDM symbol in the uplink subframe; and according to the set order; first map a first part of the at least one of the ACK and the NACK to an RE in the 3rd OFDM symbol in the uplink subframe and an RE in the 5th OFDM symbol in the uplink subframe, and then map a second part, except the first part, of the at least one of the ACK and the NACK to an RE in the 2nd OFDM symbol in the uplink subframe and an RE in the 6th OFDM symbol in the uplink subframe.

In another aspect, the processor 21 is specifically configured to: map the RI to the REs in the first OFDM symbols; map at least one of the CQI, the PMI, and the data on the PUSCH to an RE that carries neither UL DMRS nor RI; and map the at least one of the ACK and the NACK to the REs in the second OFDM symbols, and overwrite at least one of the CQI, the PMI, and the data on the PUSCH that are carried on the REs in the second OFDM symbols.

In a first feasible implementation manner of the another aspect, the processor 21 is specifically configured to: according to a set order, first map a first part of the RI to an RE in the 2nd OFDM symbol in the uplink subframe and an RE in the 6th OFDM symbol in the uplink subframe, and then map a second part, except the first part, of the RI to an RE in the 1st OFDM symbol in the uplink subframe and an RE in the 7th OFDM symbol in the uplink subframe; and according to the set order, first map a first part of the at least one of the ACK and the NACK to an RE in the 3rd OFDM symbol in the uplink subframe and an RE in the 5th OFDM symbol in the uplink subframe, then map a second part, except the first part, of the at least one of the ACK and the NACK to REs that are in the 1st OFDM symbol and the 7th symbol of the uplink subframe and that carry no RI, and overwrite the at least one of the CQI, the PMI, and the data on the PUSCH that are carried on the RE in the 1st OFDM symbol, the RE in the 3rd OFDM symbol, the RE in the 5th OFDM symbol, and the RE in the 7th OFDM symbol.

In a second feasible implementation manner of the another aspect, the processor 21 is specifically configured to: according to a set order, first map a first part of the RI to an RE in the 2nd OFDM symbol in the uplink subframe and an RE in the 6th OFDM symbol in the uplink subframe, and then map a second part, except the first part, of the RI to an RE in the 1st OFDM symbol in the uplink subframe and an RE in the 7th OFDM symbol in the uplink subframe; and map, according to the set order, the at least one of the ACK and the NACK to an RE that is in the 1st OFDM symbol in the uplink subframe and that carries no RI, an RE that is in the 3rd OFDM symbol in the uplink subframe and that carries no RI, an RE that is in the 5th OFDM symbol in the uplink subframe and that carries no RI, and an RE that is in the 7th OFDM symbol in the uplink subframe and that carries no RI, and overwrite the at least one of the CQI, the PMI, and the data on the PUSCH that are carried on the RE in the 1st OFDM symbol, the RE in the 3rd OFDM symbol, the RE in the 5th OFDM symbol, and the RE in the 7th OFDM symbol.

In a third feasible implementation manner of the another aspect, the processor 21 is specifically configured to: map, according to a set order, the RI to an RE in the 1st OFDM symbol in the uplink subframe, an RE in the 2nd OFDM symbol in the uplink subframe, an RE in the 6th OFDM symbol in the uplink subframe, and an RE in the 7th OFDM symbol in the uplink subframe; and according to the set order, first map a first part of the at least one of the ACK and the NACK to an RE in the 3rd OFDM symbol in the uplink subframe and an RE in the 5th OFDM symbol in the uplink subframe, then map a second part, except the first part, of the at least one of the ACK and the NACK to an RE that is in the 1st OFDM symbol in the uplink subframe and that carries no RI, an RE that is in the 2nd OFDM symbol in the uplink subframe and that carries no RI, an RE that is in the 6th OFDM symbol in the uplink subframe and that carries no RI, and an RE that is in the 7th OFDM symbol in the uplink subframe and that carries no RI, and overwrite the at least one of the CQI, the PMI, and the data on the PUSCH that are carried on the RE in the 1st OFDM symbol, the RE in the 2nd OFDM symbol, the RE in the 3rd OFDM symbol, the RE in the 5th OFDM symbol, the RE in the 6th OFDM symbol, and the RE in the 7th OFDM symbol.

In a fourth feasible implementation manner of the another aspect, the processor 21 is specifically configured to: according to a set order, first map a first part of the RI to an RE in the 1st OFDM symbol in the uplink subframe and an RE in the 7th OFDM symbol in the uplink subframe, and then map a second part, except the first part, of the RI to an RE in the 8th OFDM symbol in the uplink subframe and an RE in the 9th OFDM symbol in the uplink subframe; and according to the set order, first map a first part of the at least one of the ACK and the NACK to an RE in the 3rd OFDM symbol in the uplink subframe and an RE in the 5th OFDM symbol in the uplink subframe, then map a second part, except the first part, of the at least one of the ACK and the NACK to an RE in the 2nd OFDM symbol in the uplink subframe and an RE in the 6th OFDM symbol in the uplink subframe, and overwrite the at least one of the CQI, the PMI, and the data on the PUSCH that are carried on the RE in the 2nd OFDM symbol, the RE in the 3rd OFDM symbol, the RE in the 5th OFDM symbol, and the RE in the 6th OFDM symbol.

In a fifth feasible implementation manner of the another aspect, the processor 21 is specifically configured to: according to a set order, first map a first part of the RI to an RE in the 1st OFDM symbol in the uplink subframe and an RE in the 7th OFDM symbol in the uplink subframe, and then map a second part, except the first part, of the RI to an RE in the 8th OFDM symbol in the uplink subframe and an RE in the 9th OFDM symbol in the uplink subframe; and map, according to the set order, the at least one of the ACK and the NACK to an RE in the 2nd OFDM symbol in the uplink subframe, an RE in the 3rd OFDM symbol in the uplink subframe, an RE in the 5th OFDM symbol in the uplink subframe, and an RE in the 6th OFDM symbol in the uplink subframe, and overwrite the at least one of the CQI, the PMI, and the data on the PUSCH that are carried on the RE in the 2nd OFDM symbol, the RE in the 3rd OFDM symbol, the RE in the 5th OFDM symbol, and the RE in the 6th OFDM symbol.

In a sixth feasible implementation manner of the another aspect, the processor 21 is specifically configured to: map, according to a set order, the RI to an RE in the 1st OFDM symbol in the uplink subframe, an RE in the 7th OFDM symbol in the uplink subframe, an RE in the 8th OFDM symbol in the uplink subframe, and an RE in the 9th OFDM symbol in the uplink subframe; and according to the set order, first map a first part of the at least one of the ACK and the NACK to an RE in the 3rd OFDM symbol in the uplink subframe and an RE in the 5th OFDM symbol in the uplink subframe, then map a second part, except the first part, of the at least one of the ACK and the NACK to an RE in the 2nd OFDM symbol in the uplink subframe and an RE in the 6th OFDM symbol in the uplink subframe, and overwrite the at least one of the CQI, the PMI, and the data on the PUSCH that are carried on the RE in the 2nd OFDM symbol, the RE in the 3rd OFDM symbol, the RE in the 5th OFDM symbol, and the RE in the 6th OFDM symbol.

Preferably, the set order is an order from the last carrier to the first carrier in the uplink subframe and from an RE in the 1st OFDM symbol to an RE in the last OFDM symbol in each carrier, according to which data is carried on the REs in the uplink subframe, where the data includes at least one of the UCI and the UL DMRS.

Optionally, the transmitter 22 is further configured to send indication information to the base station, where the indication information is used to indicate locations, in a time-frequency resource of the uplink subframe, of REs occupied by the RI and the at least one of the ACK and the NACK.

Further, the time-frequency resource includes at least one of the following resources: a resource block, a resource block pair, and a resource block group.

The UE in this embodiment may be configured to execute a technical solution executed by the UE in the foregoing method embodiments of the present invention, and implementation principles and technical effects of the UE are similar. For details, reference may be made to related descriptions in the foregoing method embodiments of the present invention, which are not described herein again.

Figure 24:
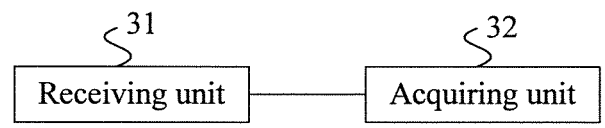
FIG. 24 is a schematic structural diagram of Embodiment 1 of a base station according to the present invention.

FIG. 24 is a schematic structural diagram of Embodiment 1 of a base station according to the present invention. As shown in FIG. 24, in this embodiment, in a first uplink demodulation reference signal UL DMRS pattern, REs in one orthogonal frequency division multiplexing OFDM symbol in an uplink subframe are used to carry the UL DMRS. The base station in this embodiment may include a receiving unit 31 and an acquiring unit 32. The receiving unit 31 is configured to receive an uplink subframe sent by user equipment UE, where resource elements REs in the uplink subframe carry uplink control information UCI according to the first uplink demodulation reference signal UL DMRS pattern, where an OFDM symbol in which the REs carrying the UCI are located is adjacent to the OFDM symbol in which the REs carrying the UL DMRS are located. The acquiring unit 32 is configured to acquire, according to the first UL DMRS pattern, the UCI carried in the uplink subframe received by the receiving unit 31.

The base station in this embodiment may be configured to execute a technical solution executed by the base station in the foregoing method embodiments of the present invention, and implementation principles and technical effects of the base station are similar. For details, reference may be made to related descriptions in the foregoing method embodiments of the present invention, which are not described herein again.

In Embodiment 2 of a base station of the present invention, the base station in this embodiment is based on the apparatus structure shown in FIG. 24. Further, the UL DMRS is carried on REs in the 4th OFDM symbol in the uplink subframe, where the uplink subframe includes REs in 14 OFDM symbols.

In the uplink subframe, an RE that carries neither UL DMRS nor UCI further carries at least one of the following: a channel quality indicator CQI, a precoding matrix indication PMI, and data on a physical uplink shared channel PUSCH.

The UCI includes: a rank indication RI, and at least one of an acknowledgement ACK and a negative acknowledgement NACK; in the uplink subframe, the RI is carried on REs in the following at least two first OFDM symbols: the 1st OFDM symbol, the 2nd OFDM symbol, the 3rd OFDM symbol, the 5th OFDM symbol, the 6th OFDM symbol, the 7th OFDM symbol, the 8th OFDM symbol, and the 9th OFDM symbol; in the uplink subframe, at least one of the ACK and the NACK is carried on REs in the following at least two second OFDM symbols: the 1st OFDM symbol, the 2nd OFDM symbol, the 3rd OFDM symbol, the 5th OFDM symbol, the 6th OFDM symbol, the 7th OFDM symbol, the 8th OFDM symbol, and the 9th OFDM symbol.

Further, the acquiring unit 32 is specifically configured to: acquire the RI carried on the REs in the first OFDM symbols; acquire the at least one of the ACK and the NACK that is carried on the REs in the second OFDM symbols; and acquire at least one of the CQI, the PMI, and the data on the PUSCH that is carried on a first RE, where the first RE is an RE that carries no UL DMRS, carries no RI, and carries no ACK or NACK.

In a first feasible implementation manner, the acquiring unit 32 is specifically configured to: acquire a first part of the RI that is carried on an RE in the 2nd OFDM symbol in the uplink subframe and an RE in the 6th OFDM symbol in the uplink subframe, and a second part, except the first part, of the RI that is carried on an RE in the 1st OFDM symbol in the uplink subframe and an RE in the 7th OFDM symbol in the uplink subframe; and acquire a first part of the at least one of the ACK and the NACK that is carried on an RE in the 3rd OFDM symbol in the uplink subframe and an RE in the 5th OFDM symbol in the uplink subframe, and a second part, except the first part, of the at least one of the ACK and the NACK that is carried on an RE in the 1st OFDM symbol in the uplink subframe and an RE in the 7th OFDM symbol in the uplink subframe.

In a second feasible implementation manner, the acquiring unit 32 is specifically configured to: acquire a first part of the RI that is carried on an RE in the 2nd OFDM symbol in the uplink subframe and an RE in the 6th OFDM symbol in the uplink subframe, and a second part, except the first part, of the RI that is carried on an RE in the 1st OFDM symbol in the uplink subframe and an RE in the 7th OFDM symbol in the uplink subframe; and acquire the at least one of the ACK and the NACK that is carried on an RE in the 1st OFDM symbol in the uplink subframe, an RE in the 3rd OFDM symbol in the uplink subframe, an RE in the 5th OFDM symbol in the uplink subframe, and an RE in the 7th OFDM symbol in the uplink subframe.

In a third feasible implementation manner, the acquiring unit 32 is specifically configured to: acquire the RI carried on an RE in the 1st OFDM symbol in the uplink subframe, an RE in the 2nd OFDM symbol in the uplink subframe, an RE in the 6th OFDM symbol in the uplink subframe, and an RE in the 7th OFDM symbol in the uplink subframe; and acquire a first part of the at least one of the ACK and the NACK that is carried on an RE in the 3rd OFDM symbol in the uplink subframe and an RE in the 5th OFDM symbol in the uplink subframe, and a second part, except the first part, of the at least one of the ACK and the NACK that is carried on an RE in the 1st OFDM symbol in the uplink subframe, an RE in the 2nd OFDM symbol in the uplink subframe, an RE in the 6th OFDM symbol in the uplink subframe, and an RE in the 7th OFDM symbol in the uplink subframe.

In a fourth feasible implementation manner, the acquiring unit 32 is specifically configured to: acquire a first part of the RI that is carried on an RE in the 1st OFDM symbol in the uplink subframe and an RE in the 7th OFDM symbol in the uplink subframe, and a second part, except the first part, of the RI that is carried on an RE in the 8th OFDM symbol in the uplink subframe and an RE in the 9th OFDM symbol in the uplink subframe; and acquire a first part of the at least one of the ACK and the NACK that is carried on an RE in the 3rd OFDM symbol in the uplink subframe and an RE in the 5th OFDM symbol in the uplink subframe, and a second part, except the first part, of the at least one of the ACK and the NACK that is carried on an RE in the 2nd OFDM symbol in the uplink subframe and an RE in the 6th OFDM symbol in the uplink subframe.

In a fifth feasible implementation manner, the acquiring unit 32 is specifically configured to: acquire a first part of the RI that is carried on an RE in the 1st OFDM symbol in the uplink subframe and an RE in the 7th OFDM symbol in the uplink subframe, and a second part, except the first part, of the RI that is carried on an RE in the 8th OFDM symbol in the uplink subframe and an RE in the 9th OFDM symbol in the uplink subframe; and acquire the at least one of the ACK and the NACK that is carried on an RE in the 2nd OFDM symbol in the uplink subframe, an RE in the 3rd OFDM symbol in the uplink subframe, an RE in the 5th OFDM symbol in the uplink subframe, and an RE in the 6th OFDM symbol in the uplink subframe.

In a sixth feasible implementation manner, the acquiring unit 32 is specifically configured to: acquire the RI carried on an RE in the 1st OFDM symbol in the uplink subframe, an RE in the 7th OFDM symbol in the uplink subframe, an RE in the 8th OFDM symbol in the uplink subframe, and an RE in the 9th OFDM symbol in the uplink subframe; and acquire a first part of the at least one of the ACK and the NACK that is carried on an RE in the 3rd OFDM symbol in the uplink subframe and an RE in the 5th OFDM symbol in the uplink subframe, and a second part, except the first part, of the at least one of the ACK and the NACK that is carried on REs in the 2nd OFDM symbol and the 6th OFDM symbol that are in the uplink subframe.

Optionally, the receiving unit 31 is further configured to receive indication information sent by the UE, where the indication information is used to indicate locations, in a time-frequency resource of the uplink subframe, of REs occupied by the RI and the at least one of the ACK and the NACK; and the acquiring unit 32 is specifically configured to: acquire, according to the indication information received by the receiving unit 31, the RI carried on the REs in the first OFDM symbols; and acquire, according to the indication information received by the receiving unit, the at least one of the ACK and the NACK that is carried on the REs in the second OFDM symbols.

Further, the time-frequency resource includes at least one of the following resources: a resource block, a resource block pair, and a resource block group.

The base station in this embodiment may be configured to execute a technical solution executed by the base station in the foregoing method embodiments of the present invention, and implementation principles and technical effects of the base station are similar. For details, reference may be made to related descriptions in the foregoing method embodiments of the present invention, which are not described herein again.

Figure 25:
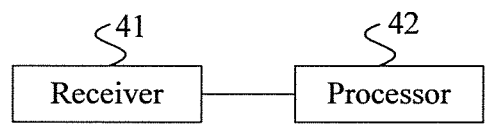
FIG. 25 is a schematic structural diagram of Embodiment 3 of a base station according to the present invention.

FIG. 25 is a schematic structural diagram of Embodiment 3 of a base station according to the present invention. As shown in FIG. 25, in this embodiment, in a first uplink demodulation reference signal UL DMRS pattern, REs in one orthogonal frequency division multiplexing OFDM symbol in an uplink subframe are used to carry the UL DMRS. The base station in this embodiment may include a receiver 41 and a processor 42. The receiver 41 is configured to receive an uplink subframe sent by user equipment UE, where resource elements REs in the uplink subframe carry uplink control information UCI according to the first uplink demodulation reference signal UL DMRS pattern, where an OFDM symbol in which the REs carrying the UCI are located is adjacent to the OFDM symbol in which the REs carrying the UL DMRS are located. The processor 42 is configured to acquire, according to the first UL DMRS pattern, the UCI carried in the uplink subframe received by the receiver.

Further, the UL DMRS is carried on REs in the 4th OFDM symbol in the uplink subframe, where the uplink subframe includes REs in 14 OFDM symbols.

In the uplink subframe, an RE that carries neither UL DMRS nor UCI further carries at least one of the following:

a channel quality indicator CQI, a precoding matrix indication PMI, and data on a physical uplink shared channel PUSCH.

The UCI includes: a rank indication RI, and at least one of an acknowledgement ACK and a negative acknowledgement NACK; in the uplink subframe, the RI is carried on REs in the following at least two first OFDM symbols: the 1st OFDM symbol, the 2nd OFDM symbol, the 3rd OFDM symbol, the 5th OFDM symbol, the 6th OFDM symbol, the 7th OFDM symbol, the 8th OFDM symbol, and the 9th OFDM symbol; in the uplink subframe, at least one of the ACK and the NACK is carried on REs in the following at least two second OFDM symbols: the 1st OFDM symbol, the 2nd OFDM symbol, the 3rd OFDM symbol, the 5th OFDM symbol, the 6th OFDM symbol, the 7th OFDM symbol, the 8th OFDM symbol, and the 9th OFDM symbol.

Further, the processor 42 is specifically configured to: acquire the RI carried on the REs in the first OFDM symbols; acquire the at least one of the ACK and the NACK that is carried on the REs in the second OFDM symbols; and acquire at least one of the CQI, the PMI, and the data on the PUSCH that is carried on a first RE, where the first RE is an RE that carries no UL DMRS, carries no RI, and carries no ACK or NACK.

In a first feasible implementation manner, the processor 42 is specifically configured to: acquire a first part of the RI that is carried on an RE in the 2nd OFDM symbol in the uplink subframe and an RE in the 6th OFDM symbol in the uplink subframe, and a second part, except the first part, of the RI that is carried on an RE in the 1st OFDM symbol in the uplink subframe and an RE in the 7th OFDM symbol in the uplink subframe; and acquire a first part of the at least one of the ACK and the NACK that is carried on an RE in the 3rd OFDM symbol in the uplink subframe and an RE in the 5th OFDM symbol in the uplink subframe, and a second part, except the first part, of the at least one of the ACK and the NACK that is carried on an RE in the 1st OFDM symbol in the uplink subframe and an RE in the 7th OFDM symbol in the uplink subframe.

In a second feasible implementation manner, the processor 42 is specifically configured to: acquire a first part of the RI that is carried on an RE in the 2nd OFDM symbol in the uplink subframe and an RE in the 6th OFDM symbol in the uplink subframe, and a second part, except the first part, of the RI that is carried on an RE in the 1st OFDM symbol in the uplink subframe and an RE in the 7th OFDM symbol in the uplink subframe; and acquire the at least one of the ACK and the NACK that is carried on an RE in the 1st OFDM symbol in the uplink subframe, an RE in the 3rd OFDM symbol in the uplink subframe, an RE in the 5th OFDM symbol in the uplink subframe, and an RE in the 7th OFDM symbol in the uplink subframe.

In a third feasible implementation manner, the processor 42 is specifically configured to: acquire the RI carried on an RE in the 1st OFDM symbol in the uplink subframe, an RE in the 2nd OFDM symbol in the uplink subframe, an RE in the 6th OFDM symbol in the uplink subframe, and an RE in the 7th OFDM symbol in the uplink subframe; and acquire a first part of the at least one of the ACK and the NACK that is carried on an RE in the 3rd OFDM symbol in the uplink subframe and an RE in the 5th OFDM symbol in the uplink subframe, and a second part, except the first part, of the at least one of the ACK and the NACK that is carried on an RE in the 1st OFDM symbol in the uplink subframe, an RE in the 2nd OFDM symbol in the uplink subframe, an RE in the 6th OFDM symbol in the uplink subframe, and an RE in the 7th OFDM symbol in the uplink subframe.

In a fourth feasible implementation manner, the processor 42 is specifically configured to: acquire a first part of the RI that is carried on an RE in the 1st OFDM symbol in the uplink subframe and an RE in the 7th OFDM symbol in the uplink subframe, and a second part, except the first part, of the RI that is carried on an RE in the 8th OFDM symbol in the uplink subframe and an RE in the 9th OFDM symbol in the uplink subframe; and acquire a first part of the at least one of the ACK and the NACK that is carried on an RE in the 3rd OFDM symbol in the uplink subframe and an RE in the 5th OFDM symbol in the uplink subframe, and a second part, except the first part, of the at least one of the ACK and the NACK that is carried on an RE in the 2nd OFDM symbol in the uplink subframe and an RE in the 6th OFDM symbol in the uplink subframe.

In a fifth feasible implementation manner, the processor 42 is specifically configured to: acquire a first part of the RI that is carried on an RE in the 1st OFDM symbol in the uplink subframe and an RE in the 7th OFDM symbol in the uplink subframe, and a second part, except the first part, of the RI that is carried on an RE in the 8th OFDM symbol in the uplink subframe and an RE in the 9th OFDM symbol in the uplink subframe; and acquire the at least one of the ACK and the NACK that is carried on an RE in the 2nd OFDM symbol in the uplink subframe, an RE in the 3rd OFDM symbol in the uplink subframe, an RE in the 5th OFDM symbol in the uplink subframe, and an RE in the 6th OFDM symbol in the uplink subframe.

In a sixth feasible implementation manner, the processor 42 acquires the RI carried on an RE in the 1st OFDM symbol in the uplink subframe, an RE in the 7th OFDM symbol in the uplink subframe, an RE in the 8th OFDM symbol in the uplink subframe, and an RE in the 9th OFDM symbol in the uplink subframe; and acquire a first part of the at least one of the ACK and the NACK that is carried on an RE in the 3rd OFDM symbol in the uplink subframe and an RE in the 5th OFDM symbol in the uplink subframe, and a second part, except the first part, of the at least one of the ACK and the NACK that is carried on REs in the 2nd OFDM symbol and the 6th OFDM symbol that are in the uplink subframe.

Optionally, the receiver 41 is further configured to receive indication information sent by the UE, where the indication information is used to indicate locations, in a time-frequency resource of the uplink subframe, of REs occupied by the RI and the at least one of the ACK and the NACK; and the processor 42 is specifically configured to: acquire, according to the indication information received by the receiver 41, the RI carried on the REs in the first OFDM symbols; and acquire, according to the indication information received by the receiver 41, the at least one of the ACK and the NACK that is carried on the REs in the second OFDM symbols.

Further, the time-frequency resource includes at least one of the following resources: a resource block, a resource block pair, and a resource block group.

The base station in this embodiment may be configured to execute a technical solution executed by the base station in the foregoing method embodiments of the present invention, and implementation principles and technical effects of the base station are similar. For details, reference may be made to related descriptions in the foregoing method embodiments of the present invention, which are not described herein again.

Figure 26:
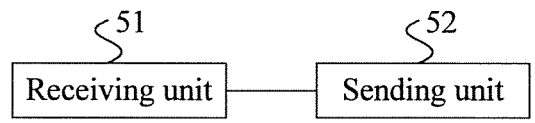
FIG. 26 is a schematic structural diagram of Embodiment 4 of UE according to the present invention.

FIG. 26 is a schematic structural diagram of Embodiment 4 of UE according to the present invention. As shown in FIG. 26, in this embodiment, in a first uplink demodulation reference signal UL DMRS pattern, resource elements REs in one orthogonal frequency division multiplexing OFDM symbol in a first uplink subframe are used to carry a UL DMRS, or some REs in two OFDM symbols in a first uplink subframe are used to carry a UL DMRS; in a second UL DMRS pattern, all REs in two OFDM symbols in a second uplink subframe are used to carry a UL DMRS. The UE in this embodiment may include a receiving unit 51 and a sending unit 52. The receiving unit 51 is configured to receive trigger information sent by a base station, where the trigger information is used to trigger the UE to switch from sending the first uplink subframe according to the first UL DMRS pattern to sending the second uplink subframe according to the second UL DMRS pattern. The sending unit 52 is configured to: according to the trigger information received by the receiving unit 51 and according to the second UL DMRS pattern, map uplink control information UCI to the second uplink subframe, and send the second uplink subframe to the base station.

The UE in this embodiment may be configured to execute a technical solution executed by the UE in the foregoing method embodiments of the present invention, and implementation principles and technical effects of the UE are similar. For details, reference may be made to related descriptions in the foregoing method embodiments of the present invention, which are not described herein again.

In Embodiment 5 of UE of the present invention, the apparatus in this embodiment is based on the apparatus structure shown in FIG. 26. In a first feasible implementation manner, the trigger information is downlink control information DCI, where the DCI includes a one-bit indicator, and the one-bit indicator is used to trigger the UE to switch from sending the first uplink subframe according to the first UL DMRS pattern to sending the second uplink subframe according to the second UL DMRS pattern.

In a second feasible implementation manner, the trigger information is a DCI indication corresponding to the uplink subframe, where a channel state information request CSI request in the DCI indication is used to trigger the UE to switch from sending the first uplink subframe according to the first UL DMRS pattern to sending the second uplink subframe according to the second UL DMRS pattern.

Further, the DCI indication is carried on a physical downlink control channel PDCCH, and a format of the PDCCH is a DCI format used for uplink scheduling.

Still further, the DCI format used for uplink scheduling includes DCI format 0 or DCI format 4.

In a third feasible implementation manner, the first uplink subframe is a subframe that carries a physical uplink control channel PUCCH, and the PUCCH and a physical uplink shared channel PUSCH cannot be transmitted in the first uplink subframe at the same time; and the trigger information is further used to instruct the UE to send scheduling information of the PUSCH in the first uplink subframe.

In a fourth feasible implementation manner, the second uplink subframe is a subframe that carries a physical uplink control channel PUCCH, and the PUCCH and a physical uplink shared channel PUSCH cannot be transmitted in the second uplink subframe at the same time; and the trigger information is further used to instruct the UE to send scheduling information of the PUSCH in the second uplink subframe.

The UE in this embodiment may be configured to execute a technical solution executed by the UE in the foregoing method embodiments of the present invention, and implementation principles and technical effects of the UE are similar. For details, reference may be made to related descriptions in the foregoing method embodiments of the present invention, which are not described herein again.

Figure 27:
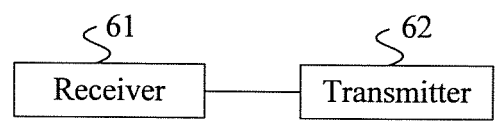
FIG. 27 is a schematic structural diagram of Embodiment 6 of UE according to the present invention.

FIG. 27 is a schematic structural diagram of Embodiment 6 of UE according to the present invention. As shown in FIG. 27, in this embodiment, in a first uplink demodulation reference signal UL DMRS pattern, resource elements REs in one orthogonal frequency division multiplexing OFDM symbol in a first uplink subframe are used to carry a UL DMRS, or some REs in two OFDM symbols in a first uplink subframe are used to carry a UL DMRS; in a second UL DMRS pattern, all REs in two OFDM symbols in a second uplink subframe are used to carry a UL DMRS. The UE in this embodiment may include a receiver 61 and a transmitter 62. The receiver 61 is configured to receive trigger information sent by a base station, where the trigger information is used to trigger the UE to switch from sending the first uplink subframe according to the first UL DMRS pattern to sending the second uplink subframe according to the second UL DMRS pattern. The transmitter 62 is configured to: according to the trigger information received by the receiver 61 and according to the second UL DMRS pattern, map uplink control information UCI to the second uplink subframe, and send the second uplink subframe to the base station.

Further, in a first feasible implementation manner, the trigger information is downlink control information DCI, where the DCI includes a one-bit indicator, and the one-bit indicator is used to trigger the UE to switch from sending the first uplink subframe according to the first UL DMRS pattern to sending the second uplink subframe according to the second UL DMRS pattern.

In a second feasible implementation manner, the trigger information is a DCI indication corresponding to the uplink subframe, where a channel state information request CSI request in the DCI indication is used to trigger the UE to switch from sending the first uplink subframe according to the first UL DMRS pattern to sending the second uplink subframe according to the second UL DMRS pattern.

Further, the DCI indication is carried on a physical downlink control channel PDCCH, and a format of the PDCCH is a DCI format used for uplink scheduling.

Still further, the DCI format used for uplink scheduling includes DCI format 0 or DCI format 4.

In a third feasible implementation manner, the first uplink subframe is a subframe that carries a physical uplink control channel PUCCH, and the PUCCH and a physical uplink shared channel PUSCH cannot be transmitted in the first uplink subframe at the same time; and the trigger information is further used to instruct the UE to send scheduling information of the PUSCH in the first uplink subframe.

In a fourth feasible implementation manner, the second uplink subframe is a subframe that carries a physical uplink control channel PUCCH, and the PUCCH and a physical uplink shared channel PUSCH cannot be transmitted in the second uplink subframe at the same time; and the trigger information is further used to instruct the UE to send scheduling information of the PUSCH in the second uplink subframe.

The UE in this embodiment may be configured to execute a technical solution executed by the UE in the foregoing method embodiments of the present invention, and implementation principles and technical effects of the UE are similar. For details, reference may be made to related descriptions in the foregoing method embodiments of the present invention, which are not described herein again.

Figure 28:
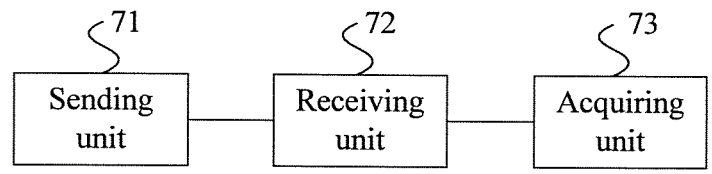
FIG. 28 is a schematic structural diagram of Embodiment 4 of a base station according to the present invention.

FIG. 28 is a schematic structural diagram of Embodiment 4 of a base station according to the present invention. As shown in FIG. 28, in this embodiment, in a first uplink demodulation reference signal UL DMRS pattern, resource elements REs in one orthogonal frequency division multiplexing OFDM symbol in a first uplink subframe are used to carry a UL DMRS, or some REs in two OFDM symbols in a first uplink subframe are used to carry a UL DMRS; in a second UL DMRS pattern, all REs in two OFDM symbols in a second uplink subframe are used to carry a UL DMRS. The base station in this embodiment may include a sending unit 71, a receiving unit 72, and an acquiring unit 73. The sending unit 71 is configured to send trigger information to user equipment UE, where the trigger information is used to trigger the UE to switch from sending the first uplink subframe according to the first UL DMRS pattern to sending the second uplink subframe according to the second UL DMRS pattern. The receiving unit 72 is configured to receive the second uplink subframe sent by the UE according to the second UL DMRS pattern. The acquiring unit 73 is configured to acquire, according to the second UL DMRS pattern, the UCI carried in the second uplink subframe received by the receiving unit.

The base station in this embodiment may be configured to execute a technical solution executed by the base station in the foregoing method embodiments of the present invention, and implementation principles and technical effects of the base station are similar. For details, reference may be made to related descriptions in the foregoing method embodiments of the present invention, which are not described herein again.

In Embodiment 5 of a base station of the present invention, the base station in this embodiment is based on the apparatus structure shown in FIG. 28. In a first feasible implementation manner, the trigger information is downlink control information DCI, where the DCI includes a one-bit indicator, and the one-bit indicator is used to trigger the UE to switch from sending the first uplink subframe according to the first UL DMRS pattern to sending the second uplink subframe according to the second UL DMRS pattern.

In a second feasible implementation manner, the trigger information is a DCI indication corresponding to the uplink subframe, where a channel state information request CSI request in the DCI indication is used to trigger the UE to switch from sending the first uplink subframe according to the first UL DMRS pattern to sending the second uplink subframe according to the second UL DMRS pattern.

Further, the DCI indication is carried on a physical downlink control channel PDCCH, and a format of the PDCCH is a DCI format used for uplink scheduling.

Still further, the DCI format used for uplink scheduling includes DCI format 0 or DCI format 4.

In a third feasible implementation manner, the first uplink subframe is a subframe that carries a physical uplink control channel PUCCH, and the PUCCH and a physical uplink shared channel PUSCH cannot be transmitted in the first uplink subframe at the same time; and the trigger information is further used to instruct the UE to send scheduling information of the PUSCH in the first uplink subframe.

In a fourth feasible implementation manner, the second uplink subframe is a subframe that carries a physical uplink control channel PUCCH, and the PUCCH and a physical uplink shared channel PUSCH cannot be transmitted in the second uplink subframe at the same time; and the trigger information is further used to instruct the UE to send scheduling information of the PUSCH in the second uplink subframe.

The base station in this embodiment may be configured to execute a technical solution executed by the base station in the foregoing method embodiments of the present invention, and implementation principles and technical effects of the base station are similar. For details, reference may be made to related descriptions in the foregoing method embodiments of the present invention, which are not described herein again.

Figure 29:
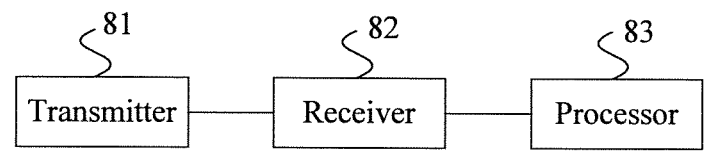
FIG. 29 is a schematic structural diagram of Embodiment 6 of a base station according to the present invention.

FIG. 29 is a schematic structural diagram of Embodiment 6 of a base station according to the present invention. As shown in FIG. 29, in this embodiment, in a first uplink demodulation reference signal UL DMRS pattern, resource elements REs in one orthogonal frequency division multiplexing OFDM symbol in a first uplink subframe are used to carry a UL DMRS, or some REs in two OFDM symbols in a first uplink subframe are used to carry a UL DMRS; in a second UL DMRS pattern, all REs in two OFDM symbols in a second uplink subframe are used to carry a UL DMRS. The base station in this embodiment may include a transmitter 81, a receiver 82, and a processor 83. The transmitter 81 is configured to send trigger information to user equipment UE, where the trigger information is used to trigger the UE to switch from sending the first uplink subframe according to the first UL DMRS pattern to sending the second uplink subframe according to the second UL DMRS pattern. The receiver 82 is configured to receive the second uplink subframe sent by the UE according to the second UL DMRS pattern. The processor 83 is configured to acquire, according to the second UL DMRS pattern, the UCI carried in the second uplink subframe received by the receiver.

Further, in a first feasible implementation manner, the trigger information is downlink control information DCI, where the DCI includes a one-bit indicator, and the one-bit indicator is used to trigger the UE to switch from sending the first uplink subframe according to the first UL DMRS pattern to sending the second uplink subframe according to the second UL DMRS pattern.

In a second feasible implementation manner, the trigger information is a DCI indication corresponding to the uplink subframe, where a channel state information request CSI request in the DCI indication is used to trigger the UE to switch from sending the first uplink subframe according to the first UL DMRS pattern to sending the second uplink subframe according to the second UL DMRS pattern.

Further, the DCI indication is carried on a physical downlink control channel PDCCH, and a format of the PDCCH is a DCI format used for uplink scheduling.

Still further, the DCI format used for uplink scheduling includes DCI format 0 or DCI format 4.

In a third feasible implementation manner, the first uplink subframe is a subframe that carries a physical uplink control channel PUCCH, and the PUCCH and a physical uplink shared channel PUSCH cannot be transmitted in the first uplink subframe at the same time; and the trigger information is further used to instruct the UE to send scheduling information of the PUSCH in the first uplink subframe.

In a fourth feasible implementation manner, the second uplink subframe is a subframe that carries a physical uplink control channel PUCCH, and the PUCCH and a physical uplink shared channel PUSCH cannot be transmitted in the second uplink subframe at the same time; and the trigger information is further used to instruct the UE to send scheduling information of the PUSCH in the second uplink subframe.

The base station in this embodiment may be configured to execute a technical solution executed by the base station in the foregoing method embodiments of the present invention, and implementation principles and technical effects of the base station are similar. For details, reference may be made to related descriptions in the foregoing method embodiments of the present invention, which are not described herein again.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. An apparatus, wherein in a first uplink demodulation reference signal (UL DMRS) pattern, resource elements (REs) in one orthogonal frequency division multiplexing (OFDM) symbol in an uplink subframe are used to carry the UL DMRS, the apparatus comprising:
   a processor, configured to map uplink control information (UCI) to REs in the uplink subframe according to the first UL DMRS pattern, wherein an OFDM symbol in which the REs carrying the UCI are located is adjacent to the OFDM symbol in which the REs carrying the UL DMRS are located;
   a transmitter, configured to send, to a base station, the uplink subframe that carries the UCI and that is obtained by the processor, wherein the UCI comprises: a rank indication (RI), and at least one of an acknowledgement (ACK) and a negative acknowledgement (NACK);
   wherein in the uplink subframe, the RI is carried on REs in the following at least two first OFDM symbols: the 1st OFDM symbol, the 2nd OFDM symbol, the 3rd OFDM symbol, the 5th OFDM symbol, the 6th OFDM symbol, the 7th OFDM symbol, the 8th OFDM symbol, and the 9th OFDM symbol;
   wherein in the uplink subframe, at least one of the ACK and the NACK is carried on REs in the following at least two second OFDM symbols: the 1st OFDM symbol, the 2nd OFDM symbol, the 3rd OFDM symbol, the 5th OFDM symbol, the 6th OFDM symbol, the 7th OFDM symbol, the 8th OFDM symbol, and the 9th OFDM symbol;
   wherein the processor is further configured to:
      map the RI to the REs in the first OFDM symbols,
      map the at least one of the ACK and the NACK to the REs in the second OFDM symbols,
      map at least one of a channel quality indicator (CQI), a precoding matrix indicator (PMI), and data on a physical uplink shared channel (PUSCH) to a first RE, wherein the first RE is an RE that carries no UL DMRS, carries no RI, and carries no ACK or NACK,
      according to a set order, first map a first part of the RI to an RE in the 2nd OFDM symbol in the uplink subframe and an RE in the 6th OFDM symbol in the uplink subframe, and then map a second part, except the first part, of the RI to an RE in the 1st OFDM symbol in the uplink subframe and an RE in the 7th OFDM symbol in the uplink subframe, and
      according to the set order, first map a first part of the at least one of the ACK and the NACK to an RE in the 3rd OFDM symbol in the uplink subframe and an RE in the 5th OFDM symbol in the uplink subframe, and then map a second part, except the first part, of the at least one of the ACK and the NACK to REs that are in the 1st OFDM symbol and the 7th OFDM symbol of the uplink subframe and that carry no RI.

2. An apparatus, wherein in a first uplink demodulation reference signal (UL DMRS) pattern, resource elements (REs) in one orthogonal frequency division multiplexing (OFDM) symbol in an uplink subframe are used to carry the UL DMRS, the apparatus comprising:
   a processor, configured to map uplink control infoimation (UCI) to REs in the uplink subframe according to the first UL DMRS pattern, wherein an OFDM symbol in which the REs carrying the UCI are located is adjacent to the OFDM symbol in which the REs carrying the UL DMRS are located;
   a transmitter, configured to send, to a base station, the uplink subframe that carries the UCI and that is obtained by the processor, wherein the UCI comprises: a rank indication (RI), and at least one of an acknowledgement (ACK) and a negative acknowledgement (NACK);
   wherein in the uplink subframe, the RI is carried on REs in the following at least two first OFDM symbols: the 1st OFDM symbol, the 2nd OFDM symbol, the 3rd OFDM symbol, the 5th OFDM symbol, the 6th OFDM symbol, the 7th OFDM symbol, the 8th OFDM symbol, and the 9th OFDM symbol;
   wherein in the uplink subframe, at least one of the ACK and the NACK is carried on REs in the following at least two second OFDM symbols: the 1st OFDM symbol, the 2nd OFDM symbol, the 3rd OFDM symbol, the 5th OFDM symbol, the 6th OFDM symbol, the 7th OFDM symbol, the 8th OFDM symbol, and the 9th OFDM symbol;
   wherein the processor is further configured to:
      map the RI to the REs in the first OFDM symbols,
      map the at least one of the ACK and the NACK to the REs in the second OFDM symbols,
      map at least one of a channel quality indicator (CQI), a precoding matrix indicator (PMI), and data on a physical uplink shared channel (PUSCH) to a first RE, wherein the first RE is an RE that carries no UL DMRS, carries no RI, and carries no ACK or NACK,
      according to a set order, first map a first part of the RI to an RE in the 2nd OFDM symbol in the uplink subframe and an RE in the 6th OFDM symbol in the uplink subframe, and then map a second part, except the first part, of the RI to an RE in the 1st OFDM symbol in the uplink subframe and an RE in the 7th OFDM symbol in the uplink subframe, and
      according to the set order, map the at least one of the ACK and the NACK to an RE that is in the 1st OFDM symbol in the uplink subframe and that carries no RI, an RE that is in the 3rd OFDM symbol in the uplink subframe and that carries no RI, an RE that is in the 5th OFDM symbol in the uplink subframe and that carries no RI, and an RE that is in the 7th OFDM symbol in the uplink subframe and that carries no RI.

3. A base station, wherein in a first uplink demodulation reference signal (UL DMRS) pattern, resource elements (REs) in one orthogonal frequency division multiplexing (OFDM) symbol in an uplink subframe are used to carry the UL DMRS; the base station comprising:

a receiver, configured to receive an uplink subframe sent by user equipment (UE), wherein REs in the uplink subframe carry uplink control information (UCI) according to the first UL DMRS pattern, wherein an OFDM symbol in which the REs carrying the UCI are located is adjacent to the OFDM symbol in which the REs carrying the UL DMRS are located;

a processor, configured to acquire, according to the first UL DMRS pattern, the UCI carried in the uplink subframe received by the receiver, wherein the UCI comprises: a rank indication (RI), and at least one of an acknowledgement (ACK) and a negative acknowledgement (NACK);

wherein in the uplink subframe, the RI is carried on REs in the following at least two first OFDM symbols: the 1st OFDM symbol, the 2nd OFDM symbol, the 3rd OFDM symbol, the 5th OFDM symbol, the 6th OFDM symbol, the 7th OFDM symbol, the 8th OFDM symbol, and the 9th OFDM symbol;

wherein in the uplink subframe, at least one of the ACK and the NACK is carried on REs in the following at least two second OFDM symbols: the 1st OFDM symbol, the 2nd OFDM symbol, the 3rd OFDM symbol, the 5th OFDM symbol, the 6th OFDM symbol, the 7th OFDM symbol, the 8th OFDM symbol, and the 9th OFDM symbol;

wherein the processor is further configured to:
acquire the RI carried on the REs in the first OFDM symbols,
acquire the at least one of the ACK and the NACK that is carried on the REs in the second OFDM symbols,
acquire at least one of a channel quality indicator (CQI), a precoding matrix indicator (PMI), and data on a physical uplink shared channel (PUSCH) that is carried on a first RE, wherein the first RE is an RE that carries no UL DMRS, carries no RI, and carries no ACK or NACK,
acquire a first part of the RI that is carried on an RE in the 2nd OFDM symbol in the uplink subframe and an RE in the 6th OFDM symbol in the uplink subframe, and a second part, except the first part, of the RI that is carried on an RE in the 1st OFDM symbol in the uplink subframe and an RE in the 7th OFDM symbol in the uplink subframe, and
acquire the at least one of the ACK and the NACK that is carried on an RE in the 1st OFDM symbol in the uplink subframe, an RE in the 3rd OFDM symbol in the uplink subframe, an RE in the 5th OFDM symbol in the uplink subframe, and an RE in the 7th OFDM symbol in the uplink subframe.

* * * * *